(12) United States Patent
Itabashi et al.

(10) Patent No.: US 7,450,274 B2
(45) Date of Patent: Nov. 11, 2008

(54) OPTICAL SCANNING APPARATUS, IMAGE FORMING APPARATUS, AND BEAM POSITIONING METHOD

(75) Inventors: Akihisa Itabashi, Tokyo (JP); Taku Amada, Kanagawa (JP); Seizo Suzuki, Kanagawa (JP); Toshihiro Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1117 days.

(21) Appl. No.: 10/840,369

(22) Filed: May 7, 2004

(65) Prior Publication Data

US 2005/0024479 A1 Feb. 3, 2005

(30) Foreign Application Priority Data

| May 7, 2003 | (JP) | .............................. 2003-129480 |
| Jul. 16, 2003 | (JP) | .............................. 2003-198022 |
| Jul. 16, 2003 | (JP) | .............................. 2003-198068 |

(51) Int. Cl.
*H04N 1/04* (2006.01)

(52) U.S. Cl. ........................ 358/474; 358/475; 358/509; 358/511; 358/481

(58) Field of Classification Search ................. 358/474, 358/475, 510, 509, 511, 512, 513, 480, 481, 358/483, 484, 493, 494
See application file for complete search history.

(56) References Cited

U.S. PATENT DOCUMENTS

| 1,213,785 A | * | 1/1917 | Dirpose et al. ................. 474/95 |
| 4,953,171 A | | 8/1990 | Nakajima et al. |
| 4,995,710 A | | 2/1991 | Suzuki et al. |
| 5,005,928 A | | 4/1991 | Suzuki et al. |
| 5,015,050 A | | 5/1991 | Itabashi |
| 5,029,956 A | | 7/1991 | Takanashi et al. |
| 5,031,979 A | | 7/1991 | Itabashi |
| 5,062,679 A | | 11/1991 | Itabashi |
| 5,064,261 A | | 11/1991 | Itabashi |

(Continued)

FOREIGN PATENT DOCUMENTS

JP    6-82620    3/1994

(Continued)

OTHER PUBLICATIONS

U.S. Appl. No. 12/051,404, filed Mar. 19, 2008, Amada, et al.
U.S. Appl. No. 09/946,482, filed Sep. 6, 2001, Ohashi et al.
U.S. Appl. No. 09/955,181, filed Sep. 19, 2001, Suzuki et al.
U.S. Appl. No. 10/058,446, filed Jan. 28, 2002, Masuda.

(Continued)

*Primary Examiner*—Jerome Grant, II
(74) *Attorney, Agent, or Firm*—Oblon, Spivak, McClelland, Maier & Neustadt, P.C.

(57) ABSTRACT

An optical scanning apparatus includes M number of light sources that includes M number of semiconductor lasers and M number of coupling lenses, where M is a positive integer, a deflecting scanning unit that deflects laser beams from the light sources to a surface to be scanned, and a transmission-type prism that deflects optical path of the laser beam from at least one of the light sources by an infinitesimal amount of angle. The prism is disposed between the light sources and the deflecting scanning unit, has an incident surface and an output surface nonparallel to each other, and can rotate around an axis of rotation substantially parallel to the optical path of the laser beam.

45 Claims, 26 Drawing Sheets

U.S. PATENT DOCUMENTS

| | | | |
|---|---|---|---|
| 5,136,418 A | 8/1992 | Itabashi | |
| 5,221,986 A | 6/1993 | Itabashi | |
| 5,272,325 A * | 12/1993 | Peng | 235/462.35 |
| 5,355,244 A | 10/1994 | Suzuki et al. | |
| 5,383,754 A | 1/1995 | Sumida et al. | |
| 5,426,298 A | 6/1995 | Sakuma et al. | |
| 5,459,601 A | 10/1995 | Suzuki et al. | |
| 5,475,522 A | 12/1995 | Itabashi et al. | |
| 5,504,613 A | 4/1996 | Itabashi et al. | |
| 5,546,216 A | 8/1996 | Suzuki | |
| 5,606,181 A | 2/1997 | Sakuma et al. | |
| 5,648,864 A | 7/1997 | Itabashi | |
| 5,717,511 A | 2/1998 | Suzuki | |
| 5,838,024 A | 11/1998 | Masuda et al. | |
| 5,875,051 A | 2/1999 | Suzuki et al. | |
| 5,952,649 A | 9/1999 | Amada | |
| 5,962,874 A | 10/1999 | Masuda et al. | |
| 5,986,791 A | 11/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,188,086 B1 | 2/2001 | Masuda et al. | |
| 6,222,662 B1 | 4/2001 | Suzuki et al. | |
| 6,233,081 B1 | 5/2001 | Suzuki et al. | |
| 6,252,694 B1 * | 6/2001 | Shinada | 359/201 |
| 6,256,133 B1 | 7/2001 | Suzuki et al. | |
| 6,330,017 B1 | 12/2001 | Suzuki | |
| 6,347,004 B1 | 2/2002 | Suzuki et al. | |
| 6,359,717 B2 | 3/2002 | Suzuki et al. | |
| 6,376,837 B1 | 4/2002 | Itabashi et al. | |
| 6,381,057 B1 | 4/2002 | Itabashi | |
| 6,384,949 B1 | 5/2002 | Suzuki | |
| 6,388,792 B1 | 5/2002 | Atsuumi et al. | |
| 6,400,391 B1 | 6/2002 | Suhara et al. | |
| 6,417,509 B1 | 7/2002 | Atsuumi et al. | |
| 6,429,956 B2 | 8/2002 | Itabashi | |
| 6,448,998 B1 | 9/2002 | Suzuki et al. | |
| 6,469,772 B1 | 10/2002 | Itabashi | |
| 6,509,995 B1 | 1/2003 | Suzuki et al. | |
| 6,596,985 B2 | 7/2003 | Sakai et al. | |
| 6,606,179 B2 | 8/2003 | Suzuki et al. | |
| 6,621,512 B2 | 9/2003 | Nakajima et al. | |
| 6,624,920 B2 | 9/2003 | Itabashi | |
| 6,657,761 B2 | 12/2003 | Suzuki et al. | |
| 6,700,687 B1 | 3/2004 | Itabashi | |
| 6,707,480 B2 | 3/2004 | Ameyama et al. | |
| 6,744,545 B2 | 6/2004 | Suhara et al. | |
| 6,771,300 B2 | 8/2004 | Amada et al. | |
| 6,771,407 B2 | 8/2004 | Hayashi et al. | |
| 6,822,671 B2 * | 11/2004 | Inagaki | 347/258 |
| 2002/0080428 A1 | 6/2002 | Suzuki et al. | |
| 2002/0101642 A1 | 8/2002 | Masuda | |
| 2002/0101665 A1 | 8/2002 | Ohashi et al. | |
| 2005/0024479 A1 | 2/2005 | Itabashi et al. | |

FOREIGN PATENT DOCUMENTS

| | | | |
|---|---|---|---|
| JP | 7-230051 | | 8/1995 |
| JP | 9-189873 | | 7/1997 |
| JP | 9-274134 | | 10/1997 |
| JP | 10-215351 | | 8/1998 |
| JP | 10-239939 | | 9/1998 |
| JP | 10-282531 | | 10/1998 |
| JP | 2001-100127 | | 4/2001 |
| JP | 2001-133718 | | 5/2001 |
| JP | 2001-264665 | | 9/2001 |
| JP | 2002-174785 | | 6/2002 |
| JP | 2005017587 | * | 1/2005 |

OTHER PUBLICATIONS

U.S. Appl. No. 07/366,170, filed Jun. 14, 1989, Itabashi.
U.S. Appl. No. 07/397,671, filed Aug. 23, 1989, Itabashi et al.
U.S. Appl. No. 07/897,783, filed Jun. 12, 1992, Itabashi et al.
U.S. Appl. No. 08/095,426, filed Jul. 23, 1993.
U.S. Appl. No. 09/678,611, filed Oct. 4, 2000, Sakai et al.
U.S. Appl. No. 09/716,949, filed Nov. 22, 2000, Atsuumi et al.
U.S. Appl. No. 09/769,510, filed Jan. 26, 2001, Nakajima et al.
U.S. Appl. No. 09/827,097, filed Apr. 6, 2001, Ono et al.
U.S. Appl. No. 09/873,256, filed Jun. 5, 2001, Ema et al.
U.S. Appl. No. 10/047,698, filed Jan. 18, 2002, Suzuki.
U.S. Appl. No. 10/161,659, filed Jun. 5, 2002, Suzuki et al.
U.S. Appl. No. 10/161,756, filed Jun. 5, 2002, Atsuumi et al.
U.S. Appl. No. 10/183,748, filed Jun. 28, 2002, Nihei et al.
U.S. Appl. No. 10/207,241, filed Jul. 30, 2002, Suzuki et al.
U.S. Appl. No. 10/200,778, filed Jul. 24, 2002, Amada et al.
U.S. Appl. No. 10/278,810, filed Oct. 24, 2002, Sakai et al.
U.S. Appl. No. 10/278,916, filed Oct. 24, 2002, Suzuki et al.
U.S. Appl. No. 10/278,878, filed Oct. 24, 2002, Suzuki et al.
U.S. Appl. No. 10/319,624, filed Dec. 16, 2002, Ono et al.
U.S. Appl. No. 10/323,837, filed Dec. 20, 2002, Suzuki et al.
U.S. Appl. No. 10/347,746, filed Jan. 22, 2003, Suzuki et al.
U.S. Appl. No. 10/375,036, filed Feb. 28, 2003, Suzuki et al.
U.S. Appl. No. 10/382,530, filed Mar. 7, 2003, Hayashi et al.
U.S. Appl. No. 10/386,654, filed Mar. 13, 2003, Amada et al.
U.S. Appl. No. 10/438,065, filed May 15, 2003, Sakai et al.
U.S. Appl. No. 10/608,210, filed Jun. 30, 2003, Suzuki et al.
U.S. Appl. No. 10/448,413, filed May 30, 2003, Itabashi.
U.S. Appl. No. 10/460,410, filed Jun. 13, 2003, Sakai et al.
U.S. Appl. No. 10/460,181, filed Jun. 13, 2003, Itabashi.
U.S. Appl. No. 10/609,577, filed Jul. 1, 2003, Nakajima et al.
U.S. Appl. No. 10/621,572, filed Jul. 18, 2003, Itabashi.
U.S. Appl. No. 10/617,033, filed Jul. 11, 2003, Amada et al.
U.S. Appl. No. 10/635,520, filed Aug. 7, 2003, Sakai et al.
U.S. Appl. No. 10/665,287, filed Sep. 22, 2003, Kubo.
U.S. Appl. No. 10/840,369, filed May 7, 2004, Itabashi et al.

* cited by examiner

WHEN $\alpha$ IS SMALL;
$\beta 0 = (n-1)\alpha$

SHIFT IN POSITION OF DOT IN SECONDARY SCANNING DIRECTION
DUE TO CHANGE IN SPEED ON INTERMEDIATE TRANSFER BELT

CORRECTION OF POSITION OF BEAM SPOT

RANGE THAT CANNOT BE USED m = 10 TIMES
f col = 15 [mm]
$\theta$ = 2.9 [°]
n = 1.514 ; BK7 ($\lambda$ = 655nm)

SECONDARY SCANNING DIRECTION

MAIN SCANNING DIRECTION

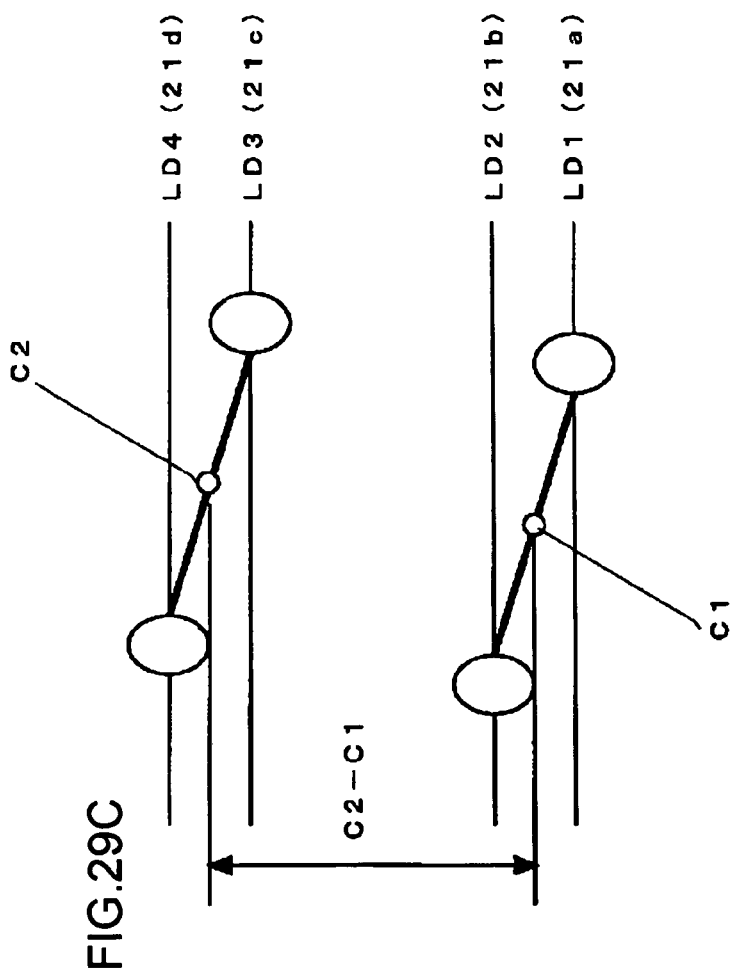
FIG.29C
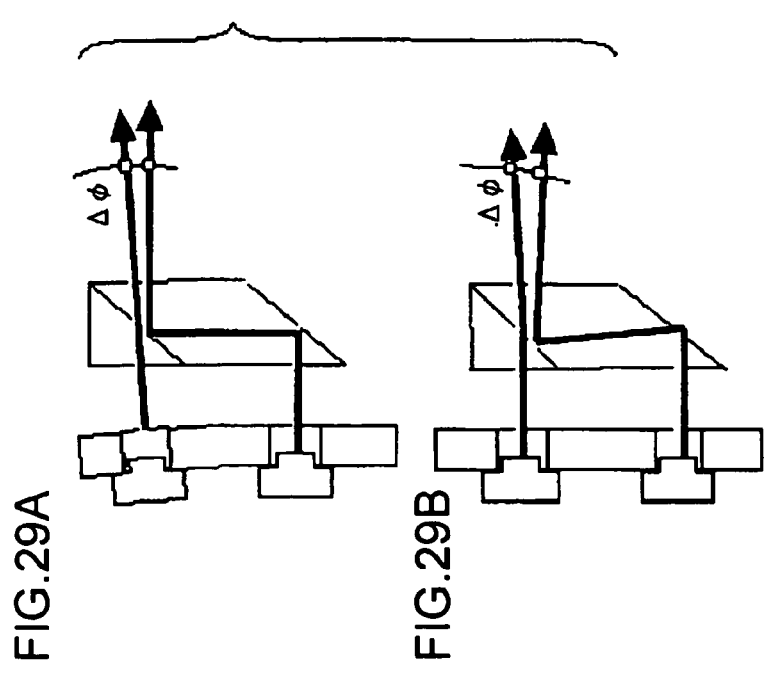
FIG.29A
FIG.29B

OPTICAL SCANNING APPARATUS, IMAGE FORMING APPARATUS, AND BEAM POSITIONING METHOD

CROSS-REFERENCE TO RELATED APPLICATIONS

The present document incorporates by reference the entire contents of Japanese priority document, 2003-129480 filed in Japan on May 7, 2003, 2003-198022 filed in Japan on Jul. 16, 2003 and 2003-198068 filed in Japan on Jul. 16, 2003.

BACKGROUND OF THE INVENTION

1) Field of the Invention

The present invention relates to an optical scanning apparatus, an image forming apparatus, and a beam positioning method.

2) Description of the Related Art

One of the methods to increase recording speed of an image forming apparatus such as a laser printer or a digital copier is to increase rotation speed of a polygon mirror of an optical scanning apparatus that is used in a laser recording system of the image forming apparatus. However, with this method, improvement of the recording speed is limited due to problems with durability, noise, and vibration of a motor, as well as modulating speed of a laser. To cope with the problem, an optical scanning apparatus with a function of recording a plurality of lines simultaneously by scanning a plurality of beams at a time has been proposed. A light source that can emit a plurality of light beams at a time is called as a multi-beam light source.

A light source with a semiconductor laser array is one of the examples of the multi-beam light source, including a plurality of light-emitting points, i.e. light-emitting channels in one package. However, it is difficult to increase the number of channels in a manufacturing process of the semiconductor laser. It is also difficult to eliminate the effect of thermal and electrical crosstalk, and to shorten the wavelength. For these reasons, the multi-beam light source of this type is supposed to be expensive.

On the other hand, in a single-beam semiconductor laser the shortening of the wavelength is comparatively easier and it can be manufactured at a low cost. For these reasons, the single-beam laser has been used generally in various industrial fields. A large number of multiple-beam scanners and light sources in which the single-beam semiconductor laser or the multi-beam semi conductor laser is used as a light source and a plurality of laser beams is combined by using a beam-combining unit, have been proposed. A four-drum tandem image forming apparatus which is described below is an example.

In recent years, with a demand for a high-speed color image forming apparatus, a digital copier or a laser printer in which four photosensitive drums are arranged in a direction of transfer of a recording paper to achieve a color image, has been put to practical use. The digital copier or a laser printer with four photosensitive drums includes a plurality of scanning optical systems corresponding to each of the photosensitive drums. The scanning optical systems expose the photosensitive drums simultaneously to form latent images. A developing unit that uses toners of different colors such as yellow, magenta, black, and cyan, visualizes the latent images. The visualized images are transferred by superimposing one after another on a transfer paper and thus a color image is formed. This is called as four-drum tandem image forming apparatus.

The four-drum tandem image forming apparatus is favorable for outputting a printed image at high speed since as compared to a single drum image forming apparatus, it is capable of forming and outputting both a color and a monochrome image with the same speed. However, on the other hand, since it is necessary to provide four scanning optical systems corresponding to four photosensitive drums, reducing the size of the apparatus remains to be a problem. Moreover, a technical problem of reducing the color shift when the toner images that are developed at the photosensitive drum as the image carriers are transferred to the recording medium by superimposing remains to be solved. The color shift is in a main scanning direction and a second scanning direction.

Following are the causes of the color shift in the secondary scanning direction:

(1) Unevenness in feeding speed in a circumferential direction (secondary scanning direction) of the photosensitive drum;
(2) Unevenness in feeding speed in a circumferential direction (secondary scanning direction) of an intermediate transferring body;
(3) Positional error between the photosensitive drums;
(4) Shift in beam-spot writing position between the scanning optical systems; and
(5) Shift in position due to environmental changes like (1) to (4) or temperature changes during continuous printing.

While performing writing by multi-beam on all photosensitive drums simultaneously, since rotations of a polygon scanner which is a light deflector and feeding speed of the photosensitive drum which are not synchronized in general, there is a possibility of a shift in the number of beams only in the secondary scanning direction.

The following method has been known for reducing the color shift.

Firstly, a technology in which, in an image forming apparatus that uses a plurality of scanners, scanning lines in all the photosensitive drums are matched by adjusting all the scanning units or the overall housing corresponding to the photosensitive drums is disclosed in Japanese Patent Application Laid-open Publication No. 2001-133718. However, according to the conventional technology disclosed, the mechanism required for the adjustment is complicated and it takes time for the adjustment. Further, since the housing which is heavy in weight is adjusted, it is difficult to deal with changes with the lapse of time such as a change in temperature, and precise correction of the color shift during printing or in the environment where the apparatus is used, cannot be carried out.

Secondly, as another solution to the problems mentioned above, a method of controlling the position of the secondary beam by using a galvanic mirror is disclosed in Japanese Patent Application Laid-open Publication No. 2001-100127. However, since the sensitivity of the galvanic mirror is too high to control the position of the secondary scanning beam, it is affected easily by the external vibrations. For this reason, to secure an appropriate beam spot, a profile irregularity as high as about four times that of the transmitting surface is sought.

Thirdly, as an invention to solve the problem of shift between the multi-beams, a color image forming apparatus characterized by including a correcting unit to correct the color shift, is disclosed in Japanese Patent Application Laid-open Publication No. H10-239939. In this color image forming apparatus, the correcting unit carries out correction of the color shift by adjusting the starting position of image writing (writing-start position) for each color in a secondary scanning direction by changing to a laser beam that writes an image on the photosensitive drum first, from among the plurality of laser beams in accordance with a phase relationship of a intermediate transfer reference signal and a line synchronization signal. However, even by using this type, the minute correction of less than one line cannot be carried out. Therefore, for writing 600 dots per inch (dpi), for example, there is a color shift of at least 42 µm.

Conventionally, there has been a method of increasing the rotational speed of the polygon mirror which is a deflecting scanning unit that improves the recording speed in an optical sensor that writes an image by emitting a light beam on a medium to be scanned, has been used. However, due to problems such as durability, noise and vibrations of a motor, and modulating speed of laser, there are limitations on the rotational speed that can be set. To overcome this problem, there is a method of recording a plurality of lines simultaneously by scanning a plurality of light beams at a time.

The multi-beam light source that emits a plurality of laser beams, in which a multi-beam semiconductor laser (for example, a semiconductor laser array) which includes a plurality of light emitting points (light emitting channels) in one package, is one of the examples of the multi-beam light source. However, it is difficult to increase the number of channels in the manufacturing process of the semiconductor laser. It is also difficult to eliminate the effect of thermal and electrical crosstalk, and to shorten the wavelength. For these reasons, the multi-beam light source of this type is supposed to be expensive.

On the other hand, in a single-beam semiconductor laser, the shortening of the wavelength is comparatively easier and it can be manufactured at a low cost. For these reasons, the single-beam semiconductor laser has been used generally in various industrial fields. A large number of multiple-beam scanners and light sources in which the single beam semiconductor laser (or the multi-beam semiconductor laser) is used as a light source and a plurality of laser beams is combined by using a beam-combining unit, have been proposed.

Thus, a method of combining a plurality of laser beams by using the beam-combining unit has many advantages regarding aspects such as shortening of wavelength and reducing the cost. Another advantage is that the adjustment (setting) of a distance between beam spots (beam pitch; distance between scanning lines) in a secondary scanning direction in a surface subjected to scanning, can be carried out easily by deflecting minutely the direction of emission of each laser beam.

While using the semiconductor laser array as a light source, it is necessary to rotate the semiconductor laser array roughly around optical axis to change the distance between the beam spots. Therefore, the amount of light becomes insufficient due to distribution of a divergence angle of a laser beam that is emitted from the semiconductor laser array and it may be difficult to reduce the diameter of the beam spot in the surface subjected to scanning to a smaller diameter.

However, as compared to a method of using the semiconductor laser array as a light source, in a method of combining the plurality of laser beams by using the beam-combining unit, the direction of emission tends to change easily due to the effect of the environmental changes and changes in elapsed time, and the distance between the beam spots in the surface subjected to scanning tend to change.

A conventional technology to solve these problems, in which the light beams emitted from the plurality of light sources are combined by using a beam-combining prism, is disclosed in Japanese Patent Application Laid-open Publication No. H10-215351. According to this patent document, the position of beam spot on the surface subjected to scanning is adjusted by adjusting the direction of emission of the light beam by shifting a cylindrical lens which forms a line image on a reflecting surface of the polygon mirror.

A technology in which the light beams emitted from the plurality of light sources is combined by using a half mirror in a multi-beam scanning and the multi-beam scanner is disclosed in Japanese Patent Application Laid-open Publication No. H9-189873. According to this technology, the position of the beam spot on the surface subjected to scanning is adjusted by adjusting the direction of emergence of the light beam by adjusting an inclination of the light source and an inclination of a galvanic mirror that is disposed in an optical path.

A technology to deflect a laser beam by constructing an optical deflector by using a change in the refractive index of an opto-electric material (such as lithium niobate) that has an opto-electric effect is disclosed in Japanese Patent Application Laid-open Publication No. H 10-282531.

A method of adjustment of light beam, a multi-beam scanner, and an optical scanning apparatus are disclosed in Japanese Patent Application Laid-open Publication No. 2002-174785. According to the method of adjustment of light beam, the multi-beam scanner, and the optical scanning apparatus, two dioptric systems without an image forming function are disposed in an optical path of at least one light beam from among a plurality of light beams from a light source that has a plurality of light emitters. At least one of position and direction of a light beam that is transmitted through the dioptric system is adjusted by changing spatial condition of the dioptric system.

A progress is being made in using optical elements made from plastic in an optical writing system to reduce the cost. So far, all optical elements made from glass have been used and the optical elements were coated to prevent reflection. However, if the optical elements made from plastic are used, there are various problems from technical as well as cost point of view in coating the optical elements made from plastic and there has been a tendency to omit coating process.

For this reason, an amount of ghost light due to reflection between surfaces of lenses which doesn't cause any problem in a case of a glass prism which is coated to prevent reflection, is large in a case of the plastic lens for which the coat to prevent reflection is omitted. Further, due to an improved sensitivity of photosensitive drums in recent years, the ghost light appears as an image, thereby deteriorating the image quality. Particularly, in a case of the ghost light that occurs irrespective of the rotation of the deflector, since the same position is irradiated without being scanned, although it is a minute amount of energy, the amount of light is substantial when accumulated. This light appears as an image, thereby deteriorating the image quality.

As a measure to deal with the ghost light, various technologies have been proposed so far. A method to prevent the ghost light before the deflector is disclosed in Japanese Patent Application Laid-open Publication No. H9-274134. According to this method, the ghost light is prevented before the deflector by using an arrangement in which an optical window that is formed by a transparent body is tilted in a secondary scanning direction and the ghost light due to the reflection at a front surface or a rear surface of the optical window is not allowed to reach a medium that is subjected to scanning.

Moreover, a technology in which the ghost light is removed from an optical axis by tilting a cylindrical lens is disclosed in Japanese Patent Application Laid-open Publication No. H6-82620. A technology in which a scanning lens system is allowed to be decentered so that the ghost light doesn't reach the medium subjected to scanning is disclosed in Japanese Patent Application Laid-open Publication No. H7-230051. Further, a technology in which the scanning lens system is allowed to be decentered so that the ghost light doesn't reach the medium subjected to scanning is disclosed in Japanese Patent Application Laid-open Publication No. 2001-264665.

An improvement in an output speed has been sought. To meet this demand, an improvement has been made in the rotational speed of the rotating polygon mirror in the optical writing unit. However, there are limitations on the improvement in the rotational speed, and the speed has been raised by using a plurality of light sources (combination of laser diodes (LDs)) and a plurality of light emitting points (LD Array). Various structures of light source have been proposed so far. In a case of a multi-beam light source that causes a plurality of light beams to scan the photosensitive drum simultaneously, a method of adjusting the distance between the light beams has been complicated.

In the method of combining a plurality of laser beams by using the beam-combining unit, there are many advantages from the point of view of shortening the wavelength and reducing the cost. Moreover, in cases of making an attempt to adjust and to set the distance between the beam spots (in other words beam pitch: distance between the scanning lines) in the secondary scanning direction in the surface that is subjected to scanning, there is an advantage that the adjustment and the setting can be made by deflecting minutely the direction of emission of each laser beam. However, when the semiconductor laser array is used as a light source, the semiconductor laser array is to be turned roughly around the optical axis to change the distance between the beam spots. Therefore, the amount of light is insufficient due to the distribution of the angle of divergence of the laser beam that is emitted from the semiconductor laser array and it has been difficult to reduce the diameter of the beam spot of the surface to be scanned to a smaller diameter.

When the method of combining the laser beams by the beam-combining unit and the method of using the semiconductor laser array as a light source are compared, in a case of the method of combining the laser beams by using the beam-combining unit, due to the environmental changes and changes in the elapsed time, the direction of emission of each laser beam tends to change easily and the distance between the beam spots in the surface subjected to scanning changes.

In the four-drum tandem image forming apparatus, for example, in a full color copier, four photosensitive drums corresponding to four colors viz. cyan (C), magenta (M), yellow (Y), and black (K) are disposed in a row along a carrier surface of a transfer belt. Further a beam scanner that is provided corresponding to each photosensitive drum, scans beam on each photosensitive drum, forms an electrostatic latent image on a surface of each photosensitive drum, as well as visualizes each of the electrostatic latent images with toner of the corresponding color. The visualized images are transferred by superimposing one after another on a sheet that is carried by the transfer belt, thereby forming a multicolor image. Due to this, if there is a shift in a scanning position in an independent secondary scanning direction for each color, the image quality is deteriorated and there is a color shift.

According to Japanese Patent Application Laid-open Publication No. H10-215351 and H9-189873, it is quite possible that the designing of the adjustment sensitivity is difficult. Further, according to Japanese Patent Application Laid-open Publication No. H10-282531, there has been a possibility of occurrence of problems such as a big size of the apparatus and high voltage for driving. According to Japanese Patent Application Laid-open Publication No. 2002-174785, there has been a need to dispose two dioptric systems in one optical path.

When a structure is made according the technology disclosed in the Japanese Patent Application Laid-open Publication No. H9-274134, if the cylindrical lens is inclined due to assembling error, the light reflected inside the lens becomes ghost light. This problem is described in detail in embodiments of the present invention.

If the method according to the technology disclosed in Japanese Patent Application Laid-open Publication No. H6-82620 is used, the lens optical axis of the light beam is shifted (decentered) due to inclined cylindrical lens, thereby deteriorating the wave front aberration. This results in thickening of the diameter of the beam spot.

The technology disclosed in Japanese Patent Application Laid-open Publication No. H7-230051 is regarding the scanning optical system from the deflector (polygon scanner) onward, and the ghost light due to an optical element before the polygon has not been considered.

The technology disclosed in Japanese Patent Application Laid-open Publication No. 2001-264665 is regarding the reflection between the scanning optical elements from the deflector onward, and the ghost light due to optical elements before the polygon have not been considered.

Moreover, a method of easily adjusting the distance of each light beam in a case of using a plurality of scanning light beams has been sought.

SUMMARY OF THE INVENTION

It is an object of the present invention to solve at least the problems in the conventional technology.

The optical scanning apparatus according to one aspect of the present invention includes M number of light sources that includes M number of semiconductor lasers and M number of coupling lenses, where M is a positive integer; a deflecting scanning unit that deflects laser beams from the M number of light sources to a surface to be scanned; and a transmission-type prism that deflects optical path of the laser beam from at least one of the M number of light sources by an infinitesimal amount of angle. The transmission-type prism is disposed between the M number of light sources and the deflecting scanning unit, has an incident surface and an output surface nonparallel to each other, and can rotate around an axis of rotation substantially parallel to the optical path of the laser beam.

The image forming apparatus according to another aspect of the present invention includes an optical scanning apparatus that includes M number of light sources that includes M number of semiconductor lasers and M number of coupling lenses, where M is a positive integer; a deflecting scanning unit that deflects laser beams from the M number of light sources to a surface to be scanned; and a transmission-type prism that deflects optical path of the laser beam from at least one of the M number of light sources by an infinitesimal amount of angle. The transmission-type prism is disposed between the M number of light sources and the deflecting scanning unit, has an incident surface and an output surface nonparallel to each other, and can rotate around an axis of rotation substantially parallel to the optical path of the laser beam.

The optical scanning apparatus according to still another aspect of the present invention includes a deflecting scanning unit that deflects laser beams from a plurality of light sources to a plurality of image carriers to scan in a main scanning direction; at least one transmission-type prism that deflects the laser beam from at least one of the light sources by an infinitesimal amount of angle; and a writing position correcting unit that varies a position of a beam spot in a secondary scanning direction by adjusting rotation of the at least one transmission-type prism around an optical axis to control a position of a scanning line on the image carrier. The transmission-type prism is disposed between the M number of light sources and the deflecting scanning unit, has an incident surface and an output surface nonparallel to each other, and can rotate around an axis of rotation substantially parallel to the optical path of the laser beam.

The image forming apparatus according to still another aspect of the present invention includes an optical scanning apparatus that includes a deflecting scanning unit that deflects laser beams from a plurality of light sources to a plurality of image carriers to scan in a main scanning direction; at least one transmission-type prism that deflects the laser beam from at least one of the light sources by an infinitesimal amount of angle; and a writing position correcting unit that varies a position of a beam spot in a secondary scanning direction by adjusting rotation of the at least one transmission-type prism around an optical axis to control a position of a scanning line on the image carrier. The transmission-type prism is disposed between the M number of light sources and the deflecting scanning unit, has an incident surface and an output surface nonparallel to each other, and can rotate around an axis of rotation substantially parallel to the optical path of the laser beam.

The optical scanning apparatus according to still another aspect of the present invention includes a first light source that includes a plurality of light emitting elements; a second light source that includes a plurality of light emitting elements; a beam combining unit that combines a first light beam from the first light source and a second light beam from the second light source, and outputs a combined light beam; a deflecting scanning unit that deflects the combined light beam to scan a surface to be scanned; and a transmission-type prism that is disposed in optical path of at least one light beam between the beam-combining unit and at least one of the first light source and the second light source, and deflects the at least one light beam by a predetermined angle.

The image forming apparatus according to still another aspect of the present invention includes an optical scanning apparatus that includes a first light source that includes a plurality of light emitting elements; a second light source that includes a plurality of light emitting elements; a beam combining unit that combines a first light beam from the first light source and a second light beam from the second light source, and outputs a combined light beam; a deflecting scanning unit that deflects the combined light beam to scan a surface to be scanned; and a transmission-type prism that is disposed in optical path of at least one light beam between the beam-combining unit and at least one of the first light source and the second light source, and deflects the at least one light beam by a predetermined angle.

The beam positioning method according to still another aspect of the present invention is based on rotating a transmission-type prism. The beam positioning is performed by an optical scanning apparatus including a first light source that includes a plurality of light emitting elements; a second light source that includes a plurality of light emitting elements; a beam combining unit that combines a first light beam from the first light source and a second light beam from the second light source, and outputs a combined light beam; a deflecting scanning unit that deflects the combined light beam to scan a surface to be scanned; and a transmission-type prism that is disposed in optical path of at least one light beam between the beam-combining unit and at least one of the first light source and the second light source, and deflects the at least one light beam by a predetermined angle.

The optical scanning apparatus according to still another aspect of the present invention includes a first imaging optical system that couples a divergent light beam from a light source; a second imaging optical system that leads light from the first imaging optical system to form a line image near a deflecting reflection surface; a deflector that includes the deflecting reflection surface; and a third imaging optical system that forms an image by forming a light spot with light beam deflected and reflected by the deflector on a surface to be scanned. The second imaging optical system has a first optical axis that is normal to an incident surface and a second optical axis that is normal to an output surface. The first optical axis and the second optical axis are nonparallel to each other.

The optical scanning apparatus according to still another aspect of the present invention includes a first imaging optical system that couples a divergent light beam from a light source; a second imaging optical system that leads light from the first imaging optical system to form a line image near a deflecting reflection surface; a deflector that includes the deflecting reflection surface; and a third imaging optical system that forms an image by forming a light spot with light beam deflected and reflected by the deflector on a surface to be scanned. An incident direction of a light beam on the second imaging optical system and an output direction of a light beam from the second imaging optical system are nonparallel.

The image forming apparatus according to still another aspect of the present invention includes an optical scanning apparatus that includes a first imaging optical system that couples a divergent light beam from a light source; a second imaging optical system that leads light from the first imaging optical system to form a line image near a deflecting reflection surface; a deflector that includes the deflecting reflection surface; and a third imaging optical system that forms an image by forming a light spot with light beam deflected and reflected by the deflector on a surface to be scanned. The second imaging optical system has a first optical axis that is normal to an incident surface and a second optical axis that is normal to an output surface. The first optical axis and the second optical axis are nonparallel to each other.

The image forming apparatus according to still another aspect of the present invention includes an optical scanning apparatus that includes a first imaging optical system that couples a divergent light beam from a light source; a second imaging optical system that leads light from the first imaging optical system to form a line image near a deflecting reflection surface; a deflector that includes the deflecting reflection surface; and a third imaging optical system that forms an image by forming a light spot with light beam deflected and reflected by the deflector on a surface to be scanned. An incident direction of a light beam on the second imaging optical system and an output direction of a light beam from the second imaging optical system are nonparallel.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 29A is a schematic for illustrating an error in beam-combining due to the surface on which the light source is fixed not being flat;

FIG. 29B is a schematic for illustrating an error in beam-combining due to an error in processing of the beam-combining prism;

FIG. 29C is a schematic of positions of beam spots when there is an error in beam-combining;

DETAILED DESCRIPTION

Figure 1:
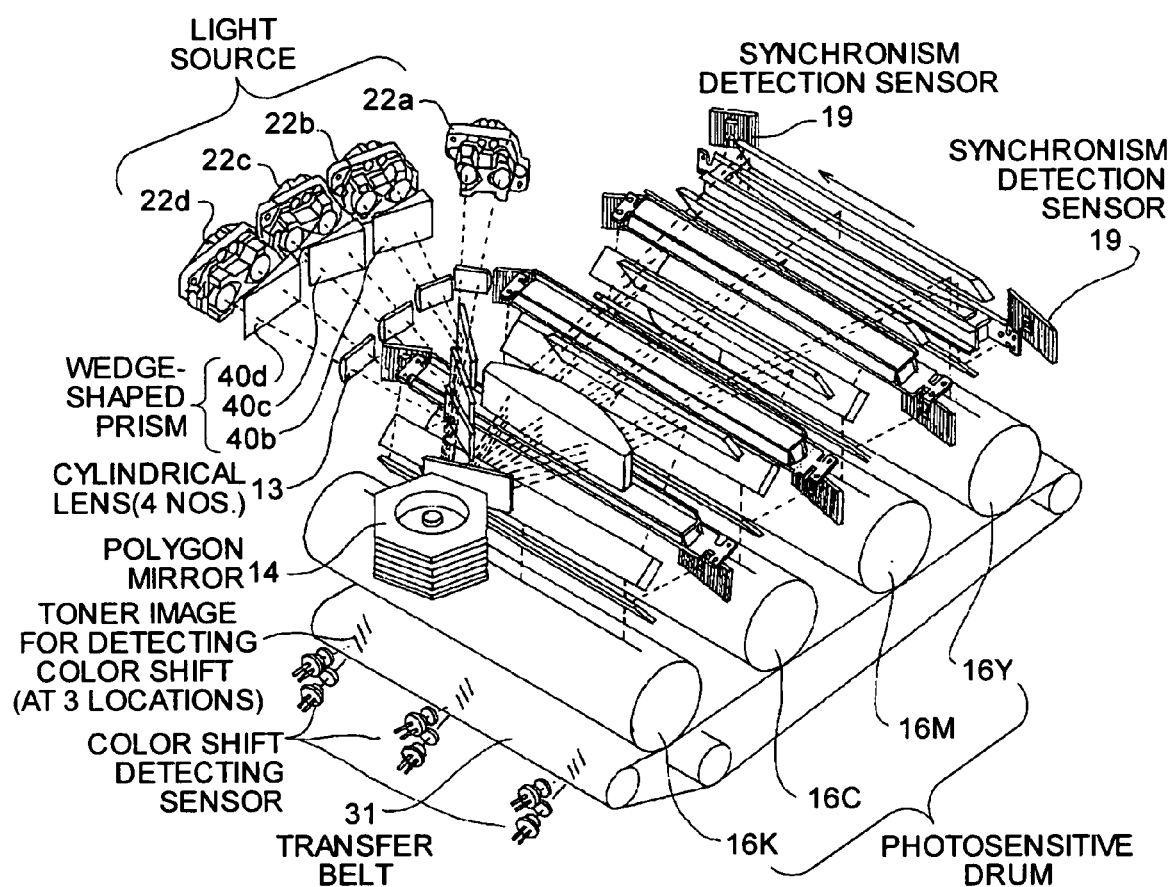
FIG. 1 is a perspective view of an image forming apparatus according to an embodiment of the present invention.

Exemplary embodiments of an optical scanning apparatus, an image forming apparatus, and a beam positioning method according to the present invention are described in detail below with reference to the accompanying drawings. The present invention is not limited to the embodiments described below.

To start with, a first embodiment of a four-beam optical scanning apparatus 18 shown in FIG. 7 to FIG. 10 is described below. Each of a first light source 41 and a second light source 42 include two sets of semiconductor lasers 11a to 11d (11a, 11c and 11b, 11d), coupling lenses 12a to 12d which couple laser beams emerged from the semiconductor lasers 11a to 11d, and base members 43a and 43b which hold the semiconductor lasers 11a to 11d and the coupling lenses 12a to 12d. The semiconductor lasers 11a to 11d are fixed by press fitting into the base members 43a and 43b. The coupling lenses 12a to 12d are fixed by using an ultraviolet (UV) curing adhesive after the adjustment of relative positional relationship with the semiconductor laser. The adjustment is carried out by adjusting characteristics of emergent beam such as collimation and directionality of an optical axis of the emergent light in accordance with characteristics of an optical scanning system onward. The methods for fixing the semiconductor laser and the coupling lenses are not limited to these methods and any known method may be used. The semiconductor laser may be a single-beam semiconductor laser that has one light emitting point or a multi-beam semiconductor laser that has a plurality of light-emitting points.

Figure 7:
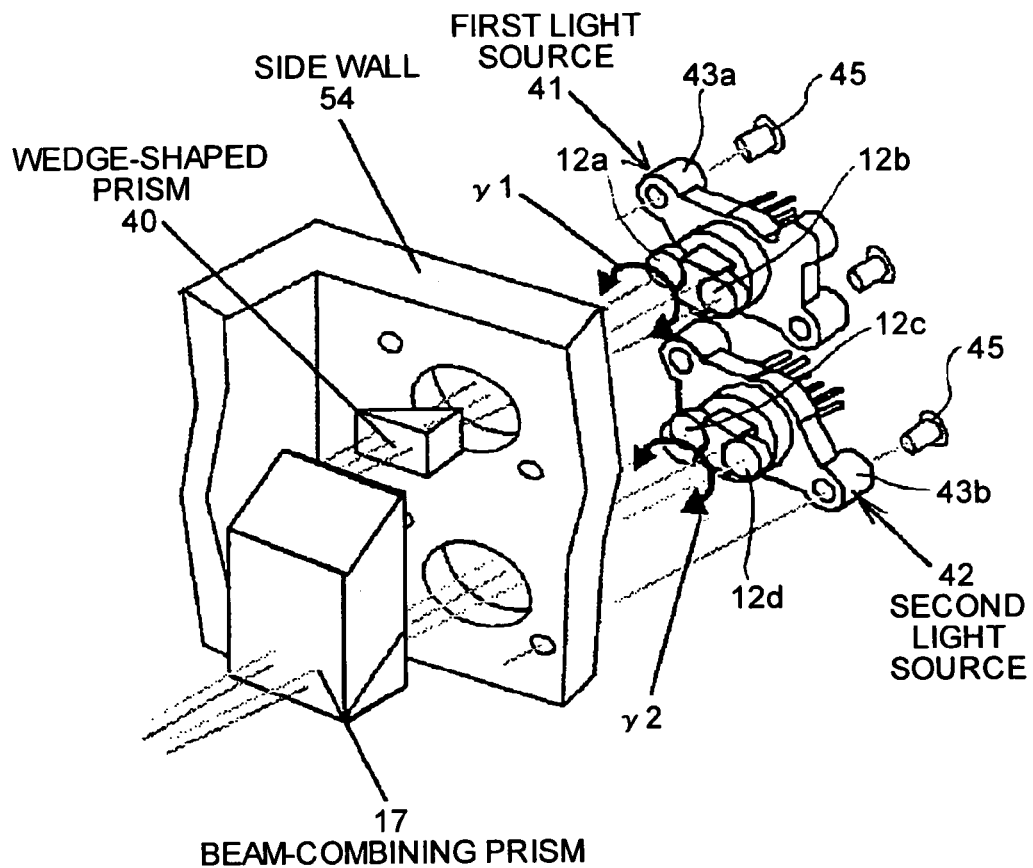
FIG. 7 is an exploded perspective view of an arrangement of the wedge-shaped prism.

A beam-combining prism 17 shown in FIG. 7 brings the two laser beams emerged from the first light source 41 and the second light source 42 respectively, close to each other and combine. A wedge-shaped prism 40 is disposed in optical paths of two laser beams emerged from the first light source 41. The wedge-shaped prism 40 is disposed towards a side of the light source from the beam-combining prism 17. In this example, a common wedge-shaped prism 40 for two laser beams is disposed in the optical path of the two laser beams emerged from the first light source 41 and the wedge-shaped prism 40 is held such that it can be rotated around an optical axis of the laser beam by an actuator that is shown the diagram (for example, an actuator that has a structure shown in FIG. 5 that is described later).

Although the first light source 41 and the second light source 42 are sources which emit two beams each, light sources with three or more than three pairs of the semiconductor lasers and the coupling lens which emit not less than three beams may be used.

An optical path of the light beam that is transmitted through the wedge-shaped prism 40 is deflected by causing the wedge-shaped prism 40 to rotate around the optical axis. The deflection of the optical path is shown in FIG. 2. As shown in FIG. 2, by causing the wedge-shaped prism 40 to rotate around the optical axis, an angle of deflection can be changed to maximum β0 by refraction in the wedge-shaped prism 40. If an apex angle of the wedge-shaped prism 40 is α and refractive index of the wedge-shaped prism 40 is n, the maximum angle of deflection β0 is expressed by $$\beta 0 = (n-1) \times \alpha \tag{1}$$

If the focal length of a collimating lens is fcol, the secondary scanning lateral magnification of all the optical systems is m, and an angle of adjustment around an axis of rotation of the wedge-shaped prism 40 is Δγ, then the correction amount Δz in the secondary scanning direction on a surface of a photosensitive cylinder is expressed by $$\Delta z = m \times \text{fcol} \times \tan(\beta 0 \times \sin \Delta \gamma) \tag{2}$$

Figure 5:
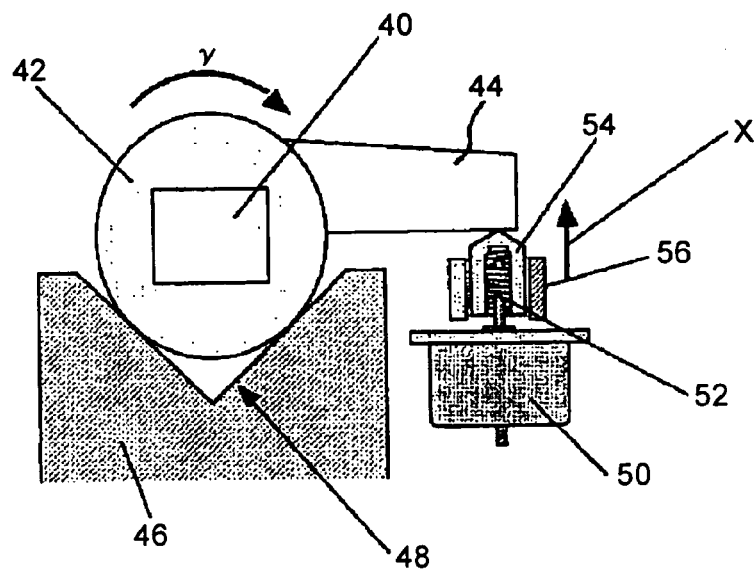
FIG. 5 is a front view of an example of a rotating mechanism of the wedge-shaped prism that can be used in the present invention.

An example of a rotating mechanism in which the wedge-shaped prism 40 rotates around the axis of rotation is shown in FIG. 5. A rotation-adjusting unit of the wedge-shaped prism 40 is a lead-screw actuator which is driven by a stepping motor 50. The wedge-shaped prism 40 is held by fixing in a prism cell 42 which is circular cylindrical in shape. The prism cell 42 is disposed in a V-shaped groove 48 in a holder 46 and is in contact with two slanting walls of the groove 48. Supported by the slanting walls, the prism cell 42 can rotate around the line of the center axis as a center of rotation. An arm 44 is extended from an outer surface of the prism cell 42. The arm 44 is in contact with a tip of a nut 54 that is screwed on a lead screw 52 of an output shaft of the stepping motor 50. The nut 54 is locked by a guide 56 and is structured such that it moves up and down along a guide 55 with rotation of the lead screw 52. The actuator that adjusts the rotating position of the wedge-shaped prism includes the stepping motor 50, the lead screw 52, and the nut 54.

An amount of shift Δz of a beam spot on a surface subjected to scanning in the secondary scanning direction when the wedge-shaped prism 40 is rotated by the actuator such as one mentioned above, can be expressed by the following equation (3) by using the following parameters fcol: focal length of collimating lens
m: secondary scanning magnification of all optical systems
α: apex angle of wedge-shaped prism
n: refractive index of wedge-shaped prism
β0: angle of deflection of wedge-shaped prism=(n−1)×α
N: number of input pulses (steps)
Δγ: angle of rotation of triangular prism per N pulses (=tan$^{-1}$(Θ/360°)×P×N/R)
Θ: step angle
P: pitch of lead screw
R: length of span of wedge-shaped prism cell
fcyl: focal length of cylindrical lens
m1: secondary scanning magnification of optical system before polygon
m2: secondary scanning magnification of optical system after polygon $$\Delta z = m \times fcol \times \tan\beta 0 \times \sin\Delta\gamma \tag{3}$$
$$= m \times fcol \times \tan\{(n-1)\alpha\} \times \sin[\tan^{-1}\{(\Theta/360°) \times P \times N/R\}]$$

$$\Delta\gamma = \tan^{-1}[(\Theta/360°) \times P \times N/R] \tag{4}$$

According to equation (3), it is possible to adjust the position of a secondary scanning beam spot corresponding to the number of input pulses. The apex angle α of the wedge-shaped prism 40 can be set appropriately such that it is designed to match with an optical system that is combined. By adjusting the apex angle α, it is possible to optimize an amount of change in the position of the secondary scanning spot for the number of input steps, i.e. sensitivity of the adjustment.

The wedge-shaped prism 40 may also be structured such that it is disposed corresponding to the optical path of one laser beam or may caused to deflect a plurality of beams simultaneously by disposing commonly in optical paths of the beams.

Figure 9:
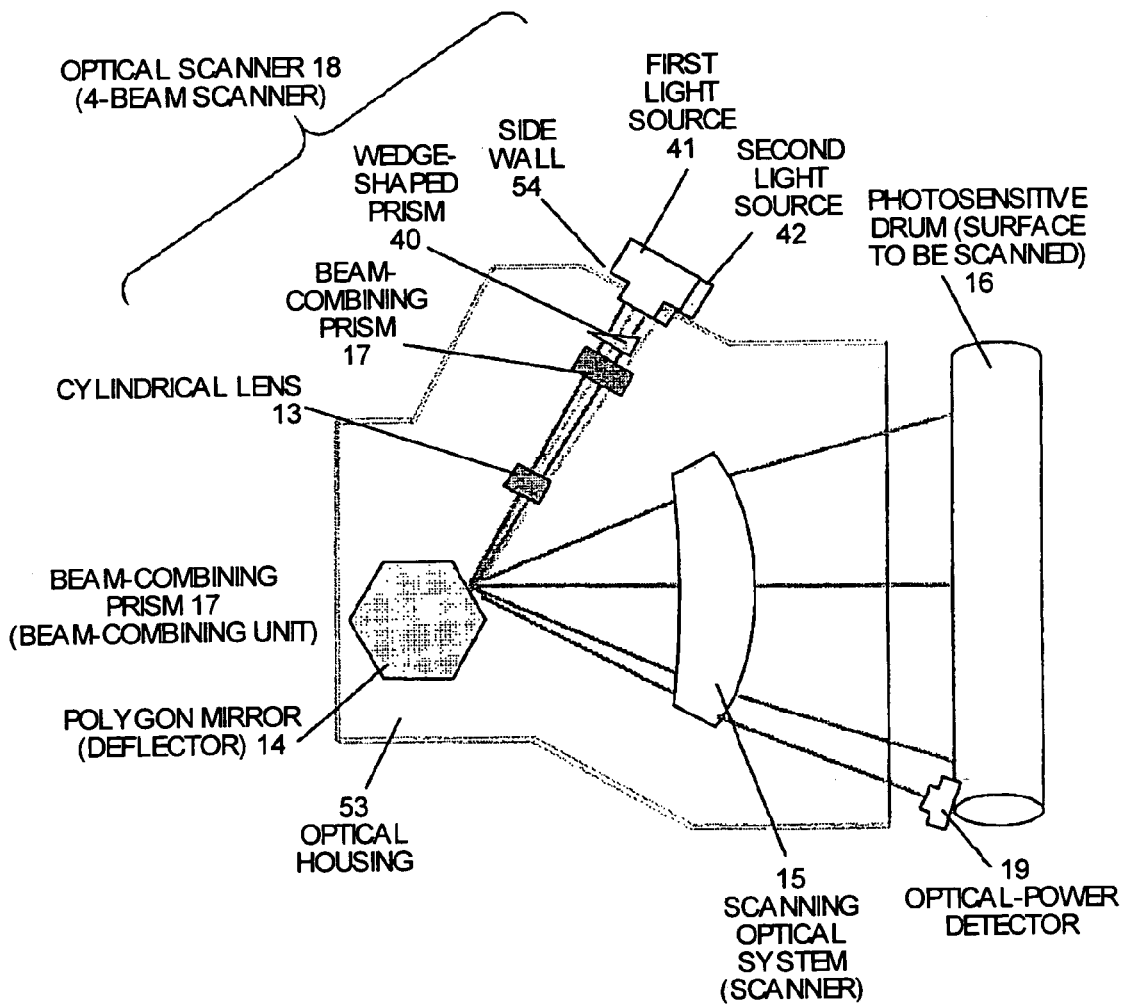
FIG. 9 is a top view of an optical scanning apparatus according to the present invention.

As shown in FIG. 9, four laser beams combined by the beam-combining prism 17 are reflected upon deflection at a deflector that includes a polygon mirror 14, due to an effect of a cylindrical lens 13, and a scanning optical system 15 scans a surface subjected to scanning which is a surface of a photosensitive drum 16. The four beams output from the light sources 41 and 42 cross near a deflecting and reflecting surface of the polygon mirror 14 which is a deflector in a deflecting surface, i.e. in a main scanning cross-section. The cylindrical lens 13 focuses the laser beams near a surface of the polygon mirror 14 as a long line image in the main scanning direction. If the secondary scanning lateral magnification of all the optical systems is m, secondary scanning magnification of optical system before the polygon mirror is m1, secondary scanning magnification of optical system after the polygon mirror is m2, and the focal length of the cylindrical lens 13 is fcyl, then m=m1×m2, m1=fcyl/fcol, the equation (2) can be expressed as $$\Delta z = m \times fcol \times \tan(\beta 0 \times \sin\Delta\gamma)$$
$$= m \times 2fcyl \times \tan(\beta 0 \times \sin\Delta\gamma).$$

By adopting such a structure, deviation and deterioration of optical performance on the surface of the photosensitive drum 16 such as image forming characteristics, scanning at a constant speed, an effective width of writing which is caused by a difference in reflecting point of each laser beam can be reduced effectively.

Figure 10:
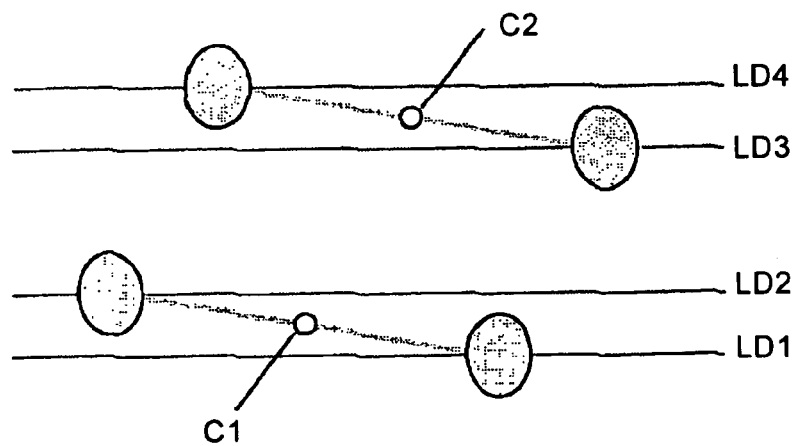
FIG. 10 is a conceptual diagram of beam spots on an image carrier for describing an effect of the rotating mechanism of the wedge-shaped prism that is used in the present invention.

FIG. 10 is an example of beam spots on the surface of the photosensitive drum 16. Reference numerals LD1 and LD2 denote positions of beam spots which are positions of scanning lines of the two laser beams which are emerged from the first light source 41, and reference numerals LD3 and LD 4 denote positions of beam spots of the two laser beams which are emerged from the second light source 42. Further, C1 and C2 denote center positions between LD1 and LD2 and between LD 3 and the LD4 respectively. C1 and C2 denote positions of spots of virtual laser beams which are emerged from the center of the first light source 41 and the second light source 42.

While assembling the four-beam optical scanning apparatus, the beam pitch between LD1 and LD2 which is a distance between the scanning lines, can be adjusted by γ rotation of the first light source 41 (rotation in a direction of an arrow Y1 in FIG. 7). After adjusting the beam pitch, the first light source 41 may be fixed to a side wall 54 by the screw 45. The beam pitch between LD3 and LD4 can be adjusted by carrying out the similar adjustment and fixing the second light source 42.

Figure 11:
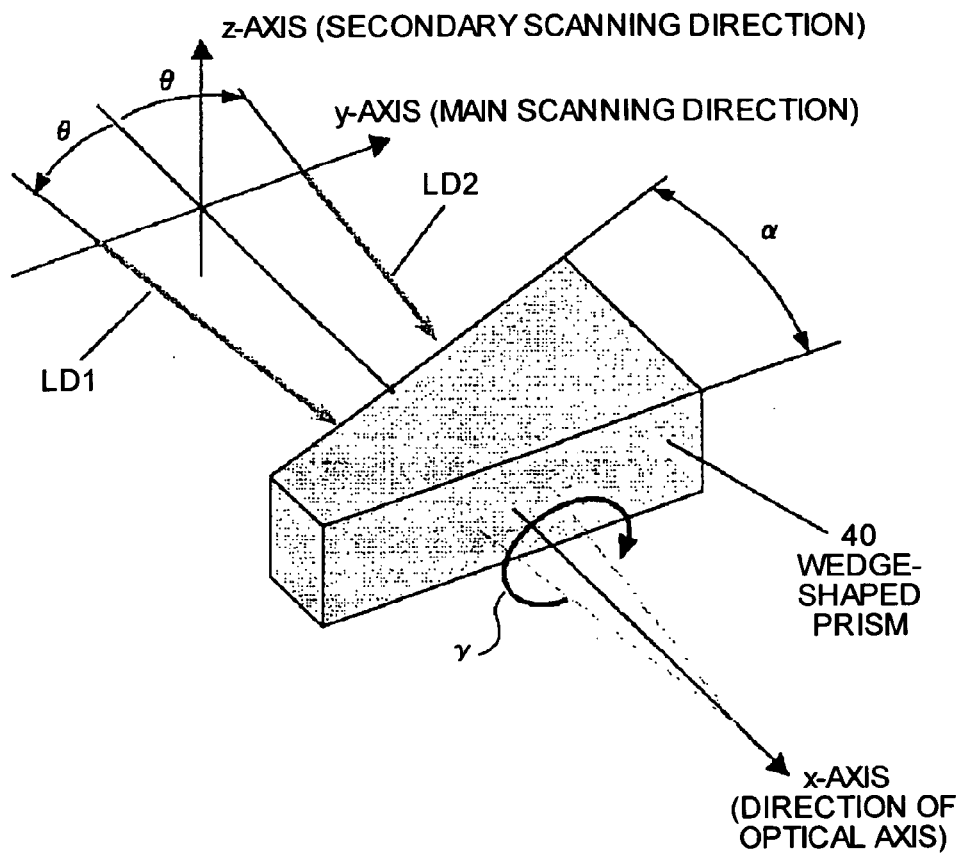
FIG. 11 is a perspective view of rotation of the wedge-shaped prism.

As shown in FIG. 11, if an angle of crossing in the deflecting surface of the two beams (LD1 and LD2) which are emerged from the first light source is 2θ (need not cross necessarily near the polygon mirror), focal length of the coupling lens is fcol, secondary scanning magnification of all systems (from the point of emission of light to a surface subjected to scanning) is m, and an angle of rotation roughly around the optical axis of the light source is γ, then an amount of change Δp of the beam pitch between the two beams LD1 and LD2 is expressed by $$\Delta p = m \times fcol \times \tan\theta \times \sin Y$$

When m=10 times, fcol=15 mm, θ=2°, and Δp=50 μm=0.50 mm, the angle of rotation γ of the light source is $$\gamma = \sin^{-1}\{\Delta p/(m \times fcol \times \tan\theta)\}$$
$$= \sin^{-1}\{0.050/(10 \times 15 \times \tan 2°)\}$$
$$= 0.55°.$$

For adjusting the four beam spots at equal distance, the distance between center positions C1 and C2 may be adjusted to double the beam pitch. The wedge-shaped prism 40 which is disposed in the optical path of the first light source 41 can be used for this adjustment. From equation (3), if n=1.514, α=1.5°, Θ=18°, P=0.25 mm, N=1, and R=16, then $$\Delta z = m \times fcol \times \tan\{(n-1)\alpha\} \times \sin[\tan^{-1}\{(\Theta/360°) \times P \times N/R\}$$
$$= 10 \times 15 \times \tan\{(1.514-1) \cdot 1.5°\} \times$$
$$\sin[\tan^{-1}\{(18/360°) \times 0.25 \times 1/16\}$$
$$= 1.577 \times 10^{-3} \text{ mm} = 1.6 \text{ μm}$$

and the beam spot can be changed by 1.6 μm per pulse i.e. input pulse to the stepping motor. Therefore, when an amount of adjustment ΔC of the distance between the center positions C1 and C2 is 100 μm, i.e. 0.100 mm, the adjustment can be carried out by a pulse input of 64 steps.

Figure 12:
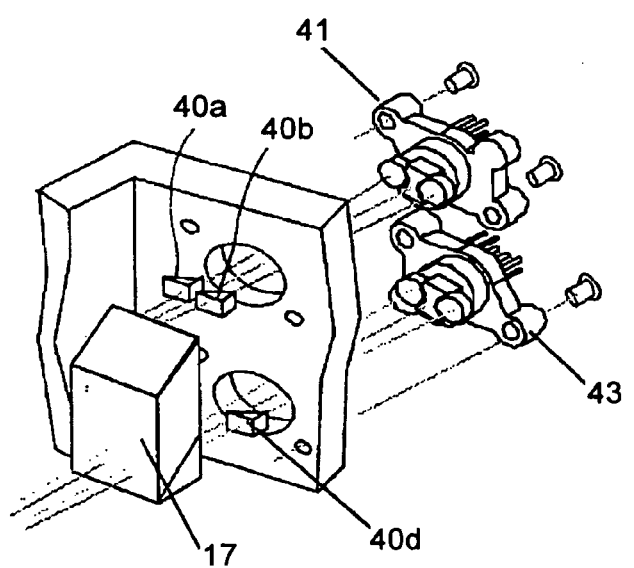
FIG. 12 is an exploded perspective view of another example of the arrangement of the wedge-shaped prisms.

As shown in an embodiment in FIG. 12, wedge-shaped prisms 40a, 40b, 40c, and 40d are disposed in optical paths of laser beams LD respectively and the distance between the scanning lines may be adjusted by rotating the wedge-shaped prisms 40a, 40b, 40c, and 40d independently. However, the wedge-shaped prism 40c is not shown in FIG. 12. The wedge-shaped prism 40c is omitted and one laser beam LD without the wedge-shaped prism is let to be a reference beam. Relational positions of the remaining laser beams LD may be adjusted according to the reference beam.

If the distance between the center positions C1 and C2 changes due to changes in elapsed time and environmental changes, the number of input pulse to the stepping motor 50 (see FIG. 5) is derived based on data of correction of amount of change that is recorded or data of amount of change that is measured by a detector that detects an amount of change, and the correction of the change in the distance is carried of by a unit such as a driving unit.

Figure 6A:
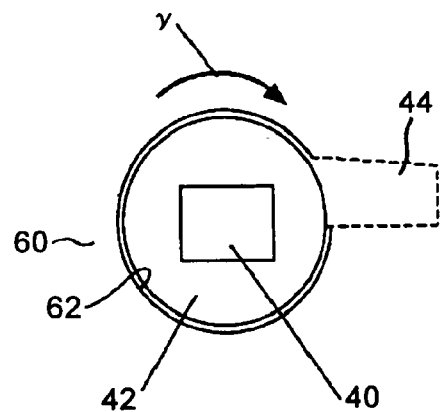
FIG. 6A is a front view of another example of the rotating mechanism of the wedge-shaped prism.
Figure 6B:
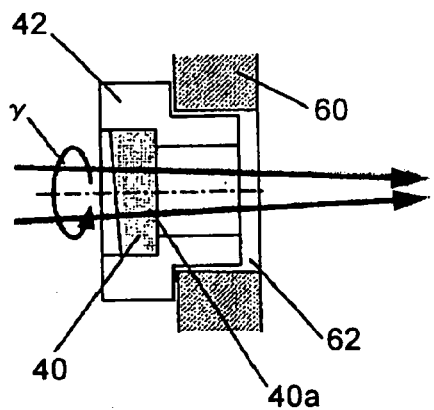
FIG. 6B is a cross-section of the another example of the rotating mechanism of the wedge-shaped prism.

An example of a mechanism for adjustment in which the wedge-shaped prism rotates around the axis of rotation is as shown in FIG. 5. Another example of the mechanism for adjustment of the rotation of the wedge-shaped prism is shown in FIG. 6A and FIG. 6B. In the example shown in FIG. 6, the prism cell 42 which is cylindrical in shape, is inserted into a keyway 62 that is provided on a holder 60. The prism cell 42 is held such that it can rotate with the keyway 62 as a guide for rotation. The prism cell 42 includes an arm 44. The arm 44 is caused to move up and down by an actuator similar to that in FIG. 5. The prism cell 42 is rotated around an axis of rotation that is substantially parallel to the optical path of the laser beam together with the wedge-shaped prism 40 and the rotating position of the prism cell 42 is adjusted.

In such a rotating mechanism, with an increase in the angle γ of rotation of the wedge-shaped prism 40 corresponding to the number of input pulses to the stepping motor, linear behavior goes on diminishing (a relation of N and Δγ in equation (4)). As a result, there is a possibility that the position of the beam spot cannot be caused to move linearly (a relationship of N and Δz in equation (3)). Therefore, in a case of such rotating mechanism, it is desirable to keep the angle γ of rotation in a range of ±30°.

In examples shown in FIG. 5, FIG. 6A, and FIG. 6B, the stepping motor 50 that outputs a rotational displacement and the lead screw 52 are combined. However, the lead screw 52 may be allowed to be built-in and a stepping motor that outputs a straight displacement may be used. Further, not only the stepping motor but a type that uses a piezoelectric element, or an ultrasonic motor, a direct current (DC) motor etc. may also be used as a driving unit.

As shown in FIG. 6B which illustrates a cross-sectional surface of a flat plane that includes an axis of rotation, a surface of emergence 40a (or a surface of incidence) of the wedge-shaped prism can be allowed to be perpendicular to the axis of rotation. By adopting such a structure, the processing of the prism cell 42 is facilitated and the axis of rotation of the light source and the axis of rotation of the wedge-shaped prism 40 can be coincident.

By using a wedge-shaped prism which is made from a resin ideal for making a prism, the prism cell can be formed as an integrated body, thereby reducing the number of parts, cost of parts, and the number of processes involved in assembling.

The multi-beam optical scanning apparatus 18 can be used as an exposing unit in an image forming apparatus. In other words, the multi-beam optical scanning apparatus 18 is used as the exposing unit that exposes a surface of an image carrier by scanning, and forms an image on the surface of the image carrier. This enables to form and output a high quality image with less changes in a distance between the scanning lines.

Figure 16:
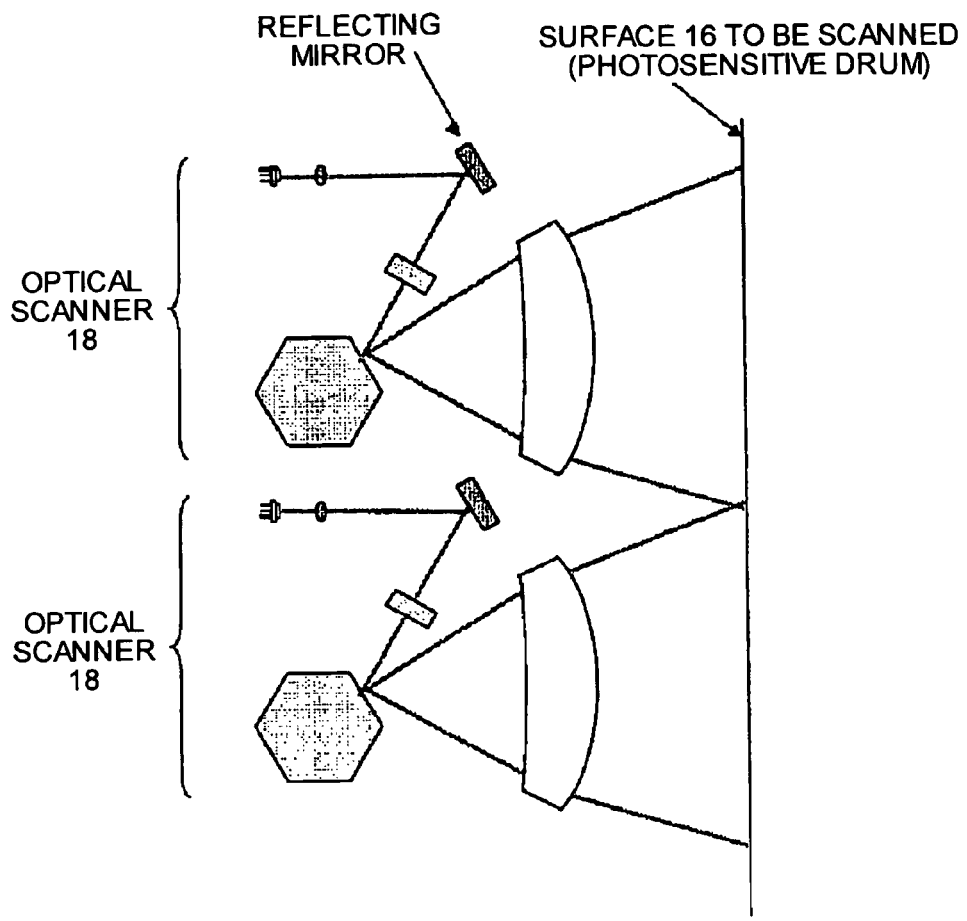
FIG. 16 is a top view of a divided-scan optical scanning apparatus that is another embodiment of the optical scanning apparatus according to the present invention.

Further, an image forming apparatus that includes a multi-beam optical sensor which is formed by a plurality of scanners 18 in the main scanning direction of a photosensitive unit such as a photosensitive drum which is a surface 16 subjected to scanning as shown in FIG. 16, can be structured. By forming the image forming apparatus that uses the multi-beam scanners 18, there is no deterioration of optical performance and an image of high quality can be achieved even if an image with a large width of writing is output.

An embodiment of an image forming apparatus according to the present invention is described with an example of a four-drum tandem image forming apparatus shown in FIG. 1. The embodiment shown in FIG. 1 includes an optical scanning apparatus in which a deflector 14 that includes a polygon mirror carries out deflection scanning of total of eight laser beams emerged from four light sources and a plurality of photosensitive drums 16 are exposed. This optical scanning apparatus includes at least one wedge-shaped prism 40 (there are three wedge shaped prisms in the embodiment shown in FIG. 1) in optical paths from light sources 22a to 22d to the deflector 14. The position of a beam spot in the secondary scanning direction in surfaces of photosensitive drums 16Y, 16M, 16C, and 16B which are the surfaces subjected to scanning can be changed by carrying out adjustment of rotation roughly around these wedge-shaped prisms. In other words, by providing a rotation-adjusting unit for the adjusting rotation of the wedge-shaped prism 40, a writing-start position correcting unit that can control scanning-line position on the photosensitive drums 16 which are image carriers, is provided, and this is a peculiarity of this embodiment.

Principle for correction of the secondary scanning beam spot by the wedge-shaped prism 40 is a described earlier by referring to FIG. 2. In other words, by causing the wedge-shaped prism 40 to rotate roughly around the optical axis, β0 can be deflected for the incident beam. As a result, the position of the secondary scanning beam spot on the surface subjected to scanning (photosensitive drums 16) can be changed.

The following are the advantages of using the wedge-shaped prism for which the rotation around the optical axis can be adjusted.

Firstly, unlike a position-correction control for each batch at the start-up of the image forming apparatus or before print out, the correction of the position of the beam spot can be carried out during writing of image data. Therefore, during continuous printing shown in FIG. 3, almost the real-time correction of the position can be carried out even in a case of a sudden change in temperature or in a case of position shift due to change in speed of the photosensitive drum etc. Therefore, color shift can be reduced substantially.

Secondly, the sensitivity of the wedge-shaped prism 40 can be set appropriately by setting the apex angle α to a suitable degree. Therefore, the sensitivity is not too high as in correction carried out by using a galvanic mirror and the effect of vibration is less, thereby enabling the highly accurate positioning of the beam spot.

Thirdly, since the prism and the prism holder are comparatively light in weight, compared to the correction of the position of the beam spot by tilting and shifting of an optical element such as a long-length reflecting mirror, a scanning lens, a roof mirror, and a light source which is comparatively light in weight, the speed of response is fast and the correction of a position shift of even higher frequency is possible.

Fourthly, as compared to the correction of the position of the beam spot carried out by changing the voltage applied as in an electro-optical device and an acousto-optic modulator (AOM), the position is not determined when the power supply is OFF and it can be realized at a low cost.

From our experience, by suppressing the relative color shift to less than or equal to 30 μm, a condition in which the actual color shift is not remarkable can be achieved and this can be realized by the present invention.

Figure 4A:
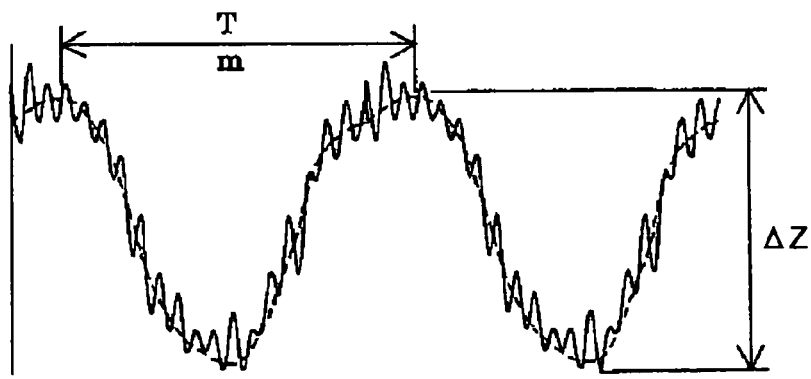
FIG. 4A is a graph of a shift in a position of a dot in a secondary scanning direction on an intermediate transfer belt due to fluctuation in rotation speed of the intermediate transfer belt of the image forming apparatus

Further, problems caused due to unevenness in the speed of an intermediate transfer belt in the image forming apparatus are studied below. If an image forming apparatus that includes an intermediate transferring body 31 such as a drum or a belt, the position of the dot in the secondary scanning direction on the intermediate transferring body 31 changes with the change in speed of the intermediate transferring body 31. An image of the change in the position of the dot is shown in FIG. 4A. The horizontal axis shows time i.e. a position in a direction of carrying on the intermediate transferring body and the vertical axis shows a position (change) of the secondary scanning spot. As shown in FIG. 4A, the intermediate transferring body 31 causes a position shift Δz in the secondary scanning direction on periodic basis. Period of one cycle is equivalent to time Tm required for one rotation of the drum or the belt. If the intermediate transferring body 31 is an elastic belt, it is known that the distortion of the elastic belt changes sinusoidally with the circumference of the elastic belt as one cycle. If such a belt is used, even if the driving-shaft side is rotated at a constant speed, the driven-shaft side has sinusoidal unevenness of rotation. As a result, there is a change in the position of the dot in the secondary scanning direction as shown in FIG. 4A.

Figure 4B:
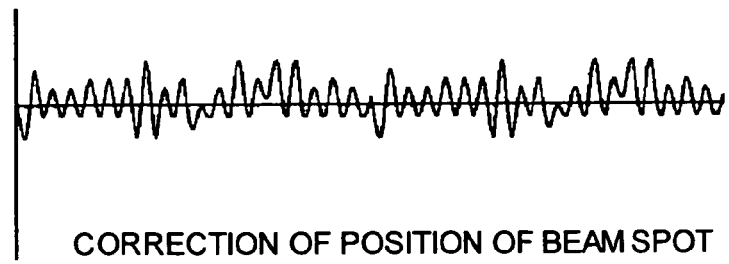
FIG. 4B is graph of an example of a correction of the shift in the position of a beam spot.

FIG. 4B indicates an example of correction that is carried out by this embodiment. The wedge-shaped prisms 40b to 40d in the optical scanning apparatus are adjusted to rotate around the optical axis by synchronizing with the unevenness in speed of the intermediate transferring body (transfer belt) 31 i.e. with the sinusoidal behavior of the intermediate transferring body 31. By adjusting the wedge-shaped prisms 40b to 40d in this manner, the correction of the shift in the position of the dot on the intermediate transferring body (intermediate transfer belt) 31 and the correction of a component of a large position shift of low frequency can be carried out appropriately.

Further, problems caused due to a change in temperature, in other words, shift in a writing-start position which is a secondary scanning shift between the photosensitive drums is examined.

The following is a description by referring to FIG. 1. To carry out correction in a color shift in the secondary scanning direction, one way would be to carry out correction of a position of scanning lines of each scanning optical system corresponding to each color so that they are close to zero. However, since the reference of the writing-start position for four colors disappears while adjusting the scanning position, there is a possibility of applying a large decentering of rotation by mistake which may result in deterioration of the optical performance such as the diameter of the beam spot becoming bigger. Further, there is an increase in the number of components of the writing-start position correcting unit thereby raising the cost.

Taking this into consideration, in the embodiment shown in FIG. 1, among the optical scanning apparatuses corresponding to each of yellow (Y), magenta (M), cyan (C), and K (black), black is let to be a reference color and an optical scanning apparatus corresponding to black color is let to be a reference. The peculiarity is that the correction of the scanning position of the scanning optical system other than that with the reference color, is carried out so that the scanning position coincides substantially with the scanning position of the reference color. Therefore, three wedge-shaped prisms are used since three colors are to be adjusted out of the four colors. In other words, by carrying out correction of the relative color shift with respect to black color with black color as a reference, an image with a high color reproducibility in which the change in the color tone is suppressed sufficiently, can be achieved.

Since black color has high contrast with other colors, an effect of deterioration such as the change in the diameter and the position of the beam spot due to an external influence of vibrations and a change in the temperature tend to appear on the image. For this, in the present embodiment, black color is let to be a reference color and the scanning position by the scanning optical systems corresponding to colors other than black color are matched. By matching the scanning position, each of the optical components can be fixed firmly and a scanning optical system that is not affected by the external influence can be realized.

Figure 3:
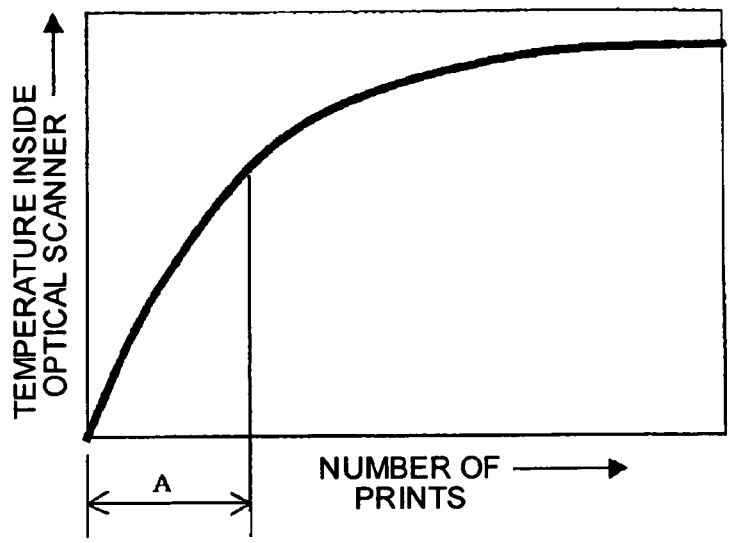
FIG. 3 is a graph of a rise in temperature in an image forming apparatus when printing is carried out continuously.

As shown in FIG. 3, when a plurality of images are printed and output continuously, heat is generated from a polygon motor and the semiconductor laser in the optical scanning apparatus and due to an effect of heat from a heater while fixing outside the optical scanning apparatus, there is a sudden rise in temperature inside the image forming apparatus. There is a sudden change in the position of the beam spot on the surface of the photosensitive drum with the sudden increase in the temperature and there is a gradual change in shade of the first output color image, a color image after certain number of images, and a color image after few tens of images.

Taking this into consideration, in an embodiment of the image forming apparatus according to the present invention, the image forming apparatus includes a position-shift detector and the writing-start position correcting unit. The position-shift detector detects a relative position-shift in the secondary scanning direction on each of the photosensitive drum. The writing-start position correcting unit has at least one wedge-shaped prism in the optical path from the light source to the deflector and by adjusting the rotation of the wedge-shaped prism roughly around the optical axis, the position of the beam spot in the secondary scanning direction is changed. The writing-start position correcting unit is driven based on data of the position shift measured by the position-shift detector and the position of the beam spot on the photosensitive drum during writing of image data is controlled.

Figure 13:
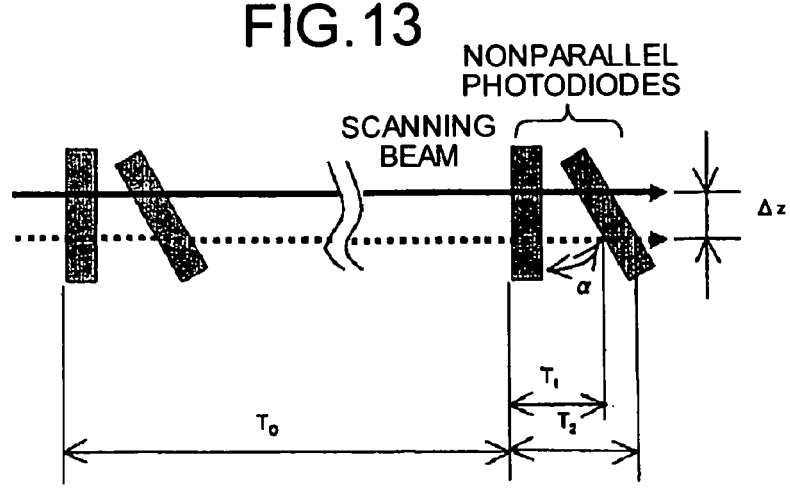
FIG. 13 is a conceptual diagram of an arrangement of a nonparallel-photodiode sensor as a position-shift detector that can be used in the present invention.

In the embodiment of the present invention, the position-shift detector, as shown in FIG. 13, detects the position of the beam spot by a nonparallel-photodiodes sensor (PD) that is provided in an area other that a writing area in the main scanning direction of the optical scanning apparatus. It is desirable to install this element in an area other than effective writing area of the scanning beam for each of the photosensitive drums such as in the beam-spot position detector in FIG. 1. The position-detector may be provided additionally with a function to detect a synchronization signal that determines a writing position in the main scanning direction.

As shown in FIG. 13, the distance between the pair of nonparallel-photodiodes sensors (PD) is measured from time required for the transmission of beam. A difference in time T2−T1 for transmission at a position away from the secondary scanning direction just by $\Delta z$ of beam that passes through the nonparallel-photodiodes sensor (PD) that is disposed in a slanting position in a surface parallel to the main scanning surface with respect to the main scanning direction, is calculated. By calculating the difference in time T2−T1, the scanning position (writing-start position) of the secondary scanning direction can be monitored and detected.

Moreover, a change in magnification in the main scanning direction can be monitored by detecting a change in time T0 which is a time in which the beam passes through a pair of nonparallel-photodiodes sensors (PD) that are parallel to each other and are at right angles to the main scanning direction.

Figure 18:
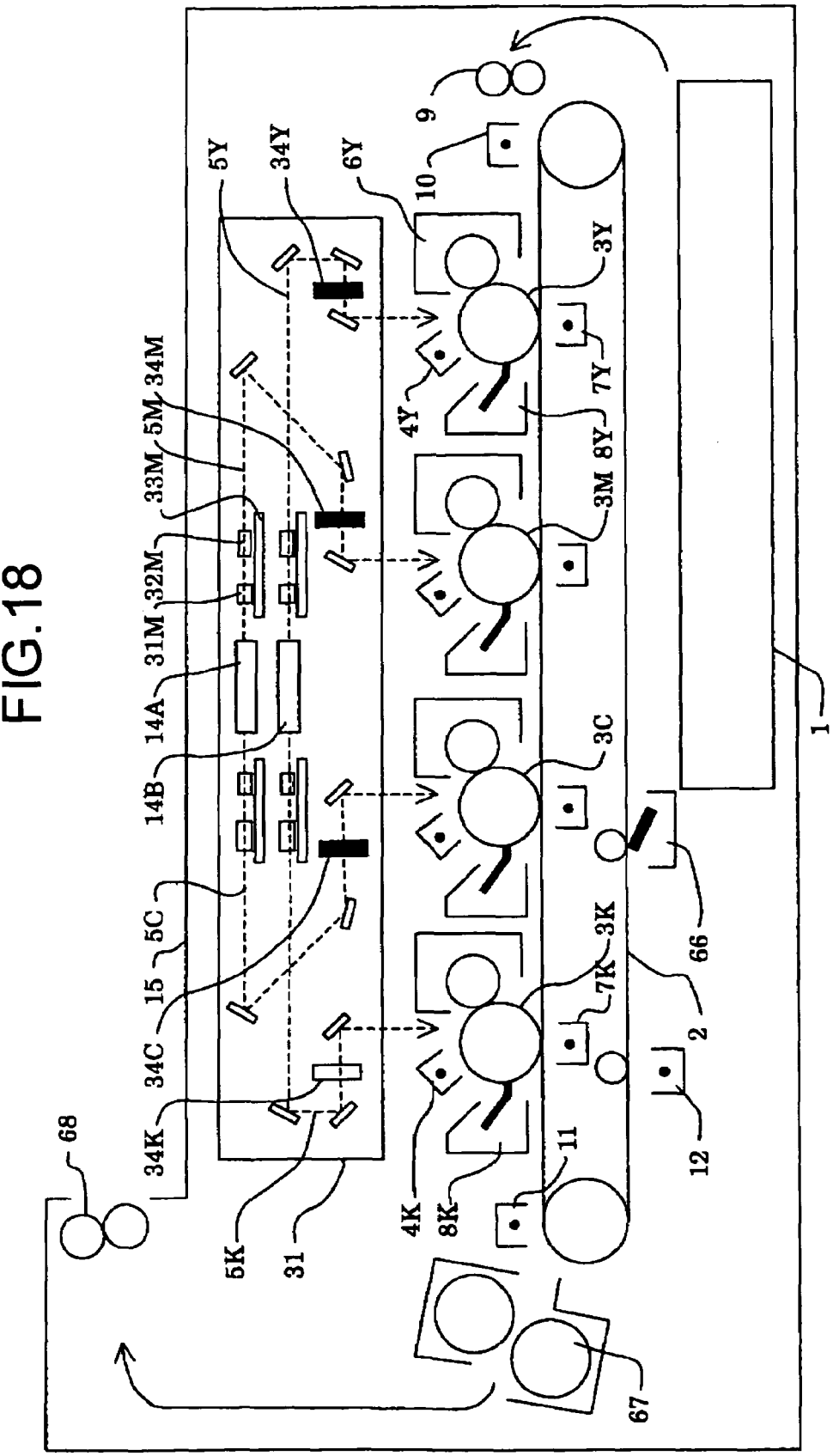
FIG. 18 is a front view of a tandem color image forming apparatus that is another embodiment of the image forming apparatus according to the present invention.

A tandem color image forming apparatus which includes the optical scanning apparatus in the embodiment according to the present invention is shown in FIG. 18 as an example of color image forming apparatus. In FIG. 18, a carrier belt 2 that carries a transfer paper (not shown in the diagram) fed from a paper feeding cassette 1 is disposed horizontally on a bottom side in the apparatus. Photosensitive drums 3Y, 3M, 3C, and 3K for yellow Y, magenta M, cyan C, and black K colors respectively are disposed at an equal distance in an order from an upstream side of the direction of carrying of the transfer paper. Alphabets Y, M, C, and K are used with the reference numerals to distinguish, for these colors. All the photosensitive drums 3Y, 3M, 3C, and 3K have the same diameter, and processing members according to an electrophotographic process are disposed around the photosensitive drums one after another. In a case of the photosensitive drum 3Y which is an image carrier, units such as a charger 4Y, a scanning and imaging optical system 5Y, a developing unit 6Y, a transferring charger 7Y, and a cleaning unit 8Y are disposed around the photosensitive drum. Similar is the case of the photosensitive drums 3M, 3C, and 3K. In other words, in this embodiment, surfaces subjected to irradiation, which are surfaces of the photosensitive drums 3Y, 3M, 3C, and 3K set for each color, are let to be surfaces subjected to scanning. Scanning and imaging optical systems 5Y, 5M, 5C, and 5K are provided one each corresponding to each photosensitive drum.

Further, a belt charger 10 and a registering roller 9 which are disposed in a position on an upstream side from the photosensitive drum 5Y in a direction of carrying the transfer paper, are provided around the carrier belt 2. Units such as a belt separation charger 11, a decharger 12, and a cleaning unit 66 are disposed in positions on a downstream side from the photosensitive drum 5K. A fixing unit 67 is provided on a downstream side from the belt separation charger 11 in the direction of carrying. The fixing unit 67 is connected to a paper discharge roller 68 towards a paper discharge tray 15.

In such a schematic structure, if a full color mode is a mode for a plurality of colors, for each of the photosensitive drums 3Y, 3M, 3C, and 3K, the scanning and imaging optical systems 5Y, 5M, 5C, and 5K carry out optical scanning of light beams based on image signals of each color Y, M, C, and K, and an electrostatic latent image is formed on each of the photosensitive drums. The electrostatic latent images are developed by a toner of a color corresponding to each image to form toner images. The toner images are absorbed electrostatically on the carrier belt 2 and superimposed by transferring one after another on a transfer paper that is carried. The superimposed images are fixed as a full color image and discharged. In a case of a black color mode (single color mode), the photosensitive drums 3Y, 3M, 3C and the respective processing members are let to be inoperative and an electrostatic latent image is formed by optical scanning of the light beam by the scanning and imaging optical system 5K based on an image signal for black color only on the photosensitive drum 3K. The electrostatic image is developed by toner of black color to form a toner image. The toner image is absorbed electrostatically on the carrier belt 2 and is transferred to a transfer paper. The image transferred is fixed as a monochrome image of black color and discharged.

Reference numerals 31M and 32M denote fθ lenses that are formed by two lenses. Each of the fθ lenses is fixed to an optical housing 31. The fθ lenses 31M and 32M are placed on a plate 33M and the plate 33M is fixed to the optical housing 31. The plate 33M is in contact with a part of a surface or full surface on a side of a surface in contact with the fθ lenses 31M and 32M. A plastic material, which is a low cost material and facilitates forming an aspheric shape, is used for the fθ lenses 31M and 32M. Concretely, a synthetic resin which has low water absorbency, high transparency, and excellent formability is ideal for making the fθ lenses 31M and 32M.

If a multiple number of color images are printed continuously, there is a sudden change in temperature due to heat generated in the polygon motor and in the fixing unit inside the optical scanning apparatus. Due to this, there is a change in the color tone in the first print and color images after the plurality of images. According to the embodiment of the present invention, a correction of the change in color tone can be carried out appropriately.

However, as shown in FIG. 1, when a wedge-shaped prism is disposed commonly in optical paths of two laser beams emerged from a light source 22, there is a possibility of outbreak of the following problem.

If the wedge-shaped prism is caused to rotate (γ rotation) roughly around the optical axis to carry out correction of the position of the beam spot on the photosensitive drum, there is a possibility of a change in the beam pitch between the two beams (distance between the scanning lines) as a side effect.

The developing is described by referring to FIG. 11. An angle of rotation around an axis of rotation (x-axis) of the wedge shaped prism 40 is γ, an angle at which the two laser beams (LD1 and LD2) cross (angle of intersection) is 2θ, a bisector of the angle of intersection is x-axis, plane of emergence of the wedge-shaped prism 40 is perpendicular to x-axis, a plane of incidence is at an angle α with the plane of emergence, a position (angle of rotation) of the wedge-shaped prism when a line of intersection of the plane of incidence and the plane of emergence is parallel to z-axis (perpendicular to flat surface x-y), is γ=0°.

Direction cosines of the emergent beams (LD1 and LD2) from the wedge-shaped prism are,

LD1:

$x$-direction: $\phi 1x = \cos\theta + N11\cdot\cos\alpha + N21$, $y$-direction: $\phi 1y = \sin\theta + N11\cdot\sin\alpha\cdot\cos Y$, $z$-direction: $\phi 1z = N11\cdot\sin\alpha\cdot\sin Y$, where $N11 = n\cdot\cos r11 - \cos i11$, $N21 = \cos i21 - n\cdot\cos r21$, $i11 = \cos\theta\cdot\cos\alpha + \sin\theta\cdot\sin\alpha\cdot\cos\alpha$, $r11 = \sin^{-1}\{(1/n)\sin i11\}$, $r21 = \cos^{-1}\{(1/n)(\cos\theta + N11\cdot\cos\alpha)\}$, $i21 = \cos^{-1}(\cos\theta + N11\cdot\cos\alpha + N21)$

LD2:

$x$-direction: $\phi 2x = \cos\theta + N12\cdot\cos\alpha + N22$, $y$-direction: $\phi 2y = -\sin\theta + N12\cdot\sin\alpha\cdot\cos Y$, $z$-direction: $\phi 2z = N12\cdot\sin\alpha\cdot\sin Y$, where, $N12 = n\cdot\cos r12 - \cos i12$, $N22 = \cos i22 - n\cdot\cos r22$, $i12 = \cos\theta\cdot\cos\alpha - \sin\theta\cdot\sin\alpha\cdot\cos\alpha$, $r12 = \sin^{-1}\{(1/n)\sin i12\}$, $r22 = \cos^{-1}\{(1/n)(\cos\theta + N12\cdot\cos\alpha)\}$, $i22 = \cos^{-1}(\cos\theta + N12\cdot\cos\alpha + N22)$, Therefore, if components in z-direction of the angle of emergence of the LD1 and the LD2 are β1 and β2, then $LD1$:

$\tan\beta 1 = \varphi 1z / \varphi 1x$
$= (N11 \times \sin\alpha \times \sin Y) / (\cos\theta + N11\cos\alpha + N21)$, $LD2$:

$\tan\beta 2 = \varphi 2z / \varphi 2x$
$= (N12 \times \sin\alpha \times \sin Y) / (\cos\theta + N12\cos\alpha + N22)$.

Figure 17:
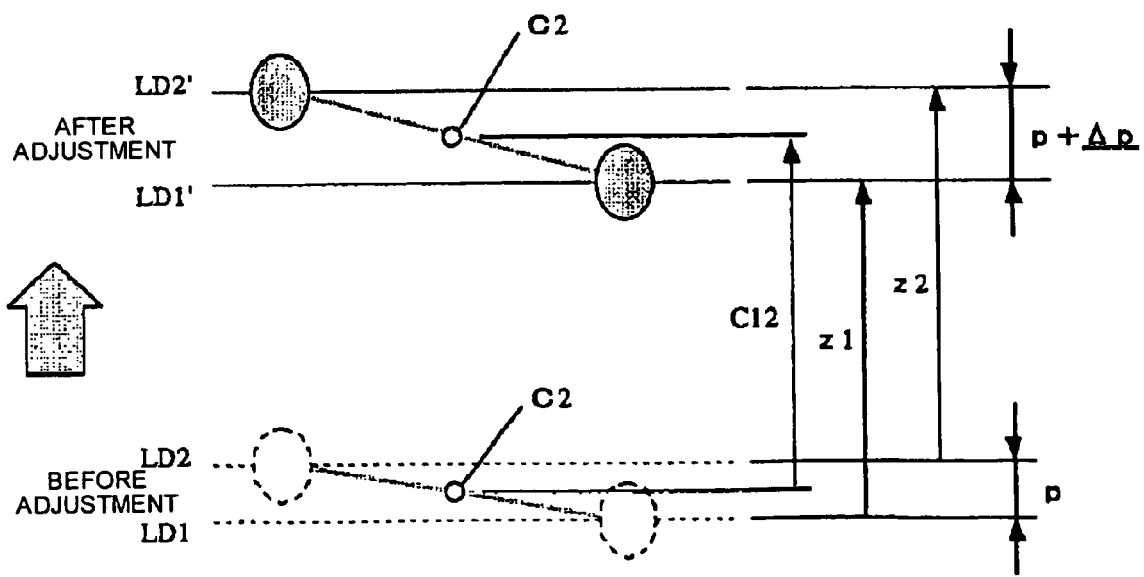
FIG. 17 is a conceptual diagram of positions of beam spots before and after rotating the wedge-shaped prism.

Therefore, changes ($z_1$ and $z_2$) in the position of the secondary scanning beam and a change in the beam pitch ($\Delta p$) at this time caused due to $\gamma$ rotation of the wedge-shaped prism 40 are expressed by $$z_1 = m \times f_{col} \times \tan \beta_1,$$

$$z_2 = m \times f_{col} \times \tan \beta_2, \text{ and}$$

$$\Delta p = z_2 - z_1 = m \times f_{col} \times (\tan \beta_2 - \tan \beta_1) \text{ (see FIG. 17)}.$$

Further if an amount of change in a center position (average) of $z_1$ and $z_2$ is C12, then C12 is expressed by $$C12 = (z_1 + z_2)/2 = m \times f_{col} \times (\tan \beta_1 + \tan \beta_2)/2$$

From our experience, the maximum shift in the position (width) of the secondary scanning dot $\Delta z$ which is caused due to the unevenness in the speed of the transfer belt shown in FIG. 4A, is approximately in a range of ±300 µm to ±400 µm. Therefore, an adjustment range of the position of the secondary scanning dot (the position of the beam spot) by $\gamma$ rotation of the wedge-shaped prism, in other words, an adjustment stroke of ±500 µm is sufficient, $$|C12| = |m \times f_{col} \times (\tan\beta_2 + \tan\beta_1)| \quad \text{(conditional equation 1)}$$
$$= 500 \ \mu m$$

Further, if a change in the beam pitch between the LD1 and the LD 2 is $\Delta p$ [µm], the secondary scanning density is D [dpi], the distance between the scanning lines (target value of a beam pitch at the secondary scanning density D) is d (=25400/D) [µm], and if the tolerance of $\Delta p$ is set to d/4 from the evaluation of an output image, then $$\Delta p = d/4 = (25400/D)/4 = 6350/D. \quad \text{(conditional equation 2)}$$

Therefore, $$|\Delta p| = |m \times f_{col} \times (\tan\beta_2 - \tan\beta_1)|$$
$$= 6350/D$$

Following are the concrete examples of conditional equation 1 and conditional equation 2

$$|C12| = |m \times f_{col} \times (\tan\beta_2 + \tan\beta_1)|$$
$$= 500 \ \mu m$$

$$|\Delta p| = |m \times f_{col} \times (\tan\beta_2 + \tan\beta_1)|$$
$$= 6350/D \ \mu m$$

Figure 14A:
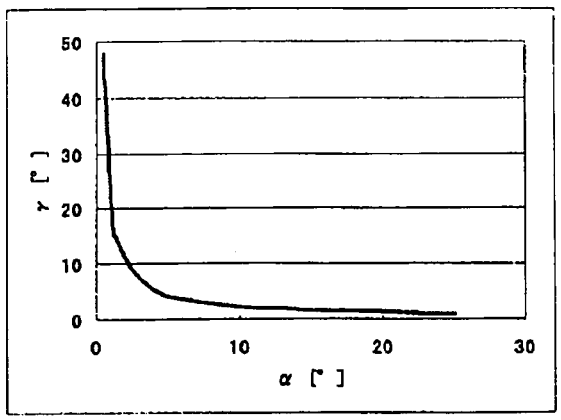
FIG. 14A and FIG. 14B are graphs of an example of a change in mutual pitch of beams and an angle of rotation of the wedge-shaped prism that is required to move a beam spot on a surface subjected to scanning by a predetermined amount in the secondary scanning direction.

As a first concrete example, a case in which a wedge-shaped prism (refractive index n=1.514) that has an emission wavelength (used wavelength) 655 nm and that is made from BK7 is used, is taken into consideration. Parameters of the optical systems which are combined are m=10 times,
fcol=15 mm, and
θ=2.9°, and the secondary scanning density D=1200 dpi (distance between the scanning lines d=21.2 µm). FIG. 14A which is derived from the conditional equation 1, indicates the angle of rotation $\gamma$ of the wedge-shaped prism that is required to move the center position C12 of LD1 and LD2 by ±500 µm. It is apparent from FIG. 14A that the angle $\gamma$ is inversely proportional to the apex angle $\alpha$ of the horizontal axis (of the wedge-shaped prism).

Figure 14B:
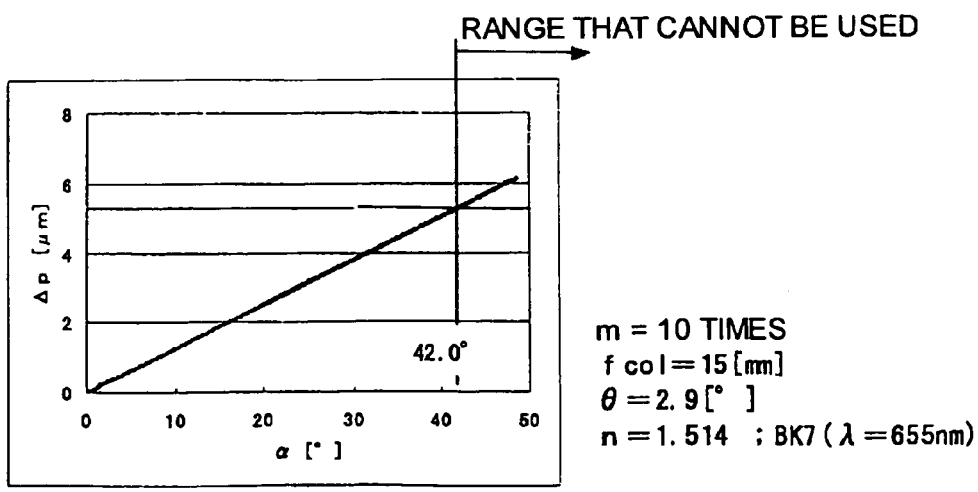

On the other hand, FIG. 14B which indicates a relationship between the apex angle $\alpha$ and the difference of pitch $\Delta p$ between the LD1 and LD2 which is due to moving the center position C12 of LD1 and LD2 by ±500 µm, is derived from conditional equation 2 and it is apparent from FIG. 14B that $\alpha$ and $\Delta p$ are directly proportional to each other. Further, from the first concrete example, it is learned that the apex angle $\alpha$ of the wedge-shaped prism may be set to 42°.

In other words, if the apex angle $\alpha$ is greater than 42°, there is a possibility of a change in the pitch to an extent that would affect the output image. Therefore, such a type of wedge-shaped prism cannot be used. On the other hand, if the apex angle $\alpha$ is smaller than or equal to 42°, the change in the pitch is not to the extent that would affect the output image. Therefore, such a type of wedge-shaped prism can be used.

Figure 15A:
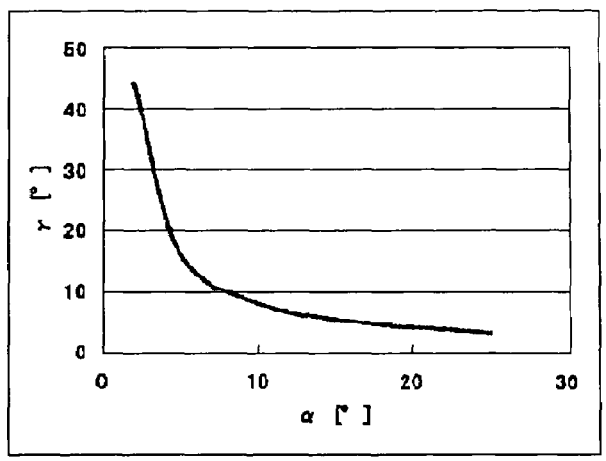
FIG. 15A and FIG. 15B are graphs of another example of the fluctuation in mutual pitch of beams and angle of rotation of the wedge-shaped prism that is required to move a beam spot on a surface subjected to scanning by a predetermined amount in the secondary scanning direction.
Figure 15B:
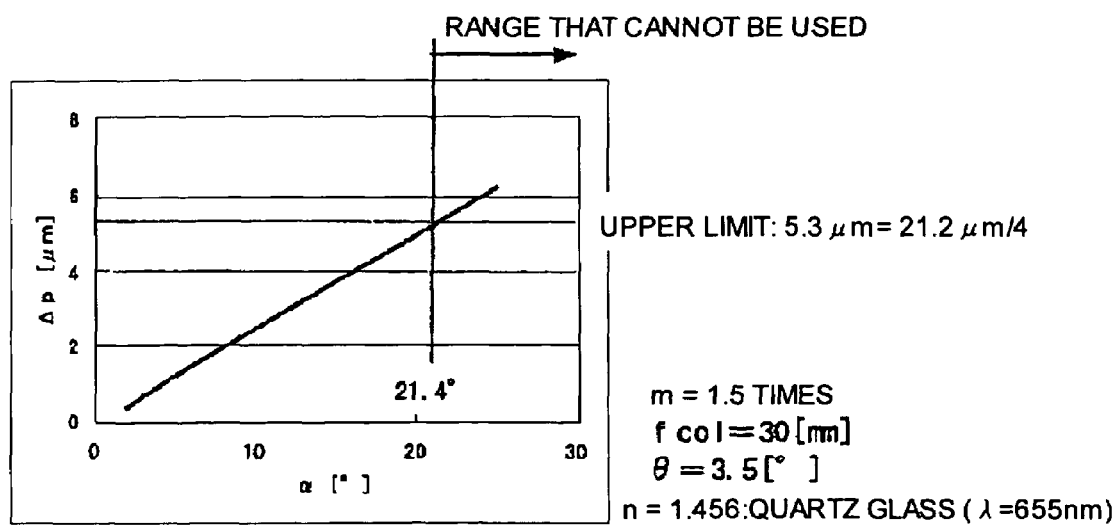

As a second concrete example, a case in which a wedge-shaped prism (refractive index n=1.456) that has an emission wavelength (used wavelength) 655 nm and that is made from quartz glass is used, is taken into consideration. Parameters of the optical systems which are combined are m=1.5 times,
fcol=30 mm, and
θ=3.5°, and the secondary scanning density D=1200 dpi (distance between the scanning lines d=21.2 µm). From FIG. 15A, it is apparent that the angle $\gamma$ is inversely proportional to the apex angle $\alpha$. Further, from FIG. 15B it is learned that the apex angle of the wedge-shaped prism may be set to 21.4° in the second concrete example.

Figure 8:
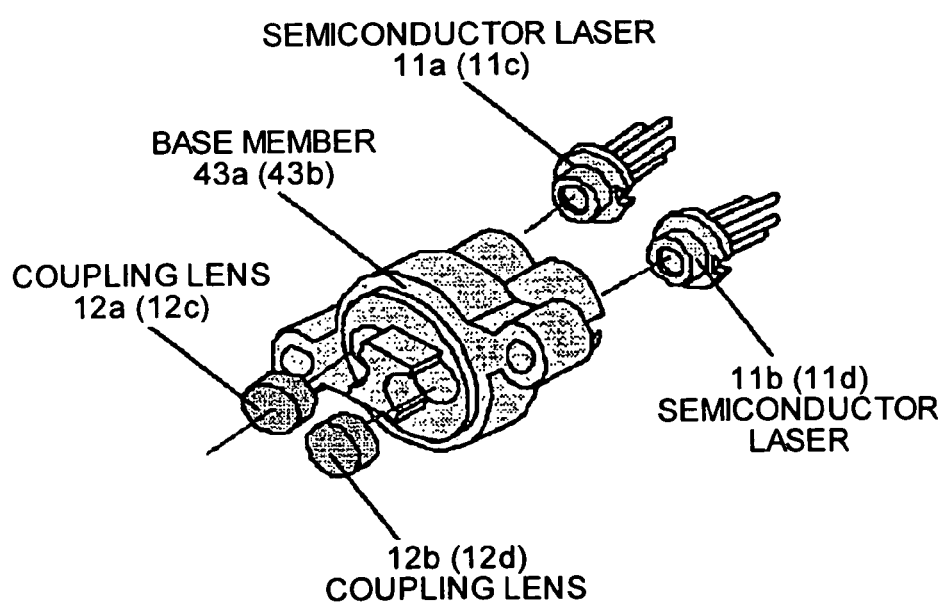
FIG. 8 is an exploded perspective view of a light source that can be used in the present invention.

Structures of an optical scanning apparatus (four-beam optical scanning apparatus) and a light source according to a second embodiment are same as those described by referring to FIG. 8 and FIG. 9.

In other words, as shown in FIG. 9, the optical scanning apparatus 18 includes the cylindrical lens 13, the polygon mirror (deflector) 14, the scanning optical system (scanner) 15, the beam-combining prism (beam-combining unit) 17, the wedge-shaped, prisms 40 (for example, four prisms), the first light source 41 and the second light source 42, an optical housing 53 and the side wall 54.

As shown in FIG. 8, the first light source 41 includes a set of semiconductor lasers 11a and 11b, the coupling lenses 12a and 12b which couple laser beams emerged from the semiconductor lasers 11a and 1b, and the base member 43a which holds the semiconductor lasers 11a and 11b and the coupling lenses 12a and 12b. The semiconductor lasers 11a and 11b are fixed by press fitting into the base member 43a.

The second light source 42 includes a set of semiconductor lasers 11c and 11d, the coupling lenses 12c and 12d which couple laser beams emerged from the semiconductor lasers 11c and 11d, and the base member 43b which holds the semiconductor lasers 11c and 11d and the coupling lenses 12c and 12d. The semiconductor lasers 11c and 11d are fixed by press fitting into the base member 43b.

The coupling lenses 12a to 12d are fixed by using an ultraviolet (UV) curing adhesive after the adjustment of relative positional relationship with the semiconductor laser. The adjustment is carried out by adjusting characteristics of emergent beam (such as collimation and directionality of an optical axis of the emergent light) in accordance with characteristics of the optical scanning system onward. The methods for fixing the semiconductor laser and the coupling lenses are not limited to these methods and any known method may be used.

The semiconductor laser which is a light emitting element may be a single-beam semiconductor laser that has one light emitting point or a multi-beam semiconductor laser that has a plurality of light-emitting points. Optical paths of a plurality of laser beams which are emerged from the multi-beam semiconductor laser is let to be an optical path of one laser beam that is emerged from the central position of the plurality of light emitting points (one virtual light emitting point).

It is desirable that the first light source 41 and the second light source 42 are held by a common holder. An arrangement of the wedge-shaped prisms 40 in the first example of the present invention is as described earlier by referring to FIG. 12. As shown in FIG. 8 and FIG. 12, by allowing the common holder (side wall 54) to hold the first light source 41 and the second light source 42, change in positional and directional aspects (particularly, change in relative positional and directional aspects of the light sources) with the change in temperature and elapsed time, can be suppressed effectively.

Figure 19:
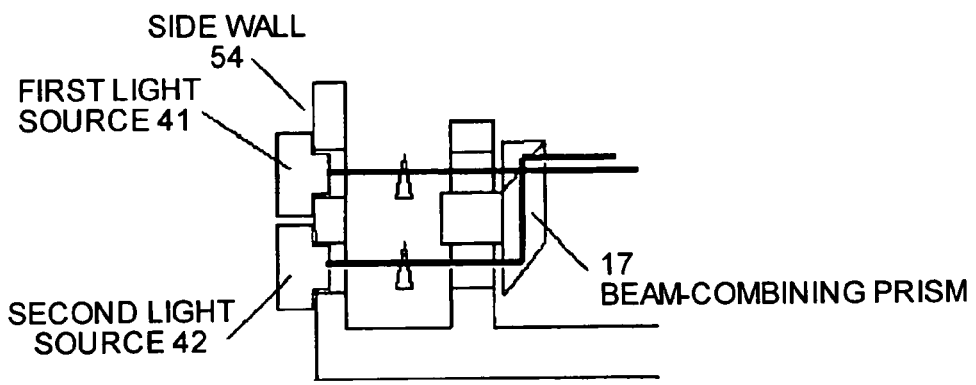
FIG. 19 is schematic for illustrating combining of laser beams by a beam-combining prism.

FIG. 19 is a diagram illustrating combining of laser beams by a beam-combining prism 17 in the first example of the present invention. As shown in FIG. 19, the beam-combining prism 17 brings the laser beam emerged from the light source 41 and the laser beam emerged from light source 42 close to each other and combine. The beam-combining prism 17 in FIG. 19 is divided between a triangular portion and a quadrangular portion. The laser beams can be combined by providing a half mirror or a PBS surface which is a combining unit in which polarization characteristics of the laser beam are used.

As shown in FIG. 9, the four laser beams which are combined by the beam-combining prism 17 form an image (as a long line image in the main scanning direction) in the secondary scanning direction on a deflecting and reflecting surface of the polygon mirror 14 due to an effect of the cylindrical lens 13, which upon reflection reaches the surface of the photosensitive drum 16 which is surface 16 subjected to scanning via the scanning optical system 15.

The four beams which are emerged from the first light source 41 and the second light source 42 cross near a deflecting and reflecting surface of the polygon mirror 14 in a deflecting surface (main scanning cross-section). By adopting such a structure, deviation and deterioration of optical performance (such as image forming characteristics, scanning at a constant speed, an effective width of writing) on the surface of the photosensitive drum 16, which is caused by a difference in reflecting point of each laser beam, can be reduced effectively.

Figure 20A:
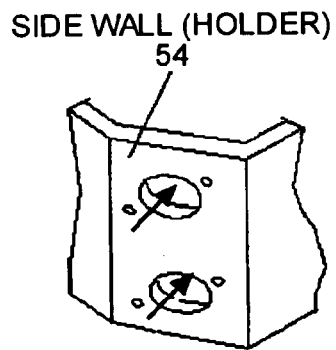
FIG. 20A is a schematic of a side wall when two light sources are mounted the same surface.
Figure 20B:
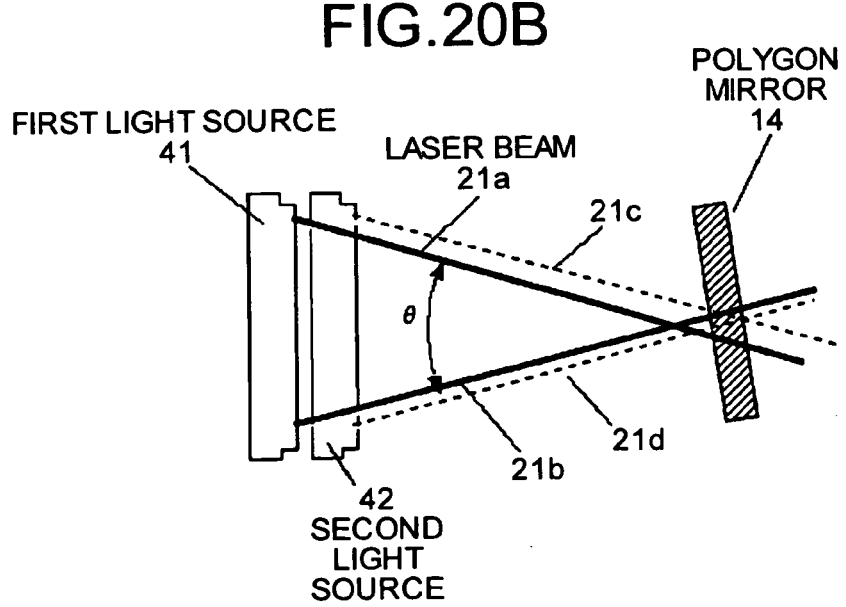
FIG. 20B is a schematic for illustrating that a part of optical paths of four laser beams from the two light sources shown in FIG. 20A is parallel.

FIG. 20A is a diagram of a side wall 54 when a surface on which the first light sources 41 and the second light source 42 are fixed is the same parallel surface in the first example of the present invention. FIG. 20B is a diagram which depicts that a part of optical paths of four laser beams that are emerged from two light sources in a case in FIG. 20A, is parallel.

Figure 21A:
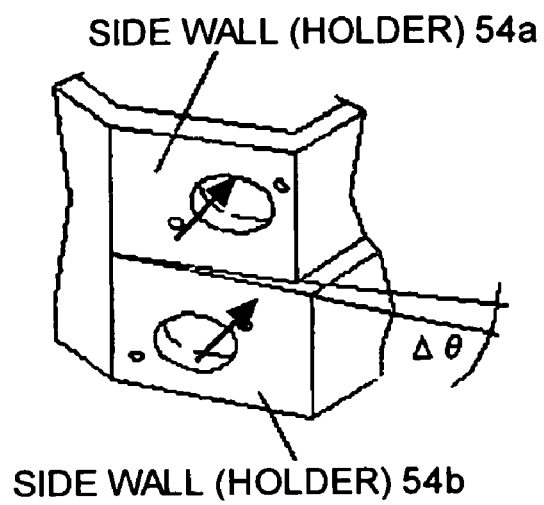
FIG. 21A is a schematic of a side wall when surfaces on which two light sources are mounted are nonparallel.
Figure 21B:
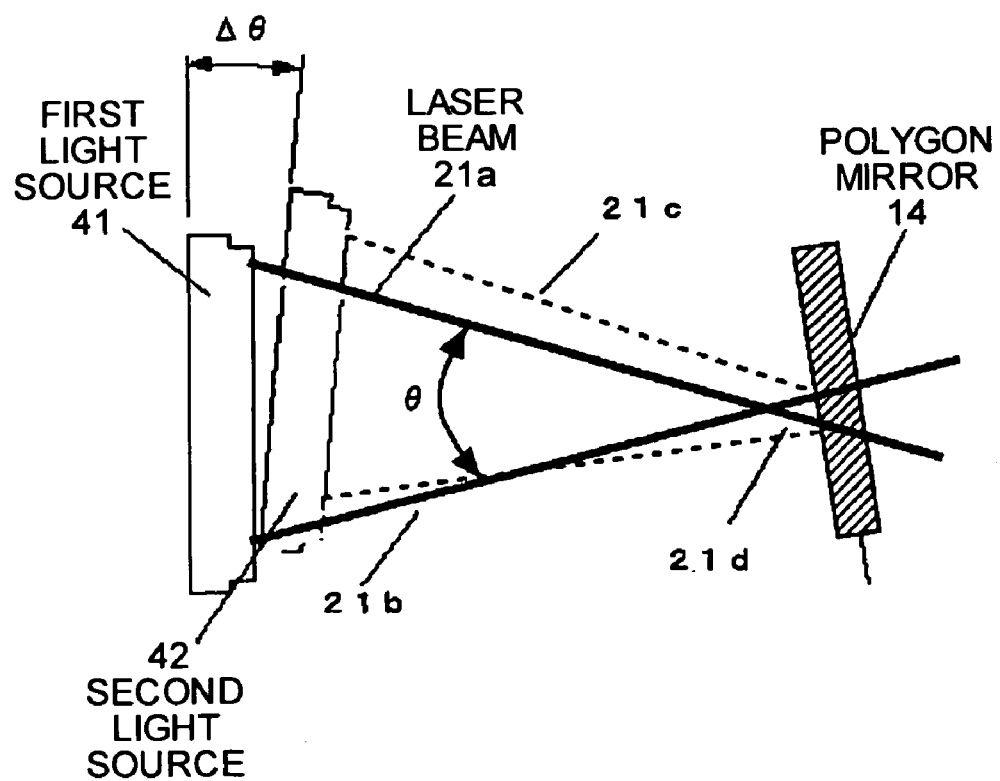
FIG. 21B is a schematic for illustrating that optical paths of four laser beams from the two light sources shown in FIG. 21A have nonparallel deflecting surfaces.

FIG. 21A is a diagram of side walls 54a and 54b when surfaces on which the first light sources 41 and the second light source 42 are fixed are nonparallel surfaces. FIG. 21B is a diagram which depicts that the optical paths of the four laser beams that are emerged from the first light source 41 and the second light source 42 in a case in FIG. 21A have nonparallel deflecting surfaces (in the main scanning cross-section).

Figure 22:
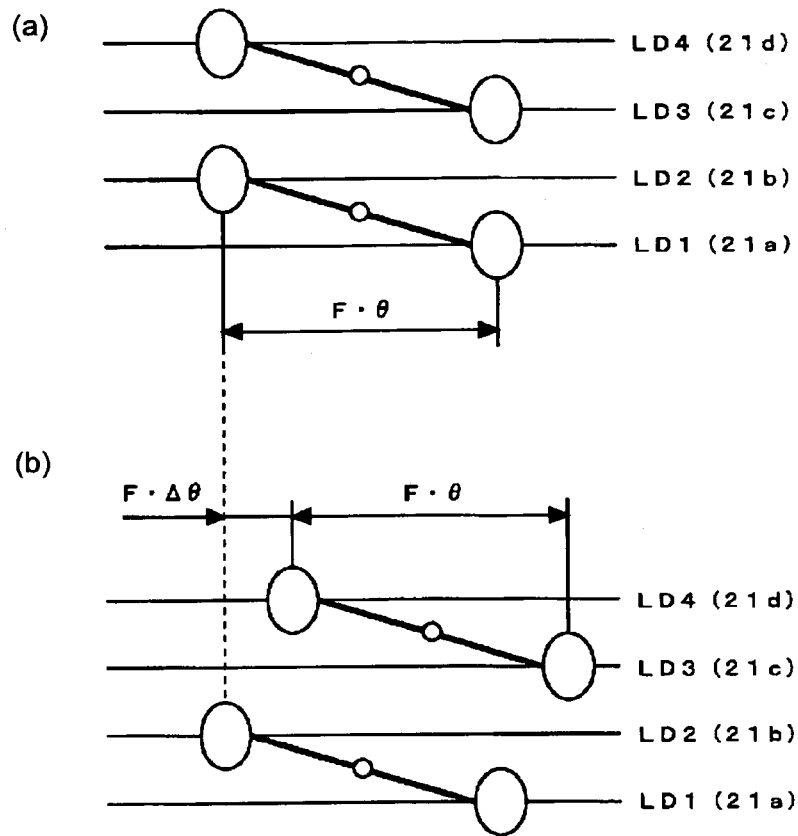
FIG. 22A is a schematic of an arrangement of beam spots on a surface to be scanned when two light sources are mounted the same surface.
FIG. 22B is a schematic of an arrangement of beam spots on a surface to be scanned when surfaces on which two light sources are mounted are nonparallel.

FIG. 22A is a diagram of an arrangement of beam spots on a surface subjected to scanning (the surface of the photosensitive drum 16) when the surface on which the first light source 41 and the second light source 42 are fixed is the same parallel surface in the first example of the present invention. FIG. 22B is a diagram of an arrangement of beam spots on the surface subjected to scanning (the surface of the photosensitive drum 16) when the surfaces on which the first light source 41 and the second light source 42 are fixed are nonparallel surfaces.

In the diagram of optical paths in FIG. 20B and FIG. 21B, optical path of light beam from the first light source 41 and second light source 42 up to the polygon mirror 14 is shown as an expanded optical path of a portion of the beam-combining prism 17 not shown in the diagram (the cylindrical lens 13 is omitted in the diagram).

FIG. 21A, FIG. 21B, and FIG. 22A show arrangements in which the four laser beams are allowed to be nonparallel in the deflecting surface. As shown in FIG. 21B, an arrangement is made such that the two laser beams emerged from the first light source 41 and the two laser beams emerged from the second light source 42 cross each other at an angle θ.

On the other hand, as shown in FIG. 21A, the fixing surface (side wall 54a) on which the first light source 41 is fixed and the fixing surface (side 54b) on which the second light source 42 is fixed, are provided such that the two surfaces are separated by an angle Δθ (in the deflecting surface).

Therefore the arrangement of beam spots on the surface 16 subjected to scanning is as shown in FIG. 22A. The scanning optical system 15 is a system in which the scanning at substantially constant speed is secured. If the focal length in the main scanning direction is F, according to Fθ characteristics that are known, the distance (F·θ or F·Δθ) between the beam spots in the main scanning direction shown in FIG. 22A can be calculated.

As mentioned earlier, in general, there is a possibility that the position of the beam spot changes with the elapsed time and the change in temperature. For this reason, when the optical scanning apparatus 18 is used as an exposing unit in the image forming apparatus, it is necessary to detect a synchronization signal for determining writing-start timing of each scanning line independently for the four laser beams (a synchronism detection sensor 19 shown in FIG. 9 may be used to obtain the synchronization signal). For this, it is necessary to secure the distance in the main scanning direction between the four beam spots longer than a certain distance (this depends on the scanning speed, responding speed of the synchronism detection sensor 19 etc. and is roughly greater than or equal to 100 μm). In an arrangement shown in FIG. 21A, by setting the angle Δθ suitably, it is possible to achieve the optimum distance (F·Δθ) between the main scanning beam spots.

For example, if the main scanning focal length F of the scanning optical system is 200 mm, the angle Δθ by which the fixing surfaces are separated from each other is 0.15°=(0.15°/180°)×π(rad), then a distance Δγ between the main scanning beam spots $$\Delta\gamma = 200 \times \{(0.15°/180°) \times \pi\}$$
$$= 0.52 \text{ mm}$$

can be calculated.

As shown in FIG. 12, corresponding to an optical path of each of the laser beam, the wedge-shaped prisms 40a to 40d are disposed between the first light source 41, the second light source 42 and the beam-combining prism 17. The wedge-shaped prisms 40a to 40d are disposed such that they can be rotated. The wedge-shaped prisms 40a to 40d are transmission-type prisms which have two nonparallel surfaces viz. a surface of incidence and a surface of emergence. The wedge-shaped prisms have function of deflecting the optical path of the laser beam by a very small angle.

Figure 23:
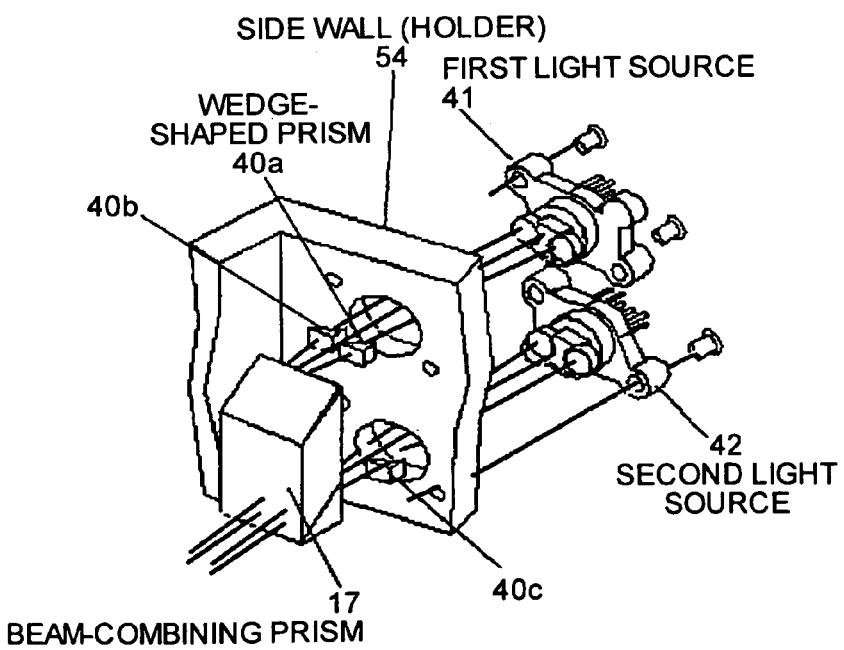
FIG. 23 is a schematic of another example of an arrangement of wedge-shaped prisms.

FIG. 23 is a diagram of another example of an arrangement of wedge-shaped prisms according to the first example of the present invention. The wedge-shaped prisms are not required to be disposed in the optical paths of all the laser beams. Three (or less than three) wedge-shaped prisms may be used as shown in FIG. 23.

Figure 2A:
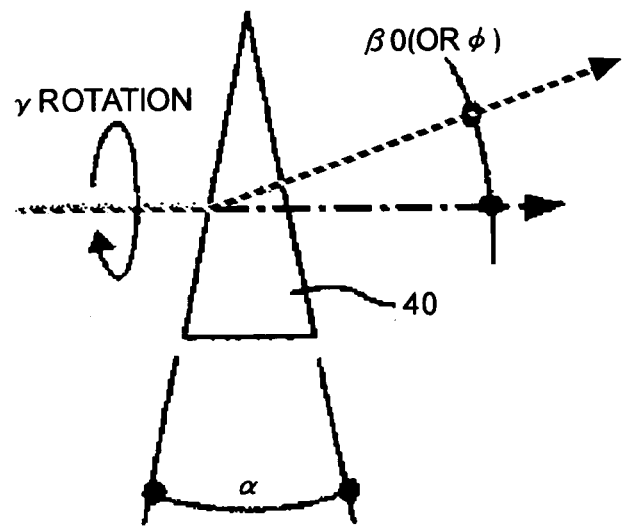
FIG. 2A is a side view of a wedge-shaped prism used in the present invention.
Figure 2B:
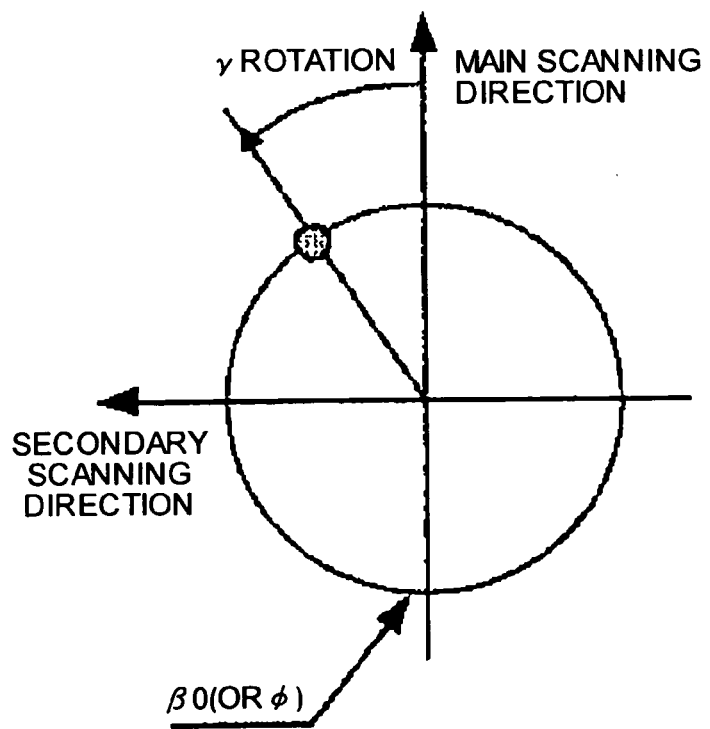
FIG. 2B is a front view of the wedge-shaped prism seen from a direction of the optical path for illustrating deflection of beam and rotation of the prism.

A schematic diagram of deflection of an optical path by the wedge-shaped prism in the main scanning cross-section and a schematic diagram of deflection of an optical path by the wedge-shaped prism in the surface subjected to scanning and a parallel surface, are as shown in FIG. 2A and FIG. 2B.

In other words, as shown in FIG. 2A, when the laser beam is incident on the wedge-shaped prism that has an apex angle $\alpha$, the laser beam is refracted at the wedge-shaped prism and the optical path is deflected by an amount $\beta 0=(n-1)\alpha$ (in a comparatively smaller range of $\alpha$). In other words, it is possible to achieve the desired angle of deflection $\beta 0$ easily by setting appropriately the apex angle $\alpha$ of the wedge-shaped prism (according to characteristics of the optical systems which are combined).

Here, the direction of emergence of the laser beam can be varied along the circumference of radius $\beta 0$ by causing the wedge-shaped prism to rotate around an axis of rotation that is substantially parallel to the optical axis of the laser beam (called as $\gamma$ rotation).

A state in which the wedge-shaped prism is disposed such that the surface of incidence and the surface of emergence of the wedge-shaped prism are perpendicular to the deflecting surface, is let to be an initial state and the wedge-shaped prism can be caused to perform $\gamma$ rotation from the initial state.

Thus, as shown in FIG. 2B, it is possible to vary a component in the secondary scanning direction without changing to a great extent, the main scanning direction of the emerged beam.

As in an adjustment of distance between the scanning lines by $\gamma$ rotation of the wedge-shaped prism which is mentioned later, if the focal length of the collimating lens is fcol, secondary scanning lateral magnification of all optical systems is mz, an angle of adjustment around the axis of rotation of the wedge-shaped prism is $\Delta\gamma$, then an amount of correction $\Delta z$ in the position (in the secondary scanning direction) of the beam spot on the surface subjected to scanning is expressed by the following equation which is same as equation (3).

$$\Delta z = m \times \text{fcol} \times \tan(\beta 0 \times \sin \Delta \gamma)$$

In other words, by controlling the angle of rotation $\Delta\gamma$ of the wedge-shaped prism, it is practically possible to shift the position of the beam spot on the surface subjected to scanning in the secondary scanning direction (can be adjusted to the desired value) (see FIG. 5).

The wedge-shaped prism may also be rotated manually. However, by rotating the wedge-shaped prism by an actuator that can be controlled by an electric signal such as a stepping motor or an ultrasonic motor, the operation is improved practically to a great extent.

The wedge-shaped prism may be formed such that the surface of incidence and the surface of emergence are two nonparallel flat surfaces. However, in general, irrespective of the material (glass, resin etc.) and the processing method (cutting, forming), it is difficult to process the flat surfaces to have high accuracy. Therefore, at least one of the surface of incidence and the surface of emergence may be formed in advance to have a curvature.

When it is desirable that the wedge-shaped prism has no refracting power, two curved surfaces which have substantially equal radii of curvature (combination of concavo-convex or convexo-concave) may be let to be the surface of incidence and the surface of emergence. For providing the refracting power positively, a radius of curvature corresponding to the refracting power may be provided.

Figure 24A:
FIG. 24A is a schematic of a wedge-shaped prism in which both of a surface of incidence and a surface of emergence are flat.
Figure 24B:
FIG. 24B is a schematic of a wedge-shaped prism in which the surface of incidence and the surface of emergence are concavo-convex two curved surfaces with substantially equal radii of curvature.
Figure 24C:
FIG. 24C is a schematic of a wedge-shaped prism in which any one of the surface of incidence and the surface of emergence is a flat surface and the other is a concave surface.
Figure 24D:
FIG. 24D is a schematic of a wedge-shaped prism in which both the surface of incidence and the surface of emergence are convex surfaces.

FIG. 24A and FIG. 24C are examples of the basic shape and modified shapes of the wedge-shaped prism in the first example of the second embodiment. FIG. 24A is a diagram of the wedge-shaped prism 40 in which both the surface of incidence and the surface of emergence are flat. FIG. 24B is a diagram of the wedge-shaped prism 40 in which the surface of incidence and the surface of emergence are concavo-convex two curved surfaces with substantially equal radii of curvature. The wedge-shaped prism 40 shown in FIG. 24B, practically, does not have refracting power. FIG. 24C is a diagram of the wedge-shaped prism 40 in which any one of the surface of incidence and the surface of emergence is a flat surface and the other is a concave surface. The refracting power can be used in the wedge-shaped prism 40 shown in FIG. 24C. FIG. 24D is a diagram of the wedge-shaped prism in which both the surface of incidence and the surface of emergence are convex. The refracting power can be used in the wedge-shaped prism 40 shown in FIG. 24D.

An arrangement of beam spots on the photosensitive drum 16 in the first example of the second embodiment is as shown in FIG. 10. As described earlier, in FIG. 10, LD1 and LD2 denote the positions of the beam spots of the two laser beams which are emerged from the first light source 41 and LD3 and LD4 denote the positions of the beam spots of the two laser beams which are emerged from the second light source 42.

Further, C1 and C2 in FIG. 10 denote center positions between LD1 and LD2 and between LD3 and LD4 respectively. C1 and C2 denote the positions of spots of virtual laser beams which are emerged from the first light source 41 and the second light source 42.

While assembling the four-beam optical scanning apparatus, the beam pitch between LD1 and L2 (distance between the scanning lines) can be adjusted by $\gamma$ rotation of the first light source 41 (rotation in a direction of an arrow $\Delta Y1$ in FIG. 8). After adjusting the beam pitch, the first light source 41 may be fixed to the side wall 54 by the screw 45.

The beam pitch between LD3 and LD4 can be adjusted by carrying out the similar adjustment ($\Delta Y2$) and fixing of the second light source 42.

For example, if an angle of intersection $2\Theta$ in the deflecting surface of the two beams (LD1 and LD2) emerged from the first light source 41 is $\theta$ (need not cross necessarily near the polygon mirror), focal length of the coupling lens is fcol, the secondary scanning magnification of all systems (from the point of emission of light to the surface subjected to scanning) is mz, and an angle of rotation roughly around the optical axis of the light source is $\gamma$, and an amount of change of the beam pitch between the two beams LD1 and LD2 is expressed by $\Delta p$, then the following equation (2) can be derived as described earlier $$\Delta p = mz \times \text{fcol} \times \tan\Theta \times \sin Y$$

When mz=10 times, fcol=15 mm, $\Theta=2°$, $\Delta p=50$ μm=0.050 mm, the angle of rotation $\gamma$ of the light source is $$\gamma = \sin^{-1}\{\Delta p/(m \times fcol \times \tan\Theta)\}$$
$$= \sin^{-1}\{0.050/(10 \times 15 \times \tan 2)\}$$
$$= 0.55°.$$

While assembling the optical scanning apparatus 18, according to equation 4, the distance between the scanning line of LD1 and LD2 and the scanning line of LD3 and LD4 can be adjusted by γ rotation of the first light source 41 and the second light source 42. When the resolution (accuracy) of the γ rotation of the first light source 41 and the second light source 42 is not sufficient or when there is a possibility of shift in the adjustment value while fixing the first light source 41 and the second light source 42 (tightening of a screw), sometime the accuracy of adjustment cannot be achieved. In such a case, by γ rotation of the wedge-shaped prism (by causing the wedge-shaped prism to rotate around an axis of rotation that is substantially parallel to the optical axis) it is possible to adjust the distance between the scanning lines even more accurately.

By rotating the wedge-shaped prism 40 shown in FIG. 2 around the optical axis, the angle of deflection can be varied by maximum of φ (=β0) due to refraction. If an apex angle of the wedge-shaped prism is α and the refractive index of the wedge-shaped prism is n, the maximum angle of deflection φ is expressed by $$\phi = (n-1) \times \alpha$$

If the focal length of the collimating lens is fcol, the secondary scanning lateral magnification of all the optical systems is m, and an angle of adjustment around the axis of rotation of the wedge-shaped prism is Δγ, then the correction amount Δz in the position of beam spot (secondary scanning direction) on the surface subjected to scanning is expressed by $$\Delta z = m \times fcol \times \tan(\phi \times \sin \Delta \gamma)$$

An example of a mechanism for adjustment in which the wedge-shaped prism 40 is caused to rotate around the axis of rotation is as shown in FIG. 5. As shown in FIG. 5, the rotation-adjusting unit of the wedge-shaped prism 40 includes a lead screw actuator that is driven by a stepping motor. The wedge-shaped prism 40 is inserted into a prism cell 55 which includes a pressing portion (pressed by a nut of the stepping motor) that is extended from a circular cylindrical portion.

Figure 25:
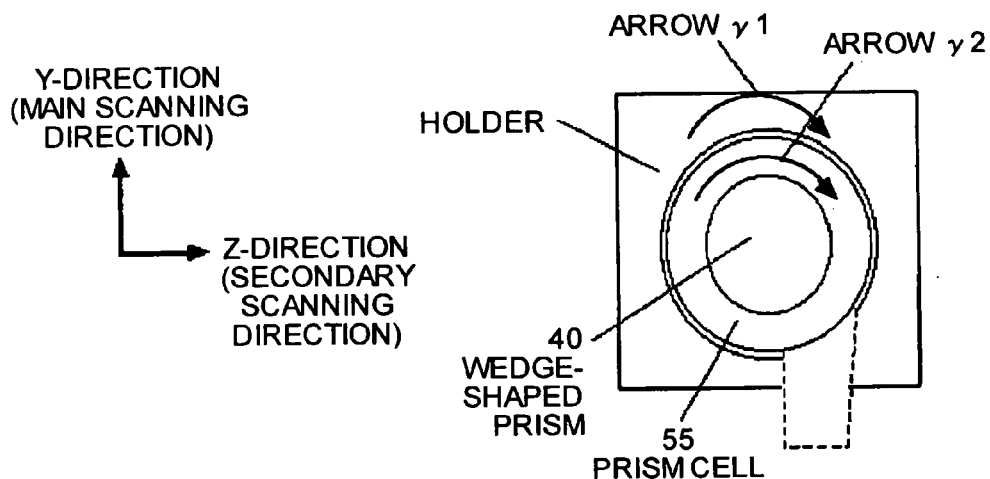
FIG. 25 is a schematic of another mechanism for adjustment that causes the wedge-shaped prism in an embodiment according to the present invention to rotate around an axis of rotation, as viewed from the direction of an optical axis.
Figure 26:
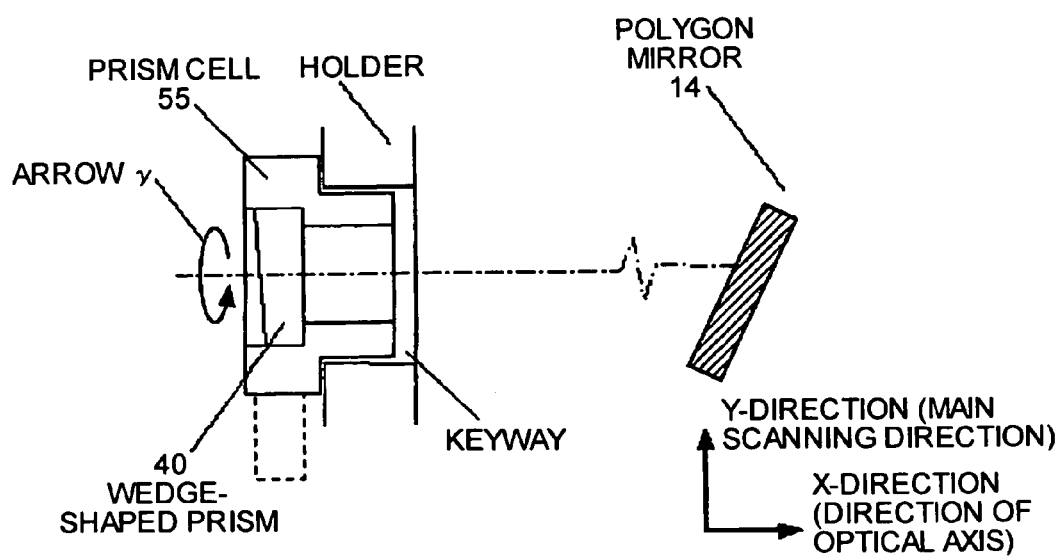
FIG. 26 is a schematic of still another mechanism for adjustment that causes the wedge-shaped prism in an embodiment according to the present invention to rotate around the axis of rotation as viewed from the secondary scanning direction.

FIG. 25 and FIG. 26 are diagrams of other examples of mechanism for adjusting that causes the wedged shape prism 40 to rotate around the axis of rotation in the first example of the present invention. FIG. 25 is a diagram of the mechanism for adjustment as viewed from the direction of the optical axis. FIG. 26 is a diagram of the mechanism for adjustment as viewed from the secondary scanning direction.

A structure in which the prism cell 55 is allowed to be in contact with a V-shaped groove formed in the holder as explained earlier is shown in FIG. 5. On the other hand, an example of a structure in which the prism cell 55 is inserted into the keyway that is provided on the holder and supported.

When the wedge-shaped prism is rotated by an actuator that includes the stepping motor and the lead screw combined together, an amount of shift Δz in the secondary scanning direction of the beam spot on the surface subjected to scanning is expressed by the following equation (5) by using the following parameters.

fcol: focal length of collimating lens
mz: secondary scanning magnification of all the optical systems (from the light source to the surface subjected to scanning)
my: main scanning magnification of all the optical systems (from the light source to the surface subjected to scanning)

α: apex angle of wedge-shaped prism
n: refractive index of wedge-shaped prism
β0: angle of deflection of wedge-shaped prism=(n−1)×α
N: number of input pulses (steps)
Δγ: angle of rotation of triangular prism per N pulses= $\tan^{-1}((\omega/360°) \times P \times N/R)$
ω=step angle of stepping motor (per pulse)
P: pitch of lead screw
R: length of span of wedge-shaped prism cell
fcyl: focal length of cylindrical lens
m1 : secondary scanning magnification of optical system before polygon
m2 : secondary scanning magnification of optical system after polygon $$\Delta z = m \times fcol \times \tan\beta 0 \times \sin\Delta\gamma$$
$$= m \times fcol \times \tan\{(n-1)\alpha\}\sin[\tan^{-1}\{(\omega/360°) \times P \times N/R\}]$$
$$\Delta\gamma = \tan^{-1}[(\omega/360°) \times P \times N/R]$$

It is possible to adjust the position of the secondary scanning beam spot (i.e. distance between the scanning lines: secondary scanning beam pitch) corresponding to the number of input pulses. Further, by setting appropriately the apex angle α of the wedge-shaped prism 40 (designed to match with the scanning optical system 15 to be combined), the sensitivity of the adjustment (an amount of change in the position of the secondary scanning beam spot corresponding to the number of input steps) can be optimized.

For example, if mz=10 times, fcol=15 mm, n=1.514, α=1.5°, ω=18°, P=0.25 mm, N=1, R=16 mm, then Δz is $$\Delta z = mz \times fcol \times \tan\{(n-1)\alpha\} \times \sin[\tan^{-1}\{\omega/360°\} \times P \times N/R\}$$
$$= 10 \times 15 \times \tan\{(1.514-1) \cdot 1.5°\} \times$$
$$\sin[\tan^{-1}\{(18°/360°) \times 0.25 \times 1/16\}$$
$$= 1.577 \times 10^{-3} \text{ mm}$$
$$= 1.6 \text{ μm}$$

and per input pulse to the stepping motor, the beam spot can be varied by 1.6 μm.

Therefore, when the amount of adjustment ΔC of the distance between the center positions C1 and C2 is 100 μm=0.100 mm, the adjustment can be carried out by a pulse input of 64 steps.

Moreover, the amount of shift Δy of the beam spot on the surface subjected to scanning in the main scanning direction is expressed by $$\Delta y = m \times fcol \times \tan\{\beta 0 \times (1 - \cos\Delta\gamma)\} \quad (5)$$
$$= m \times fcol \times \tan\{(n-1)\alpha \times$$
$$(1 - \cos[\tan^{-1}\{(\omega/360°) \times P \times N/R\}])\}$$

where m is the main scanning lateral magnification of all the optical systems.

Figure 27A:
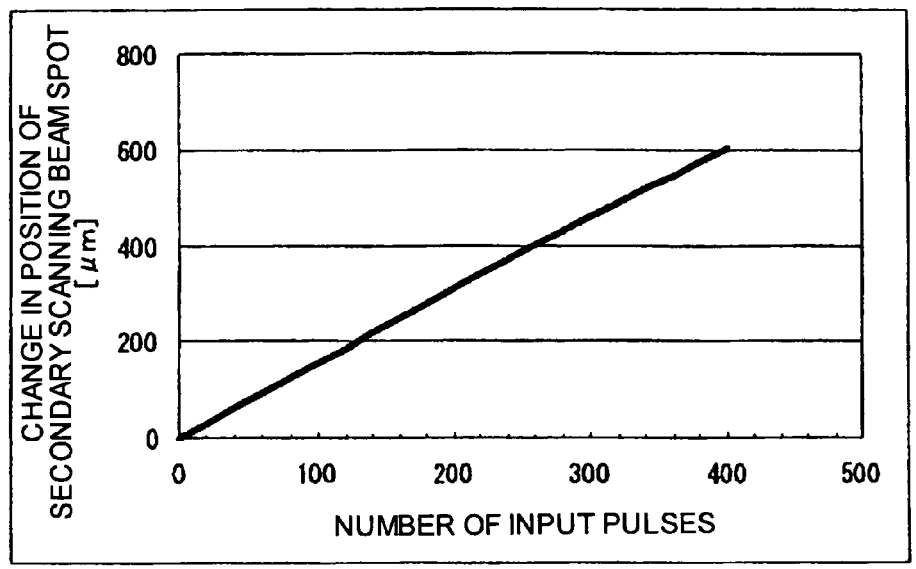
FIG. 27A is a graph of a change in position in the secondary scanning direction due to γ rotation of the wedge-shaped prism.

FIG. 27A is a graph indicating the change in the position (amount of adjustment) in the secondary scanning direction due to γ rotation of the wedge-shaped prism 40 in the first example of the present invention. In the graph, the vertical axis represents the change in position $\Delta z$ (μm) of the secondary scanning beam spot in equation (3) and the horizontal axis represents the input pulse (number of pulses).

Figure 27B:
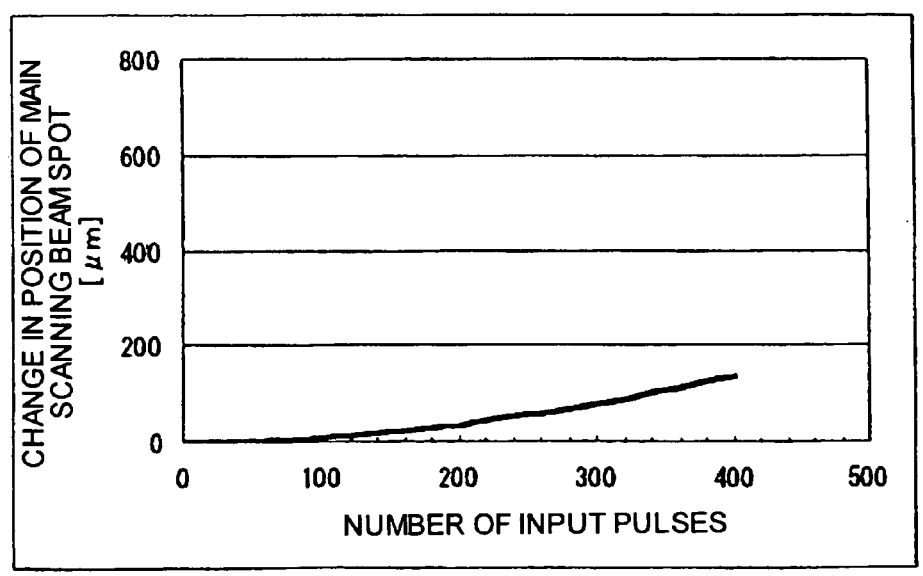
FIG. 27B is a graph of a change in position of the main scanning direction due to γ rotation of the wedge-shaped prism.

FIG. 27B is a graph indicating the change in the position in the main scanning direction due to γ rotation of the wedge-shaped prism 40 in the first example of the present invention. In the graph, the vertical axis represents the change in the position $\Delta y$ (μm) of the main scanning beam spot in equation (5) and the horizontal axis represents the input pulse (number of pulses).

From FIG. 27A and FIG. 27B, it can be seen that according to the number of input pulses N, the position of the secondary scanning beam spot can be shifted (adjusted) linearly without the position of the main scanning beam spot being affected much.

Thus, according to the second embodiment, the wedge-shaped prism 40 that can deflect the incident beam by a predetermined angle can be disposed in the optical path of at least one of the light beams between the first light source 41 and the second light source 42 provided with two semiconductor lasers respectively and the beam-combining prism 17 that combines the light beams from the first light source 41 and the second light source 42. An angle through which the incident beam is to be polarized, can be adjusted by rotating the wedge-shaped prism 40 around an axis that is roughly parallel to the optical axis. By rotating the wedge-shaped prism 40 in this manner, the position of the beam spot that is irradiated on the surface 16 subjected to scanning can be adjusted.

Further, according to the second embodiment, the first light source 41 and the second light source 42 are held by the side wall 54 (or side walls 54a and 54b) which is a common holder. By holding the first light source 41 and the second light source 42, the fluctuation of the optical axis of the emergent beams from the first light source 41 and the second light source 42 which is caused by elapsing of time or the change in the temperature can be reduced.

According to the second embodiment, the fixing surface on which the second light source 42 is fixed, is separated by angle θ from the fixing surface on which the second light source 41 is fixed. By separating the two fixing surfaces by angle θ, the laser beams emerged from the first light source 41 and the second light source 42 are allowed to be nonparallel in the deflecting surface. Therefore, the main scanning beam pitch of not less that a predetermined width in the surface 16 subjected to scanning for detecting independently the synchronization signal of each of the laser beams, can be secured.

Further, the state in which the surface of incidence and the surface of emergence of the wedge-shaped prism 40 are perpendicular to the deflecting surface is let to be the initial state. By doing so, the position of the secondary scanning beam spot can be shifted (adjusted) without the position of the main scanning beam spot being affected much.

Since the wedge-shaped prism 40 is driven by the actuator, the position of the beam spot can be adjusted easily.

Further according to the second embodiment, transmission-type prism is used as the wedge-shaped prism 40 in which the surface of incidence and the surface of emergence are nonparallel. Therefore, the desired angle of deflection can be achieved easily by the transmission-type prism by appropriately designing the apex angle.

At least one of the surface of incidence and the surface of emergence is formed to have a curvature. Therefore, a highly accurate surface shape can be formed irrespective of the material (glass, resin etc.) and the processing method (cutting, forming).

The following is a description of a second example of the second embodiment. Structure and operation in the second example are similar to those in the first example unless otherwise mentioned.

Figure 28B:
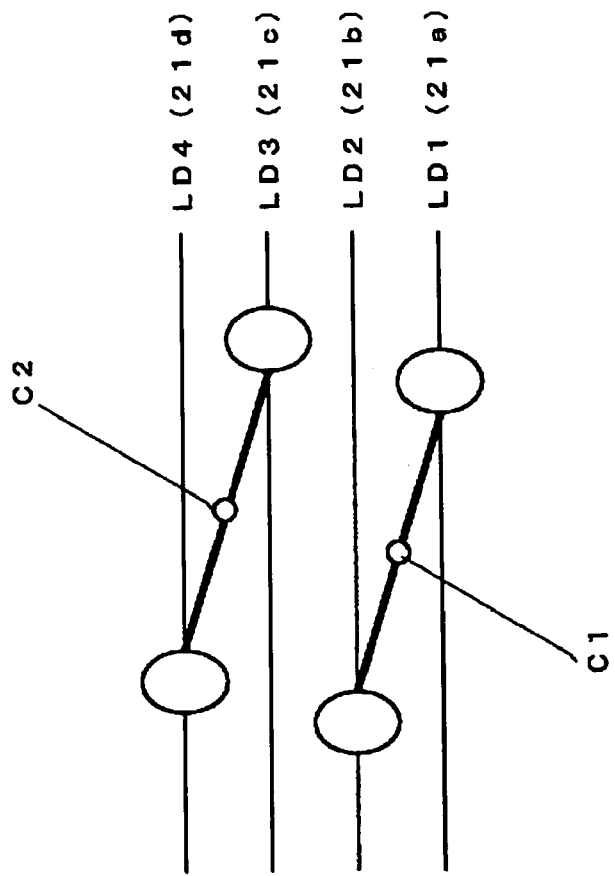
FIG. 28B is a schematic of an arrangement of beam spots on a surface to be scanned in the case shown in FIG. 28A.
Figure 28A:
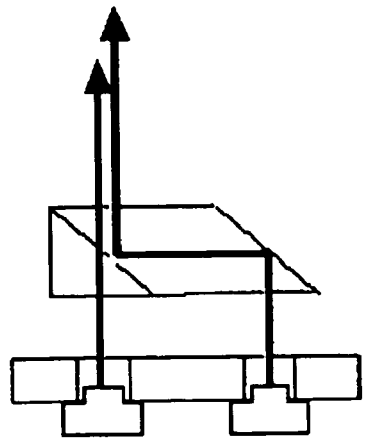
FIG. 28A is an example of a structure of a beam-combining prism and a holder (side wall)

When the fixing surfaces on which the first light source 41 and the second light source 42 are fixed is the same surface FIG. 28A and FIG. 28B are diagrams of a case in which the beam-combining prism 17 and the holder (side wall) 54 are structured ideally. In such a case, the laser beams are still parallel to each other after the laser beams parallel to each other which are emerged by the first light source 41 and the second light source 42 are brought closer by the beam-combining prism 17 and then combined.

FIG. 29A is a diagram illustrating an error in combining the beams caused due to the surface on which the first light source 41 and the second light source 42 are fixed not being flat. FIG. 29B is a diagram illustrating an error in combining the beams caused due to an error in processing of the beam-combining prism 17. FIG. 29C is a diagram of positions of beam spots when there is an error in combining the beams. A case, in which the two emergent beams are not parallel during use, is described below by referring to FIG. 29A, FIG. 29B, and FIG. 29C.

(i) When the fixing surface is not flat: FIG. 17A

If the fixing surface is not flat, positional and directional accuracy of fixing for at least one of the first light source 41 and the second light source 42 is insufficient and the laser beams emerged from the first light source 41 and the second light source 42 are not parallel.

(ii) When an accuracy of the beam-combining prism is insufficient: FIG. 29B

If there is a difference in the refractive index of the triangular portion and the quadrangular portion of the beam-combining prism 17, the laser beams emerged from the first light source 41 and the second light source 42 are not parallel. If there is an error in the processing (error in angle, error in parallelism) of at least one of the triangular portion or the quadrangular portion of the beam-combining prism 17, the laser beams emerged from the first light source 41 and the second light source 42 are nonparallel.

As mentioned in (i) or (ii) above, if there is an error in the beam combining, there is a possibility that the center position C1 of the two laser beams emerged from the first light source 41 and the center position C2 of the two laser beams emerged from the second light source 42 may differ considerably from the target position.

For example, if mz=10 times, fcol=15.0 mm, and $\Delta\varphi$=10', then as shown in FIG. 29C, $$C2 - C1 = mz \times fcol \times \tan\Delta\varphi$$
$$= 10 \times 15.0 \times \tan(10')$$
$$= 0.436 \text{ mm}$$
$$= 436 \text{ μm}.$$

As shown in FIG. 20A, by allowing the side wall (holder) 54 to be one flat surface, it is possible to prevent the insufficiency in the positional and directional accuracy of fixing for at least one of the first light source 41 and the second light source 42 and to prevent the laser beams emerged from the first light source 41 and the second light source 42 from being nonparallel.

When the wedge-shaped prism 40 is rotatable in the prism cell

As shown in the adjustment of distance between the scanning lines by γ rotation of the wedge-shaped prism in the first example of the present invention, the distance between the scanning lines can be adjusted by using the wedge-shaped prism.

Not only while assembling the optical scanning apparatus 18, but even when there is a change in the distance between the scanning lines due to elapsing of time or changes in the environment, the correction of the change in the distance between the scanning lines can be carried out by using γ rotation of the wedge-shaped prism 40. In such a case, by driving the stepping motor upon deriving the number of input pulses to be input to the stepping motor based on the recorded data of correction of the amount of change or data of the amount of change that is measured by the amount of change detector, the correction of the change in the distance between the scanning lines can be carried out.

The error Δφ in the beam combining which is shown in a case where the fixing surface of the first light source 41 and the second light source 42 is to be formed as the same flat surface, is of the order of few tens of minutes whereas the shift in the optical axis of the laser beams with the elapsing of time and the change in temperature is few minutes at the most.

Therefore, to carry out correction of error Δφ in beam combining, it is not a rational way to drive the wedge-shaped prism 40 (and the prism cell 55) by using an actuator like the stepping motor shown in FIG. 5.

Therefore, as shown in FIG. 25, an external shape, or a part of the external shape of the wedge-shaped prism 40 (as viewed from a side of incidence; viewed in parallel to X direction) is let to be circular in shape (D-cut shaped, oval shaped) and the wedge-shaped prism 40 can be inserted into the prism cell 55. While assembling, the wedge-shaped prism 40 may be rotated (rotations in the direction of an arrow Y2 in FIG. 25) inside the prism cell 55 by using a jig. To carry out correction of the change in the distance between the scanning lines caused due to the elapsing of time and the change in the temperature, the wedge-shaped prism 40 may be driven (rotations in the direction of an arrow Y1) by an actuator like the stepping motor (not shown in the diagram).

Thus, by distributing the function of correction (Y1) of the distance between the scanning lines that is carried out with the elapsing of time and the change in temperature, a range of operation of the actuator (in FIG. 5, the amount of turning of the nut in the stepping motor) can be reduced to a smaller range. By reducing the range of the actuator to the smaller range, the size and weight of the mechanism for γ rotation of the wedge-shaped prism 40 can be reduced.

Thus, according to the second embodiment, the first light source 41 and the second light source 42 are held on the same flat surface. By doing so, the accuracy (flatness) of the fixing surface can be secured thereby enabling to secure highly accurate beam combination at the beam-combining prism 17.

Further, according to the second embodiment, the wedge-shaped prism is rotatably held in the prism cell 55. Therefore, the functions of the correction of the change in the position of the beam spot while assembling the optical scanning apparatus and the correction of the change in the beam position due to the elapsing of time and the change in temperature, can be divided and a driving range of the actuator can be reduced to a smaller range. This enables to realize the reduction in size of the mechanism for adjustment of the wedge-shaped prism.

The following is a description of a third example according to the second embodiment. Structure and operation in the third example are similar to those in the first example unless otherwise mentioned.

As in the case where the four laser beams are caused to be nonparallel in the deflecting surface, by causing the optical path to be nonparallel in the deflecting surface, the synchronization signals of the four laser beams can be detected independently with ease.

On the other hand, as shown in the case where the fixing surface of the first light source 41 and the second light source 42 is the same flat surface, due to this the positional and directional accuracy of fixing for at least one of the first light source 41 and the second light source 42 is sufficient and the laser beams emerged from the first light source 41 and the second light source 42 can be suppressed from being nonparallel.

Figure 30:
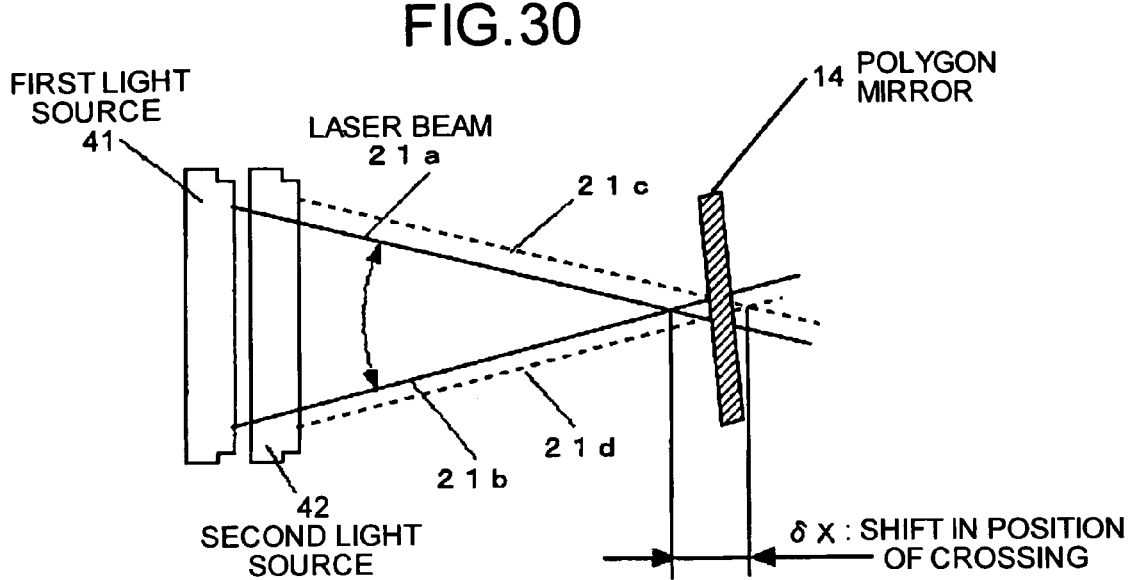
FIG. 30 is a schematic of optical paths of laser beams before disposing the wedge-shaped prism.

FIG. 30 is a diagram of optical paths of laser beams before disposing the wedge-shaped prism 40. As shown in FIG. 30, when the beams are combined by using the beam-combining prism 17, there is a difference (difference of optical path length in the beam-combining prism 17) between a distance from the first light source 41 to the polygon mirror 14 and a distance between the second light source 42 and the polygon mirror 14 and there is a shift δX in a crossing position. Due to the shift in the crossing position, a reflection point in the deflecting and reflecting surface of the polygon mirror 14 is different for each beam. As a result, there is a possibility of deterioration or deviation of the optical function at the surface 16 subjected to scanning.

Figure 31:
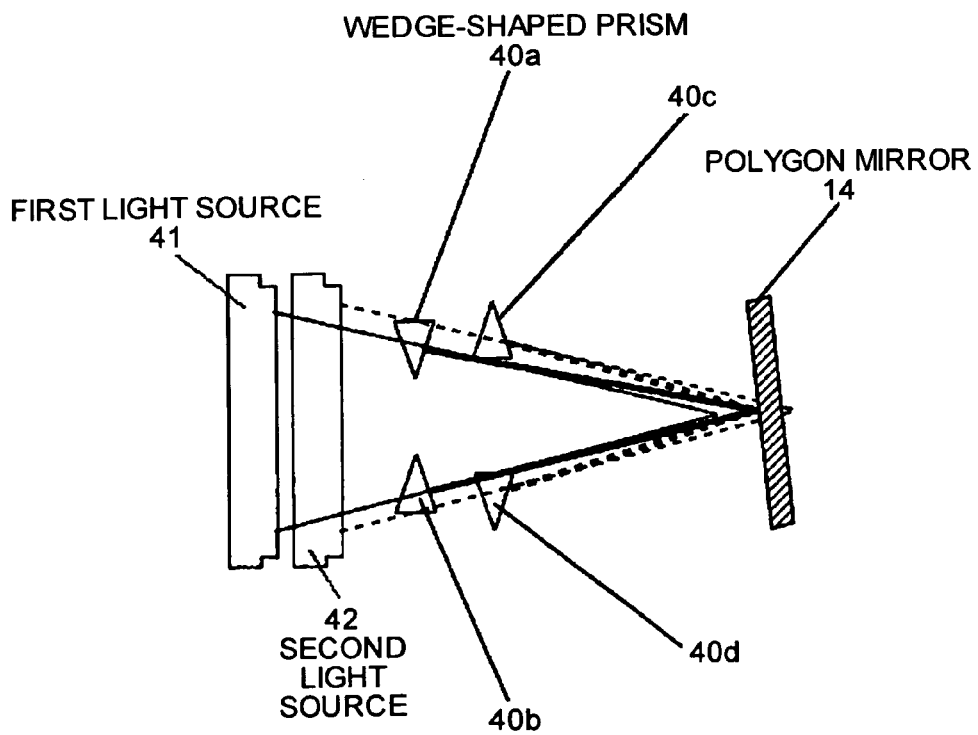
FIG. 31 is a schematic of an optical path of laser beam after disposing the wedge-shaped prism.

FIG. 31 is a diagram of optical paths of laser beams after disposing the wedge-shaped prism 40 according to the third example of the present invention. As shown in FIG. 31, taking into consideration Notes 1 to 3, the wedge-shaped prisms 40a to 40d can be disposed in the optical paths of the four laser beams respectively.

As shown in a case in FIG. 31, in an initial state before the adjustment of the distance between the scanning lines, the wedge-shaped prisms 40a to 40b are disposed in the optical paths of laser beams 21a and 22b emerged from the first light source 41 such that the apex angle of each wedge-shaped prism faces the optical path other than that in which the wedge-shaped prism is disposed.

On the other hand, the wedge-shaped prisms 40c and 40d are disposed in the optical paths of laser beams 21c and 22d emerged from the second light source 42 such that the apex angle of each wedge-shaped prism is facing the optical path other than that in which the wedge-shaped prism is disposed.

By adopting a structure as shown in FIG. 31, with the same fixing surface for the first light source 41 and the second light source 42, the optical paths of the four laser beams can be caused to be nonparallel and the shift δX in the crossing position of the optical paths can be reduced.

For example, if the apex angle of the wedge-shaped prism α=0.5°, the internal refractive index n=1.514, the angle of intersection θ=6.0°, the optical path length from the wedge-shaped prism to the deflecting and reflecting surface of the polygon mirror is 150 mm, the main scanning focal length of the scanning optical system F=200 mm, difference in the optical path length inside the beam-combining prism (i.e. shift in the crossing position) δX=28 mm, then since an angle of deflection of optical path φ is $$\phi=(n-1)\times\alpha=(1.514-1)\times0.5°=0.257°,$$

δX can be corrected to zero (the crossing position of the four laser beams can be allowed to be coincident at the reflecting surface of the polygon mirror) and the main scanning beam pitch is as given below. Since the optical path of each laser beam is deflected by angle φ by the wedge-shaped prisms 40a to 40d, a distance between LD1 and LD3 in the main scanning direction and a distance between LD2 and LD4 in the main scanning direction is F·2φ.

main scanning beam pitch between LD1 and LD3: 2×F× φ=1.8 mm, main scanning beam pitch between LD2 and LD4: 2×F× φ=1.8 mm, main scanning beam pitch between LD1 and LD2: F×(θ−2φ)=19.1 mm.

In the third example, the wedge-shaped prisms 40a to 40d are disposed in the optical paths of all the laser beams. However, the number of prisms may be reduced according to the requirement in the specifications.

Figure 32A:
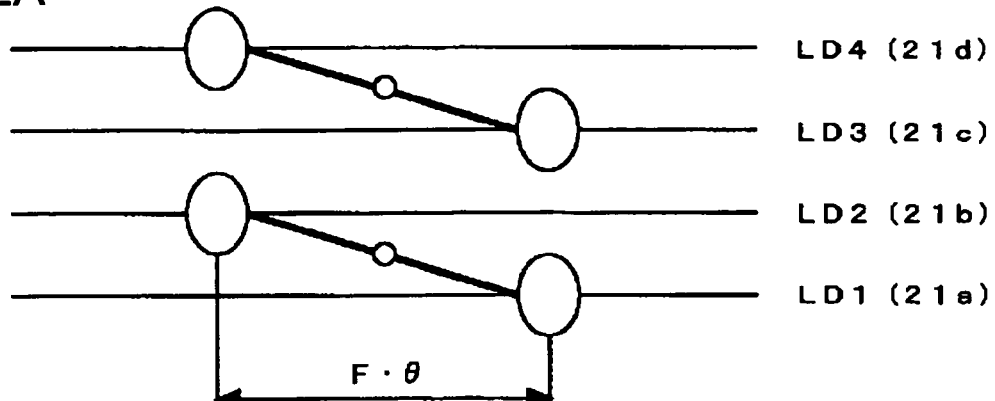
FIG. 32A is a diagram of an arrangement of beam spots on a surface subjected to scanning by laser beam from a light source before disposing the wedge-shaped prism 40.
Figure 32B:
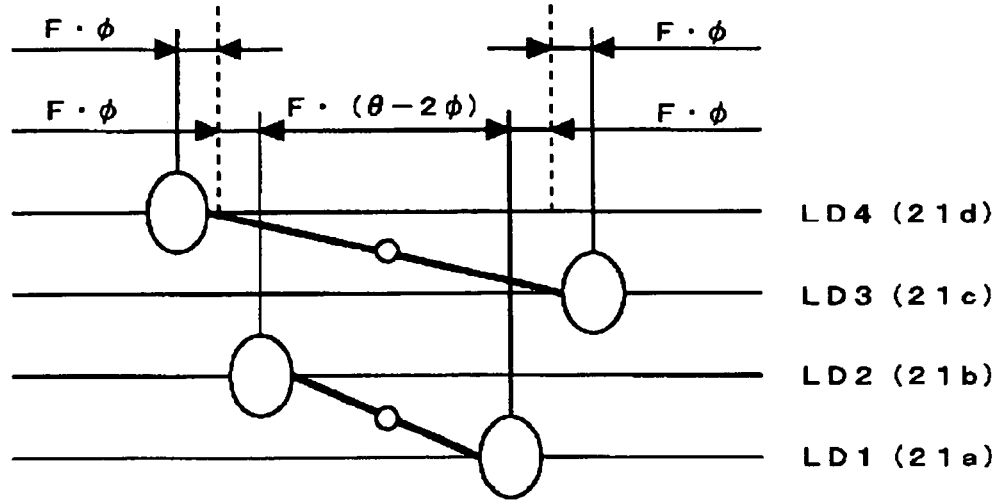
FIG. 32B is a schematic of an arrangement of beam spots on the surface subjected to scanning by laser beam from the light source after disposing the wedge-shaped prism 40.

In the structure shown in FIG. 31, it is desirable that the condition θ=4φ is fulfilled. FIG. 32A is a diagram of an arrangement of beam spots on the surface 16 subjected to scanning by the laser beams from the first light source 41 and the second light source 42 before disposing the wedge-shaped prism 40. FIG. 32B is a diagram of an arrangement of beam spots on the surface 16 subjected to scanning by the laser beams from the first light source 41 and the second light source 42 after disposing the wedge-shaped prism 40.

According to FIG. 32B, if θ=4φ, LD1 to LD4 are arranged at an equal distance from each other (in the main scanning direction). Whereas, if θ<4φ, then the main scanning beam pitch between LD1 and LD2 becomes still smaller and an angle of crossing of the laser beams 21c (from LD3) and 21d (from LD4) in the deflecting surface becomes excessively wider. This may lead to the deterioration (or deviation) of the optical performance of both the beam spots in the surface subjected to scanning.

When α is small, since φ=(n−1)×α, if an equation $$\theta = 4 \times (n-1) \times \alpha \quad \text{(conditional equation 3)}$$

is fulfilled, there is no deterioration of the optical performance and a structure in which Note 3 is taken into consideration, can be realized.

Thus, according to the second embodiment, even if the fixing surface on which the first light source 41 and the second light source 42 are fixed, is the same flat surface, the main scanning beam pitch which is sufficient for detecting independently the synchronization signals can be secured.

Further according to the second embodiment, by fulfilling the conditional equation 3, the main scanning beam pitch which is sufficient for detecting independently the synchronization signal of each beam, can be secured without conspicuous effect on an image surface curve and effective writing width.

The following is a description of a fourth example according to the second embodiment. Structure and operation in the fourth example are similar to those in the first example unless otherwise mentioned.

As in the case where the four laser beams are caused to be nonparallel in the deflecting surface, by causing the optical path to be nonparallel in the deflecting surface, the synchronization signal of the four laser beams can be detected independently with ease.

On the other hand, as shown in the case where the fixing surface of the first light source 41 and the second light source 42 is the same flat surface, due to this the positional and directional accuracy of fixing for at least one of the first light source 41 and the second light source 42 is sufficient and the laser beams emerged from the first light source 41 and the second light source 42 can be suppressed from being unparallel.

Figure 34:
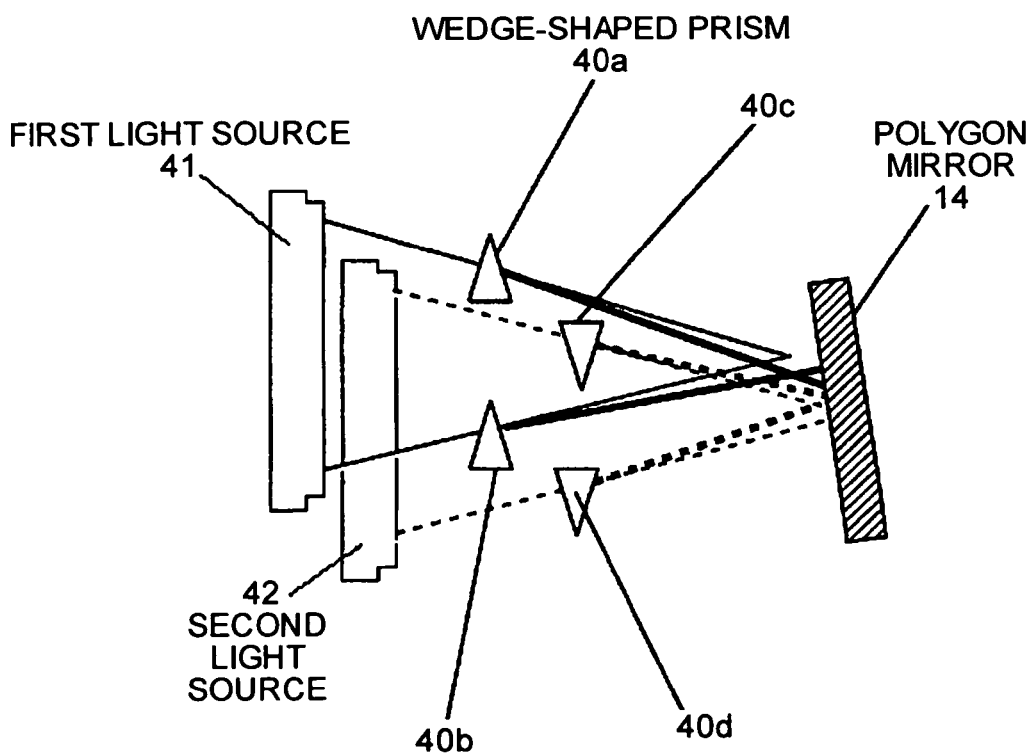
FIG. 34 is a schematic of optical paths of a laser beams after disposing the wedge-shaped prism.

FIG. 34 is a diagram of optical paths of laser beams after disposing the wedge-shaped prism 40 in the fourth example of the present invention. Taking into consideration Note 2, as shown in FIG. 34, the wedge-shaped prisms 40a to 40d can be disposed in the optical paths of the four laser beams respectively.

Figure 33:
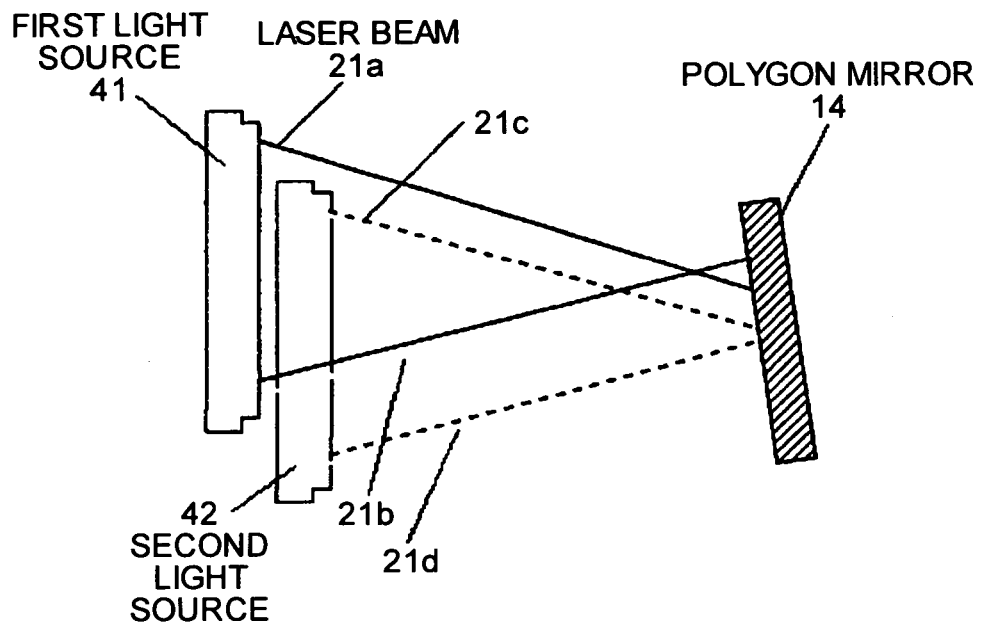
FIG. 33 is a schematic of optical paths of laser beams before disposing the wedge-shaped prism.
Figure 35A:
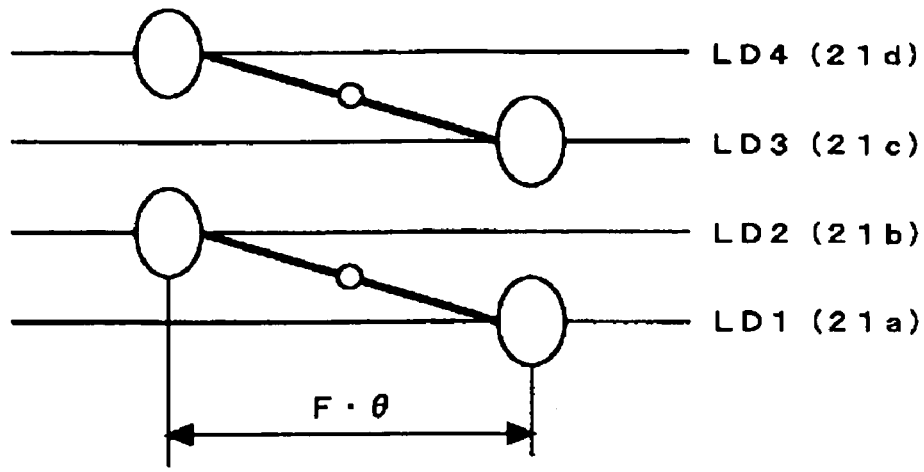
FIG. 35A is a schematic of an arrangement of beam spots on a surface subjected to scanning by laser beams from the light sources before disposing the wedge-shaped prism 40.

FIG. 33 is a diagram of optical paths of laser beams before disposing the wedge-shaped prism 40. FIG. 35A is a diagram of an arrangement of beam spots on the surface 16 subjected to scanning by laser beams from the first light source 41 and the second light source 42 before disposing the wedge-shaped prism 40. As shown in FIG. 33, even if the first light source 41 and the second light source 42 are shifted in the main scanning direction (parallel shift), the laser beams 21a (from LD1) and 21c (from LD3) are parallel and the laser beams 21b (from LD2) and 21d (from LD4) are parallel. Therefore, the arrangement of the beam spots in the surface 16 subjected to scanning is as shown in FIG. 35A (in the main scanning direction, LD1 and LD3 are coincident and LD2 and LD4 are coincident).

On the other hand, in FIG. 34 that describes the fourth example, in the initial state before adjusting the distance between the scanning lines, the apex angles of the wedge-shaped prisms 40a and 40b which are disposed in the optical paths of the laser beams 21a and 22b emerged from the first light source 41 are facing the side same as the optical path. Whereas, the apex angles of the wedge-shaped prisms 40c and 40d which are disposed in the optical paths of the laser beams 21c and 22d emerged from the second light source 42 are facing the side opposite to that faced by the wedge-shaped prisms 40a and 40b.

By adopting such a structure, with the same fixing surface for the first light source 41 and the second light source 42, the optical paths of the four laser beams can be caused to be nonparallel. Further, since the first light source 41 and the second light source 42 are disposed by shifting in the main scanning direction, the correction of the shift in the optical path in the deflecting surface (i.e. the shift in the main scanning direction of the reflecting position at the deflecting and reflecting surface of the polygon mirror) by the wedge-shaped prism 40a and 40d can be carried out.

For example, if the apex angle of the wedge-shaped prism α=0.5°, an internal refractive index n=1.514, the angle of intersection θ=6.0°, the optical path length from the wedge-shaped prism to the deflecting and reflecting surface of the polygon mirror is 150 mm, the main scanning focal length of the scanning optical system F=200 mm, then, since an angle of deflection of optical path φ at the wedge-shaped prism is $$\phi = (n-1) \times \alpha = (1.514-1) \times 0.5° = 0.257°,$$

the main scanning beam pitch is as given below.

main scanning beam pitch between LD1 and LD3: 2×F× φ=1.8 mm, main scanning beam pitch between LD2 and LD4: 2×F× φ=1.8 mm, main scanning beam pitch between LD2 and LD3: F×(θ−2φ)=19.1 mm.

In the second embodiment, the wedge-shaped prisms are disposed in the optical paths of all the laser beams. However, the number of prisms may be reduced according to the requirement in the specifications.

Figure 35B:
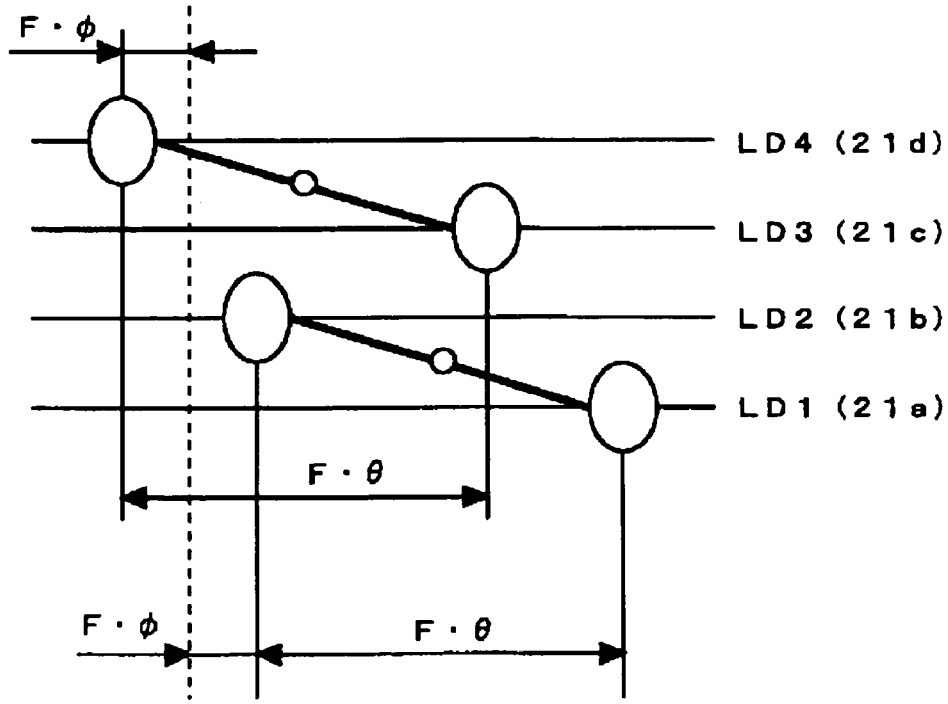
FIG. 35B is a diagram of an arrangement of the beam spots on the surface subjected to scanning by laser beams from the light sources after disposing the wedge-shaped prism 40.

In the structure shown in FIG. 34, it is desirable that the condition θ=4φ is fulfilled. FIG. 35B is a diagram of an arrangement of the beam spots on the surface 16 subjected to scanning by the laser beams from the first light source 41 and the second light source 42 after disposing the wedge-shaped prism 40.

According to FIG. 35B, if θ=4φ then LD1 and LD4 are arranged at an equal distance from each other (in the main scanning direction). Whereas, if θ/2<2φ, then the main scanning beam pitch between LD2 and LD 3 becomes still smaller and an angle of crossing of the laser beams 21a (from LD1) and 21d (from LD4) in the deflecting surface becomes excessively wider. This may lead to the deterioration (or deviation) of the optical performance of both the beam spots in the surface subjected to scanning.

When α is small, since φ=(n−1)×α, if an equation $$\theta = 4 \times (n-1) \times \alpha \qquad \text{(conditional equation 4)}$$

is fulfilled, there is no deterioration of the optical performance and a structure in which Note 2 is taken into consideration, can be realized.

The structure in the third example or in the fourth example may be selected according to the characteristics of the scanning optical systems that are combined and the optical performance that is expected (specifications). For example, in the third example, in a case of excess correction due to the apex angle α of the wedge-shaped prism being too wide (a correction in which the crossing position of the beams 21c and 21d emerged from the second light source 42 is shifted from the crossing position of the beams 21a and 21b emerged from the light source 41, towards the light source by an amount more than δX before correction), if the scanning optical system has enough tolerance for optical specifications, the structure in the fourth example can be adopted.

Thus, according to the second embodiment, even if the fixing surface on which the first light source 41 and the second light source 42 are fixed, is the same flat surface, the main scanning beam pitch for detecting independently the synchronization signals can be secured.

According to the second embodiment, since the first light source 41 and the second light source 42 are fixed after shifting in the main scanning directions, the correction of the shift in the reflecting position of the laser beam in the deflecting and reflecting surface of the polygon mirror 14 can be carried out by deflecting the optical path at the wedge-shaped prism (in the deflecting surface).

Further, according to the second embodiment, by fulfilling the conditional equation 4, the main scanning beam pitch for detecting independently the synchronization signal of each beam can be secured without conspicuous effect on an image surface curve and effective writing width.

In the optical scanning apparatus 18 according to the second embodiment, the distance between the scanning lines can be maintained to be highly accurate. Therefore, by including the optical scanning apparatus 18 as an exposing unit in the image forming apparatus, an output image of high quality can be achieved.

Since the optical scanning apparatus 18 that can adjust the position of the beam spot is adopted as an exposing unit of the image forming apparatus, an output image of high quality can be achieved.

An arithmetic processing in the second embodiment is performed by a computer program that is included in the optical scanning apparatus. The computer program is recorded in a recording medium such as an optical recording medium, a magneto-optical recording medium, or a semiconductor. The computer program that is recorded may be allowed to be loaded from the recording medium or may be allowed to be loaded from an external device that is connected via a predetermined network.

The second embodiment is an exemplary embodiment of the present invention. However, the present invention is not limited to the second embodiment only and all modifications and alternative constructions which fairly fall within the basic teaching herein set forth can be treated as embodiments of the present invention.

Thus, according to the present invention, it is possible to suppress the change in the distance between the beam spots (beam pitch) that are irradiated to the surface subjected to scanning from the plurality of light source units that are provided with the plurality of light sources.

An optical scanning apparatus according to a third embodiment can prevent an effect of ghost light without application of a coat to prevent reflection and eliminate the ghost light. Further, a distance between a plurality of scanning beams can be adjusted easily.

Figure 40:
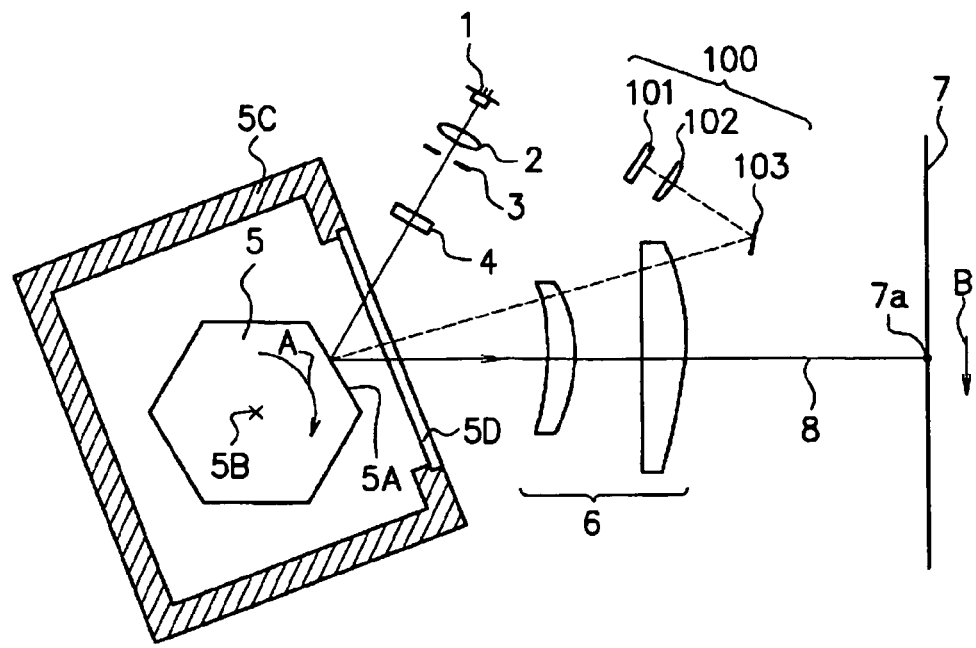
FIG. 40 is a schematic of a structure of the optical scanning apparatus.

FIG. 40 is an illustration of a structure of the optical scanning apparatus in the third embodiment. The optical scanning apparatus includes a light source 1, a light source unit, a cylindrical lens 4, and a deflector 5. The light source 1 includes a semiconductor laser and emits divergent beams. The light source unit includes a coupling lens 2 and an aperture 3. The coupling lens 2 couples the divergent beams emitted from the light source 1 and the aperture 3 regulates the width of the beams. The cylindrical lens (second imaging optical system) 4 is a line-imaging optical system and forms a long line-image in the main scanning direction near a deflecting and reflecting surface 5A of the deflector (polygon scanner) 5.

The deflector 5 rotates at a constant angular velocity in a direction of an arrow A around an axis of rotation 5B and deflects incident beams at constant angular velocity. The deflector 5 is covered by a cover 5C. The beam passes through an optical window 5D which includes a transparent body and is deflected at the deflecting and reflecting surface 5A. The deflected beam again passes through the optical window 5D and is emerged.

A third imaging optical system 6 (although includes two lenses in the diagram, any number of lenses can be used and a reflecting optical system may also be used) is disposed between the deflector 5 and a medium 7 subjected to scanning. Light beam 8 forms an image forming spot 7a on the medium 7 subjected to scanning. The image-forming spot 7a scans optically in a direction of an arrow B, the medium 7 subjected to scanning by rotation of the deflector 5.

A synchronism detection sensor 100, leads the light beam deflected by the deflector 5 to an image forming element 102 for synchronism detection by a mirror 103. The image forming element 102 for synchronism detection leads the deflected beam to a synchronism detection element 101 that normally includes a photodiode. When the beam passes through the synchronism detection element 101, a detection signal is output. An arithmetic circuit which is not shown in the diagram, performs an arithmetic processing of the detection signal that is output and a writing-start signal is output after a predetermined time. The predetermined time is a timer required for the light beam to travel from a detecting position of the synchronism detection element 101 to a writing-start position.

The image-forming element 102 for synchronism detection may include any one of a lens that has refracting power only in a secondary scanning direction, a lens that has refracting power only in a main scanning direction, and a lens that has refracting power in both the main scanning direction and the secondary scanning direction. The image forming element 102 for synchronism detection may include a mirror such as a curved surface mirror that has refracting power, instead of a lens. Instead of using the image forming element 102 for synchronism detection, the mirror 103 may be allowed to have a refracting power and the synchronism detection optical system 100 may be structured such that the beam is lead directly to the synchronism detection element 101.

As mentioned in the conventional technology, when no coat is applied on an optical element that is made from plastic, ghost light appears due to internally reflected light, thereby deteriorating the image quality. According to the method disclosed in Japanese Patent Application Laid-open Publication No. H9-274134, to prevent the ghost light by using the deflector 5, the optical window is tilted with respect to the secondary scanning direction and ghost light due to the reflection at a front surface or a rear surface of the optical window 5D is prevented from reaching a medium 7 subjected to scanning. However, even with such a structure, as shown in FIG. 41 (diagram as viewed from the secondary scanning direction), if the cylindrical lens 4 is inclined due to an error in assembling, internally reflected light 8b of the cylindrical lens 4, becomes the ghost light.

Figure 42:
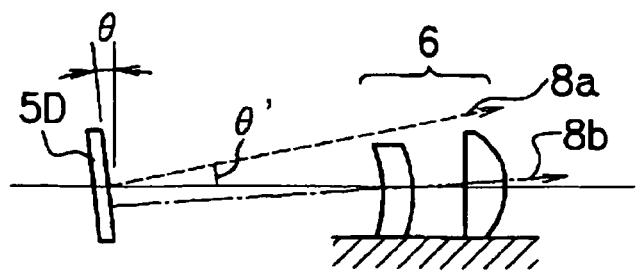
FIG. 42 is a schematic of an arrangement near an optical window for illustrating an occurrence of ghost light.

FIG. 42 is a diagram as viewed from the secondary scanning direction. In FIG. 42, the optical window 5D is tilted so that the light reflected from the optical window 5D doesn't reach the medium 7 subjected to scanning. In FIG. 42, the optical window 5D is tilted at an angle θ. Therefore, as in the ideal case, even if the beams which reach the optical window 5D are reflected at the optical window 5D, reflected beam 8a is at an angle θ' with respect to an optical axis of the third imaging optical system 6. Therefore, the beam is not transmitted through the third imaging optical system 6 and doesn't reach the medium 7 subjected to scanning.

Figure 41:
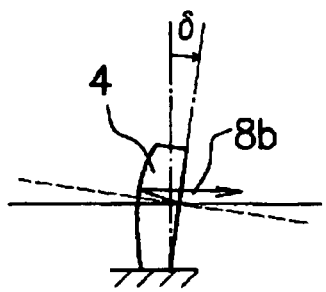
FIG. 41 is a schematic of an arrangement of a cylindrical lens portion for illustrating an occurrence of ghost light.

As compared to this, if the cylindrical lens 4 is assembled such that it is inclined as shown in FIG. 41, internally reflected beam 8b in the cylindrical lens 4 is inclined with respect to an optical axis of the cylindrical lens and a position of reaching the beam on the optical window 5D is shifted. As a result, as shown in FIG. 42, the beam 8b passes through the third imaging optical system 6, thereby reaching the medium 7 subjected to scanning and appearing as a ghost image.

Figure 43:
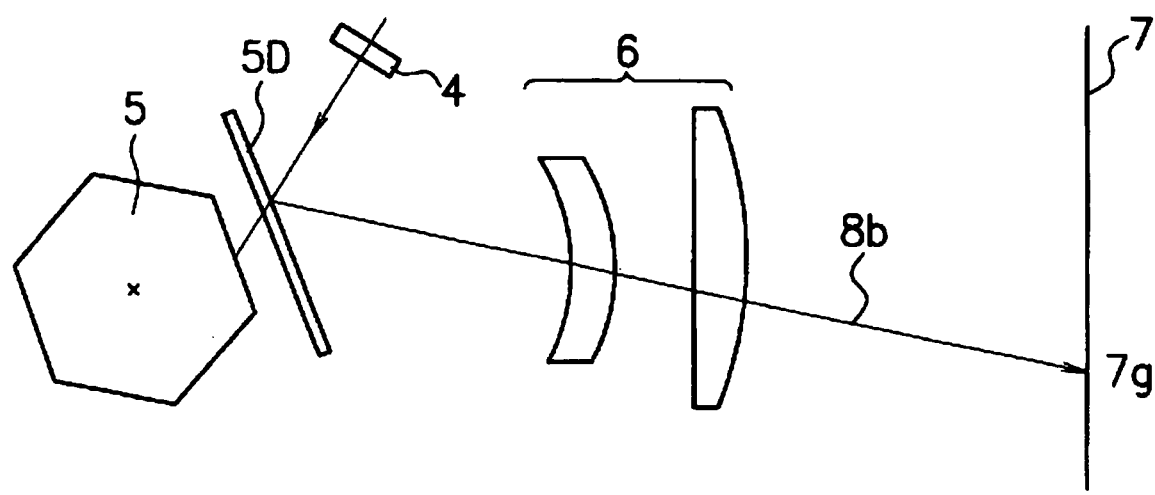
FIG. 43 is a schematic of an image forming due to the ghost light.

FIG. 43 is a diagram as viewed from the main scanning direction. The beam 8b of the ghost light which is reflected at the optical window 5D passes through the third imaging optical system 6 and reaches a position 7g on the medium 7 subjected to scanning. Since the beam 8b appears at the same position irrespective of the rotation of the deflector 5, even very small energy is also stored which is sufficient for appearance as an image.

In view of this, the present invention proposes a structure that does not allow the ghost light due to the internal reflection inside the cylindrical lens 4, to reach the medium 7 subjected to scanning.

Figure 36:
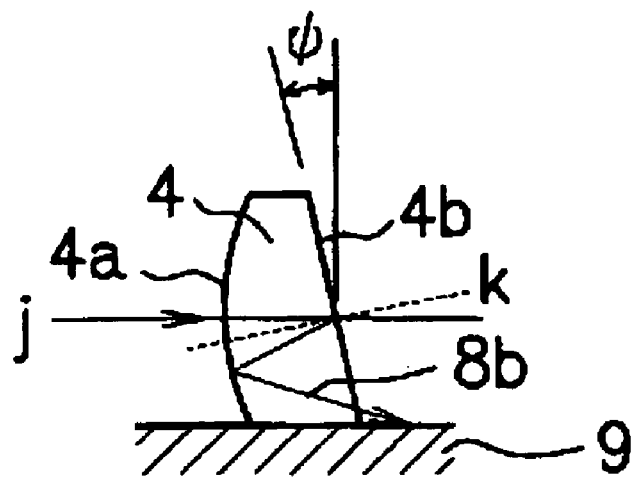
FIG. 36 is a schematic of an arrangement of a cylindrical lens portion of the optical scanning apparatus.

FIG. 36 is a diagram of the cylindrical lens 4 as viewed from the secondary scanning direction. A normal line (optical axis of the lens) j corresponding to a surface 4a on a side of incidence of the cylindrical lens 4 (in the diagram, a cylindrical surface that has refracting power in the secondary scanning direction only) and a normal line (optical axis of the lens) k corresponding to a surface 4b on a side of emergence (flat surface in the diagram) are allowed to be nonparallel.

By making the normal lines j and k nonparallel, even if there is an internal reflection inside the lens, the ghost light 8b due to the reflected light can be prevented from reaching the medium 7 subjected to scanning. In the diagram, the ghost light 8b is directed towards a holder 9 and is dispersed at a base surface.

Figure 37:
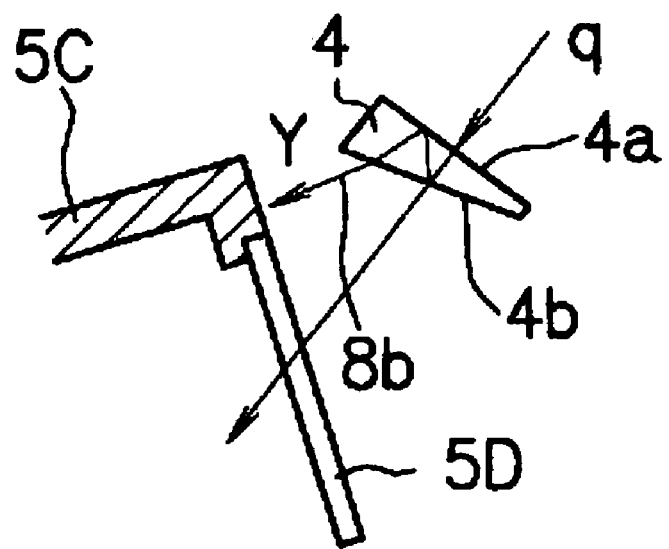
FIG. 37 is a schematic of an arrangement in a portion around the cylindrical lens of the optical scanning apparatus.

FIG. 37 is a diagram as viewed from the main scanning direction. Unlike the surface of emergence 4b of the cylindrical lens 4a inclined towards the secondary scanning direction as mentioned earlier, in this case, the surface of emergence 4b is inclined towards the main scanning direction. With such a structure, the ghost light 8b inside the lens can be prevented from reaching the medium 7 subjected to scanning. In the third embodiment, the ghost light 8b is dispersed after hitting the cover 5C that is covering the deflector 5.

According to the third embodiment, since the surface 4g on the side of emergence of the cylindrical lens 4 is inclined, a direction of incidence of light incident on the lens and a direction of emergence of internally reflected light are nonparallel as shown in FIG. 36 and FIG. 37. For example, in FIG. 37, since the surface 4b on the side of emergence (flat surface in the diagram) is inclined, the direction of emergence of the emergent light is inclined due to the effect of the prism. Therefore, a direction of incidence q on the surface 4a on the side of incidence of the cylindrical lens (in the diagram, a cylindrical surface that has refracting power in the secondary scanning direction only) and a direction r of the emergent light are different and nonparallel. Same is the case in FIG. 36.

With such a structure, the ghost light inside the lens can be prevented from reaching the medium 7 subjected to scanning.

Thus according to the third embodiment mentioned above, the ghost light due to the internal reflection inside the cylindrical lens that is included in the second imaging optical system can be prevented from reaching the deflector 5.

If the cylindrical surface which is the surface 4a on the side of incidence of the cylindrical lens 4 is caused to be deviated and the beam is allowed to be incident, a wave surface of the beam is disturbed and there is a wave front aberration, thereby causing thickening of a diameter of a beam spot. Therefore, it is desirable to allow the light to incident in a direction substantially parallel to a normal line of the beam with respect to the cylindrical surface 4a. In such a case, since the surface 4b on the side of emergence is inclined, the normal line of the surface 4a on the side of incidence of the cylindrical lens 4 is substantially parallel to the direction of incidence and the normal line of the surface 4b on the side of emergence of the cylindrical lens 4 is nonparallel to the direction of incidence.

Due to this, the wave front aberration on the cylindrical surface can be suppressed and thickening of the beam spot can be prevented.

However, according to an optical lay out, there are cases where it is difficult to dispose in parallel with the normal line of the cylinder lens surface 4a. In such a case, regarding a direction having a refracting power of the cylinder lens surface, an optical axis of the lens and the direction of incident of the incident beam are allowed to be substantially parallel and regarding a direction having no refracting power, the beam is allowed to incident with inclination. By doing so, the wave front aberration due to the cylindrical lens 4 can be suppressed. Therefore, according to the third embodiment the structure is such that the ghost light caused by the internal reflection inside the cylindrical lens 4 is prevented from reaching the medium 7 subjected to scanning.

In general, a semiconductor laser (LD) is used as a light source. However, a light source may be formed by combining a plurality of LDs and semiconductor laser array (LDA) that has a plurality of light emitting points. The light source may be formed by combining a plurality of semiconductor laser arrays (LDA). Thus, by using a plurality of light sources and scanning a plurality of light beams, an output speed of the image forming apparatus equipped with the optical scanning apparatus can be raised (related to an invention in claim 5).

Figure 38:
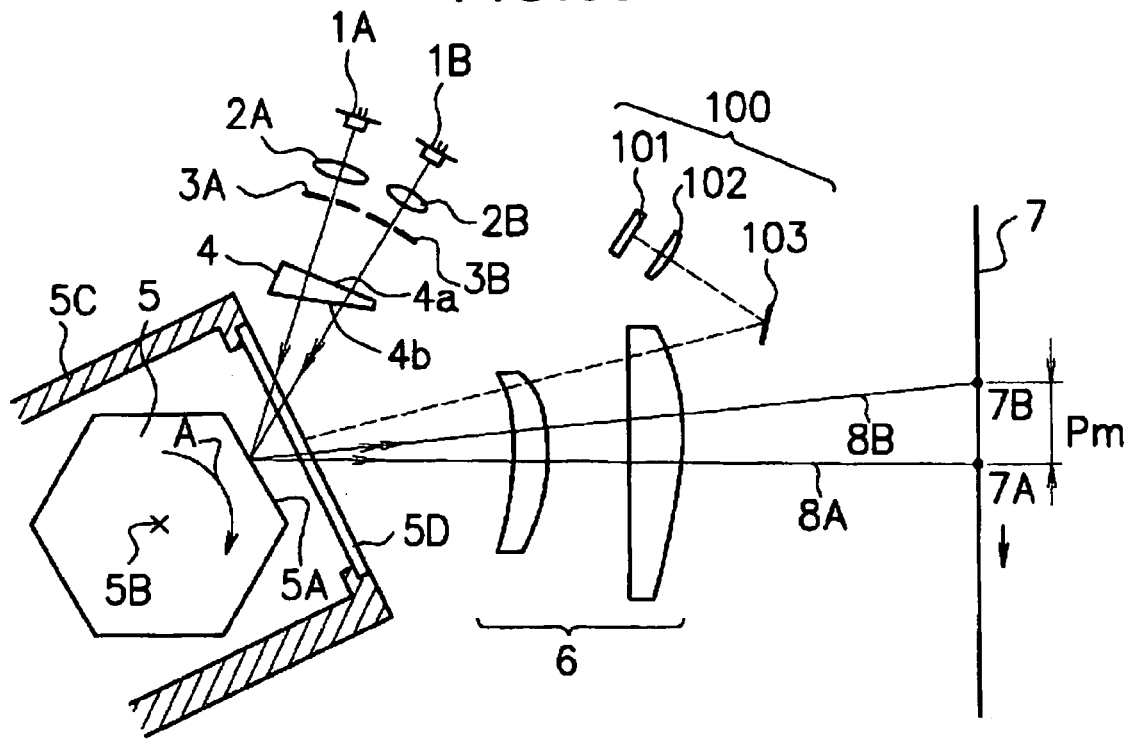
FIG. 38 is a schematic of a structure of the optical scanning apparatus.

The following is a description of the optical scanning apparatus according to the third embodiment of the present invention by referring to FIG. 38. This embodiment is of an optical scanning apparatus which is constructed by combining a light source and a plurality of sets of the first imaging optical system.

The optical scanning apparatus shown in FIG. 38 includes a source unit, a cylindrical lens 4, and a deflector 5. The light source unit includes light sources 1A and 1B, coupling lenses 2A and 2B, apertures 3A and 3B. Each of the light sources 1A and 1B include a plurality of semiconductor lasers (LD) and emits divergent light beams. The coupling lenses (first imaging optical system) 2A and 2B couple the divergent beams emitted from the light sources 1A and 1B. The apertures 3A and 3B regulate the width of the light beam. The cylindrical lens (second imaging optical system) which is a line-imaging optical system forms a line image near a deflecting and reflecting surface 5A of the deflector 5. In this embodiment, a surface 4b on a side of emergence of the cylindrical lens 4 is inclined towards the main scanning direction.

According to the third embodiment, by using a plurality of combinations of the light source and the first imaging optical system, an output speed can be raised by increasing the number of light beams that scan the photosensitive drum.

In a main scanning flat surface, optical elements are disposed between the light emitting point and the medium 7 subjected to scanning, so that the light beams from the light sources 1A and 1B cross each other. In the diagram, the optical elements are disposed such that the light beams cross each other near the deflecting and reflecting surface. The optical elements may be disposed such that the light beams cross on a side of the light sources or on a side of the medium 7 subjected to scanning.

By allowing the light beams to cross near the deflecting and reflecting surface, an optical axis of the third imaging optical system which is a scanning optical system is allowed to be the same, thereby enabling to prevent deterioration of the image forming functions (such as image surface curve, magnification error).

The deflector 5 rotates at a certain angular velocity in the direction of an arrow A around an axis of rotation 5B and incident light beams are deflected at a constant angular velocity. The deflector 5 is covered by a cover 5C. The light beams after passing through an optical window 5D are deflected at the deflecting and reflecting surface 5A and are emerged after passing through the optical window 5D again. The third imaging optical system 6 (although includes two lenses in the diagram, any number of lenses can be used and a reflecting optical system may also be used) is disposed between the deflector 5 and the medium 7 subjected to scanning. Light beams 8A and 8B form image forming spots 7A and 7B on the medium 7 subjected to scanning.

The image forming spots 7A and 7B scan optically in a direction of an arrow B, the medium 7 subjected to scanning with a distance Pm between the 7A and 7B, by rotation of the deflector 5. The distance Pm between the image forming spots 7A and 7B is necessary due to an arrangement which is made in order that the light beams cross in the main scanning flat surface.

The synchronism detection optical system 100 leads the light beams deflected by the deflector 5 to a synchronism detection element 101 which includes components such as photo diode by using the image forming element 102 for synchronism detection. A detection signal is output when the light beams have passed through the synchronism detection element 101. An arithmetic circuit which is not shown in the diagram performs arithmetic processing and a writing-start signal is output after a predetermined time. The predetermined time is a time required for the light beams to travel from a detecting position of the synchronism detection element 101 to a writing-start position.

Since there is a distance of Pm in the main scanning direction between the image forming spots 7A and 7B from the light sources 1A and 1B, the image forming spot 7B reaches the writing-start position after a writing-start signal for the image forming spot 7A is output and the writing on the medium 7 subjected to scanning, is started by the image forming spot 7A. When the image forming spot 7B reaches the writing-start position, a writing-start signal for the image forming spot 7B is output and the writing on the medium subjected to scanning is started by the image forming spot 7B.

Figure 39:
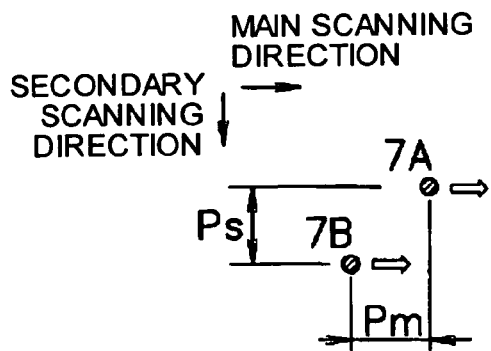
FIG. 39 is a schematic of an example of an adjustment of pitch of a plurality of light beams.

FIG. 39 is a schematic illustration of a positional relation between the image forming spots 7A and 7B on the medium 7 subjected to scanning of the scanning optical system. The image forming spots 7A and 7B are at a pitch distance Pm from each other in the main scanning direction. A distance Ps in the secondary scanning direction is uniquely determined by writing-density. For example, for 600 dpi, Ps is 42.3 μm and for 1200 dpi, Ps is 21.2 μm. While the image forming spots scan 7A and 7B on the medium 7 subjected to scanning, in the main scanning direction, the medium 7 subjected to scanning moves at a velocity V (mm/s) in the secondary scanning direction.

The following is a description of a method of adjustment of the secondary scanning beam pitch Ps on the medium 7 subjected to scanning in a case of a structure according to the third embodiment. Theoretically, the secondary scanning beam pitch Ps can be adjusted by causing the wedge-shaped prism 40 to perform γ rotation around an axis of rotation substantially parallel to an optical axis of the incident light. The cylindrical lens 4 is equivalent to the wedge-shaped prism 40. Although the cylindrical lens 4 shown in FIG. 36, FIG. 37, and FIG. 38 is not perfectly wedge shaped, practically it has a function of the wedge-shaped prism 40.

By rotating the second imaging optical system in FIG. 2 around the optical axis as shown in FIG. 2, the angle of deflection of the wedge-shaped prism 40 can be varied by maximum of $\phi(=\beta 0)$ due to refraction. As it is mentioned earlier, if the apex angle is denoted by α and the refractive index of the second imaging optical system is denoted by n, the maximum angle of deflection $\phi$ is expressed by $$\phi = (n-1) \times \alpha$$

Further, if the focal lengths of the coupling lenses (first imaging optical system) 2A and 2B are fcol, the secondary scanning lateral magnification of all the optical systems is m, and an angle of adjustment around the axis of rotation of the second imaging optical system is Δγ, then the amount of change Δz in the position of beam spot on the medium 7 subjected to scanning is expressed by $$\Delta z = m \times \text{fcol} \times \tan(\phi \times \sin \Delta \gamma)$$

Therefore, the pitch distance on the medium 7 subjected to scanning can be adjusted easily by causing the cylindrical lens 4 to rotate around the axis of rotation parallel to the optical axis of the incident light based on equation (2).

According to the third embodiment, the light beams from both the light sources 1A and 1B are transmitted commonly through the cylindrical lens 4. However, separate cylindrical lenses 4 may be provided for each of the light sources 1A and 1B.

Figure 44:
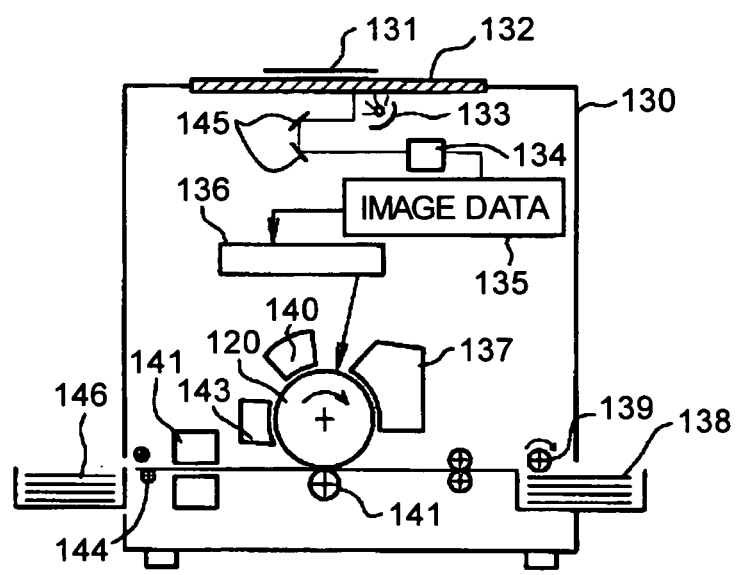
FIG. 44 is a schematic of an image forming apparatus according to an embodiment of the present invention.

FIG. 44 is an illustration of an image forming apparatus in the third embodiment according to the present invention. An image forming apparatus 130 includes an optical scanning apparatus 136 which is structured according to the present invention. In FIG. 44, a document 131 is placed on an exposure glass 132. A lamp 133 irradiates an image on the document 131. A mirror 145 leads the image on the document 131 to a scanner lens block 134. A charged couple device (CCD) processes the image as image data.

Image data 135 is transmitted to the optical scanning apparatus 136. LD is repeatedly put ON and OFF according to the image data and an optical spot scans a photosensitive drum 120 which is a surface 7 subjected to scanning charged by a charger 140. Due to the scanning by the optical spot, an electrostatic latent image is formed on the photosensitive drum 120. A developing unit 137 develops the electrostatic latent image as a toner image.

On the other hand, a paper feeding roller 139 carries a paper sheet from a paper feeding tray 138 to the photosensitive drum 120. A transferring roller 141 transfers the toner image to the paper sheet. A fixing unit 141 fixes the image transferred to the paper sheet. A discharge roller 144 discharges the paper sheet to a discharge tray 42. A decharger-cleaner 143 decharges and cleans the photosensitive drum 120, and steps starting from charging of the photosensitive drum 120 are repeated. According to the third embodiment, it is possible to realize an image forming apparatus with a high output speed and in which the deterioration of the image due to ghost light is suppressed by providing the optical scanning apparatus 136 according to the present invention.

Further, an information processing system that can process an output from a plurality of units in an image forming apparatus can be constructed by connecting the image forming apparatus according to the third embodiment to an electronic arithmetic unit (such as a computer), an image information communication system (such as a facsimile) via a network. By connecting a plurality of image forming apparatuses through the network, a status of each of the image forming apparatus (whether busy with jobs, whether power supply is ON, whether out of order) can be known and output can be carried out by selecting an image forming apparatus in the best condition (a condition suitable for a user).

Thus, according to the present invention, the ghost light due to the internal reflection in the second imaging optical system such as the cylindrical lens can be prevented by reaching the deflector thereby enabling to prevent the deterioration of image. Further, while scanning with a plurality of light beams, the distance between the light beams can be adjusted easily.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanning apparatus comprising:
M number of light sources that includes M number of semiconductor lasers and M number of coupling lenses, where M is a positive integer;
a deflecting scanning unit that deflects laser beams from the M number of light sources to a surface to be scanned; and
a transmission-type prism that deflects optical path of the laser beam from at least one of the M number of light sources by an infinitesimal amount of angle, wherein the transmission-type prism is disposed between the M number of light sources and the deflecting scanning unit, has an incident surface and an output surface nonparallel to each other, and can rotate around an axis of rotation substantially parallel to the optical path of the laser beam.

2. The optical scanning apparatus according to claim 1, wherein the axis of rotation is normal to either of the incident surface and the output surface.

3. The optical scanning apparatus according to claim 1, wherein the transmission-type prism is made of a predetermined resin.

4. The optical scanning apparatus according to claim 1, wherein the transmission-type prism is rotated by a pulse motor.

5. The optical scanning apparatus according to claim 1, wherein the transmission-type prism is disposed in optical paths of at least two laser beams from among laser beams from N number of light sources, where N is a positive integer bigger than unity.

6. The optical scanning apparatus according to claim 5, wherein optical paths of the laser beams from the N number of light sources are non parallel to each other on a surface of deflection.

7. The optical scanning apparatus according to claim 6, wherein a focal length of the coupling lens fcol, secondary scanning magnification of an optical system from the semiconductor laser to the surface to be scanned m, an angle between the incident surface and the output surface of the transmission-type prism $\alpha$, an angle of rotation of the transmission-type prism $\gamma$, a half of a maximum angle of intersection of the optical paths of the laser beams from the N number of light sources in the surface of deflection $\theta$, a scanning density in a secondary scanning direction D, and a refractive index of the transmission-type prism n satisfy following relations $$|m \times \text{fcol} \times (\tan \beta 2 + \tan \beta 1)| \leq 0.5$$

$$|m \times \text{fcol} \times (\tan \beta 2 - \tan \beta 1)| \leq 6.35/D$$

where $$\tan \beta 1 = \varphi 1Z/\varphi 1x$$
$$= (N11 \times \sin\alpha \times \sin Y)/(\cos\theta + N11 \cos\alpha + N21)$$
$$\tan \beta 2 = \varphi 2z/\varphi 2x$$
$$= (N12 \times \sin\alpha \times \sin Y)/(\cos\theta + N12\cos\alpha + N22),$$

$\varphi 1x = \cos\theta + N11 \cdot \cos\alpha + N21$, $\varphi 2x = \cos\theta + N12 \cdot \cos\alpha + N22$, $\varphi 1z = N11 \cdot \sin\alpha \cdot \sin Y$, $\varphi 2z = N12 \cdot \sin\alpha \cdot \sin Y$, $N11 = n \cdot \cos r11 - \cos i11$, $N21 = \cos i21 - n \cdot \cos r21$, $i11 = \cos^{-1}(\cos\theta \cdot \cos\alpha + \sin\theta \cdot \sin\alpha \cdot \cos\alpha)$, $r11 = \sin^{-1}\{(1/n)\sin i11\}$, $r21 = \cos^{-1}\{(1/n)(\cos\theta + N11 \cdot \cos\alpha)\}$, $i21 = \sin^{-1}(\cos\theta + N11\cdot\cos\alpha + N21),$ $N12 = n\cdot\cos r12 - \cos i12,$ $N22 = \cos i22 - n\cdot\cos r22,$ $i12 = \cos^{-1}(\cos\theta\cdot\cos\alpha - \sin\theta\cdot\sin\alpha\cdot\cos\alpha),$ $r12 = \sin^{-1}\{(1/n)\sin i12\},$ $r22 = \cos^{-1}\{(1/n)(\cos\theta + N12\cdot\cos\alpha)\},$ $i22 = \sin^{-1}(\cos\theta + N12\cdot\cos\alpha + N22).$

8. An image forming apparatus comprising an optical scanning apparatus including
M number of light sources that includes M number of semiconductor lasers and M number of coupling lenses, where M is a positive integer;
a deflecting scanning unit that deflects laser beams from the M number of light sources to a surface to be scanned; and
a transmission-type prism that deflects optical path of the laser beam from at least one of the M number of light sources by an infinitesimal amount of angle, wherein
the transmission-type prism is disposed between the M number of light sources and the deflecting scanning unit, has an incident surface and an output surface nonparallel to each other, and can rotate around an axis of rotation substantially parallel to the optical path of the laser beam.

9. The image forming apparatus according to claim 8, wherein a plurality of optical scanning apparatuses are disposed in a main scanning direction.

10. An optical scanning apparatus comprising:
a deflecting scanning unit that deflects laser beams from a plurality of light sources to a plurality of image carriers to scan in a main scanning direction;
at least one transmission-type prism that deflects the laser beam from at least one of the light sources by an infinitesimal amount of angle; and
a writing position correcting unit that varies a position of a beam spot in a secondary scanning direction by adjusting rotation of the at least one transmission-type prism around an optical axis to control a position of a scanning line on the image carrier, wherein
the transmission-type prism is disposed between the M number of light sources and the deflecting scanning unit, has an incident surface and an output surface nonparallel to each other, and can rotate around an axis of rotation substantially parallel to the optical path of the laser beam.

11. An image forming apparatus comprising an optical scanning apparatus including
a deflecting scanning unit that deflects laser beams from a plurality of light sources to a plurality of image carriers to scan in a main scanning direction;
at least one transmission-type prism that deflects the laser beam from at least one of the light sources by an infinitesimal amount of angle; and
a writing position correcting unit that varies a position of a beam spot in a secondary scanning direction by adjusting rotation of the at least one transmission-type prism around an optical axis to control a position of a scanning line on the image carrier, wherein
the transmission-type prism is disposed between the M number of light sources and the deflecting scanning unit, has an incident surface and an output surface nonparallel to each other, and can rotate around an axis of rotation substantially parallel to the optical path of the laser beam.

12. An optical scanning apparatus comprising:
a first light source that includes a plurality of light emitting elements;
a second light source that includes a plurality of light emitting elements;
a beam combining unit that combines a first light beam from the first light source and a second light beam from the second light source, and outputs a combined light beam;
a deflecting scanning unit that deflects the combined light beam to scan a surface to be scanned; and
a transmission-type prism that is disposed in optical path of at least one light beam between the beam-combining unit and at least one of the first light source and the second light source, and deflects the at least one light beam by a predetermined angle.

13. The optical scanning apparatus according to claim 12, wherein the first light source and the second light source are held by a common holder.

14. The optical scanning apparatus according to claim 13, wherein fixing surfaces that hold the first light source and the second light source are on a same flat surface.

15. The optical scanning apparatus according to claim 12, wherein optical paths of the first light beam and the second light beam are nonparallel to each other on a surface of deflection.

16. The optical scanning apparatus according to claim 12, wherein
the transmission-type prism has an incident surface and an output surface, and
the transmission-type prism is pivotably held around an axis of rotation substantially parallel to an optical axis of a corresponding light beam with an initial state in which the transmission-type prism is arranged so that the incident surface and the output surface are perpendicular to the surface of deflection.

17. The optical scanning apparatus according to claim 16, wherein the transmission-type prism is rotated by an actuator that is controllable.

18. The optical scanning apparatus according to claim 17, wherein
the transmission-type prism is inserted into a prism cell that is connected to the actuator, and
the transmission-type prism is pivotably held inside the prism cell.

19. The optical scanning apparatus according to claim 12, wherein when an initial state is defined by a state in which the transmission-type prism is arranged so that an incident surface and an output surface of the transmission-type prism are perpendicular to a surface of deflection,
an apex angle of the transmission-type prism that is disposed in optical path of a light beam from a light source for which the a length of optical path to the deflecting scanning unit is longer is toward optical path of light beam from other light source in the initial state, and
an apex angle of the transmission-type prism that is disposed in optical path of a light beam from a light source for which the optical path length to the deflecting scanning unit is shorter is toward opposite to optical path of light beam from other light source in the initial state.

20. The optical scanning apparatus according to claim 19, wherein the apex angle of the transmission-type prism α and an angle of intersection of two first light beams on the surface of deflection and an angle of intersection of two second light beams on the surface of deflection θ satisfies following relation $$\theta \geq 4 \times (n-1) \times \alpha$$

where n is a refractive index of the transmission-type prism.

21. The optical scanning apparatus according to claim 12, wherein when an initial state is defined by a state in which the transmission-type prism is arranged so that an incident surface and an output surface of the transmission-type prism are perpendicular to a surface of deflection,
  if the transmission-type prism is disposed in each optical path of light beams from two light emitting elements in a same light source, apex angles of the two transmission-type prism are toward a same side, and
  an apex angle of the transmission-type prism that is disposed in the optical path of the first light beam and an apex angle of the transmission-type prism that is disposed in the optical path of the second light beam are toward opposite side to each other.

22. The optical scanning apparatus according to claim 21, wherein the first light source and the second light source are displaced in a main scanning direction and fixed on a same surface of a common holder.

23. The optical scanning apparatus according to claim 21, wherein the apex angle of the transmission-type prism α and an angle of intersection of two first light beams on the surface of deflection and an angle of intersection of two second light beams on the surface of deflection θ satisfies following equation $$\theta = 4 \times (n-1) \times \alpha$$

where n is a refractive index of the transmission-type prism.

24. The optical scanning apparatus according to claim 12, wherein the transmission-type prism is a wedge-shaped prism that has an incident surface and an output surface nonparallel to each other.

25. The optical scanning apparatus according to claim 24, wherein at least one of the incident surface and the output surface is formed to have a curvature.

26. An image forming apparatus comprising an optical scanning apparatus including
  a first light source that includes a plurality of light emitting elements;
  a second light source that includes a plurality of light emitting elements;
  a beam combining unit that combines a first light beam from the first light source and a second light beam from the second light source, and outputs a combined light beam;
  a deflecting scanning unit that deflects the combined light beam to scan a surface to be scanned; and
  a transmission-type prism that is disposed in optical path of at least one light beam between the beam-combining unit and at least one of the first light source and the second light source, and deflects the at least one light beam by a predetermined angle.

27. A beam positioning method by rotating a transmission-type prism, wherein the beam positioning is performed by an optical scanning apparatus including
  a first light source that includes a plurality of light emitting elements;
  a second light source that includes a plurality of light emitting elements;
  a beam combining unit that combines a first light beam from the first light source and a second light beam from the second light source, and outputs a combined light beam;
  a deflecting scanning unit that deflects the combined light beam to scan a surface to be scanned; and
  a transmission-type prism that is disposed in optical path of at least one light beam between the beam-combining unit and at least one of the first light source and the second light source, and deflects the at least one light beam by a predetermined angle.

28. An optical scanning apparatus comprising:
  a first imaging optical system that couples a divergent light beam from a light source;
  a second imaging optical system that leads light from the first imaging optical system to form a line image near a deflecting reflection surface;
  a deflector that includes the deflecting reflection surface; and
  a third imaging optical system that forms an image by forming a light spot with light beam deflected and reflected by the deflector on a surface to be scanned, wherein
  the second imaging optical system has a first optical axis that is normal to an incident surface and a second optical axis that is normal to an output surface, and
  the first optical axis and the second optical axis are non-parallel to each other.

29. The optical scanning apparatus according to claim 28, wherein
  the first optical axis is substantially parallel to a direction of incidence of a light beam that is incident on the second imaging optical system, and
  the second optical axis is nonparallel to the direction of incidence of the light beam that is incident on the second imaging optical system.

30. The optical scanning apparatus according to claim 28, wherein the incident surface and the output surface are formed in such a manner that a ghost light due to an internal reflection of the second imaging optical system does not reach a surface to be scanned.

31. The optical scanning apparatus according to claim 28, wherein the light source includes a plurality of light emitting elements and emits a plurality of light beams.

32. The optical scanning apparatus according to claim 31, wherein the light source is formed in such a manner that the light beams cross each other near the deflecting reflection surface when the light spot is formed on the surface to be scanned.

33. The optical scanning apparatus according to claim 28, wherein a plurality of sets of the light source and the first imaging optical system is prepared to output a plurality of light beams.

34. The optical scanning apparatus according to claim 33, wherein the second imaging optical system is pivotably disposed around an axis of rotation that is substantially parallel to an optical axis of an incident light beam.

35. The optical scanning apparatus according to claim 28, wherein an optical window made of a transparent body is disposed between the second imaging optical system and the deflector.

36. An optical scanning apparatus comprising:
  a first imaging optical system that couples a divergent light beam from a light source;
  a second imaging optical system that leads light from the first imaging optical system to form a line image near a deflecting reflection surface;

a deflector that includes the deflecting reflection surface; and a third imaging optical system that forms an image by forming a light spot with light beam deflected and reflected by the deflector on a surface to be scanned, wherein an incident direction of a light beam on the second imaging optical system and an output direction of a light beam from the second imaging optical system are nonparallel.

37. The optical scanning apparatus according to claim 36, wherein the second imaging optical system has a first optical axis that is normal to an incident surface and a second optical axis that is normal to an output surface, the first optical axis is substantially parallel to the incident direction, and the second optical axis is nonparallel to the incident direction.

38. The optical scanning apparatus according to claim 36, wherein an incident surface and an output surface of the second imaging optical system are formed in such a manner that a ghost light due to an internal reflection of the second imaging optical system does not reach a surface to be scanned.

39. The optical scanning apparatus according to claim 36, wherein the light source includes a plurality of light emitting elements and emits a plurality of light beams.

40. The optical scanning apparatus according to claim 39, wherein the light source is formed in such a manner that the light beams cross each other near the deflecting reflection surface when the light spot is formed on the surface to be scanned.

41. The optical scanning apparatus according to claim 39, wherein the second imaging optical system is pivotably disposed around an axis of rotation that is substantially parallel to an optical axis of an incident light beam.

42. The optical scanning apparatus according to claim 36, wherein a plurality of sets of the light source and the first imaging optical system is prepared to a plurality of light beams.

43. The optical scanning apparatus according to claim 36, wherein an optical window made of a transparent body is disposed between the second imaging optical system and the deflector.

44. An image forming apparatus comprising an optical scanning apparatus including a first imaging optical system that couples a divergent light beam from a light source;

a second imaging optical system that leads light from the first imaging optical system to form a line image near a deflecting reflection surface;

a deflector that includes the deflecting reflection surface; and a third imaging optical system that forms an image by forming a light spot with light beam deflected and reflected by the deflector on a surface to be scanned, wherein the second imaging optical system has a first optical axis that is normal to an incident surface and a second optical axis that is normal to an output surface, and the first optical axis and the second optical axis are nonparallel to each other.

45. An image forming apparatus comprising an optical scanning apparatus including a first imaging optical system that couples a divergent light beam from a light source;

a second imaging optical system that leads light from the first imaging optical system to form a line image near a deflecting reflection surface;

a deflector that includes the deflecting reflection surface; and a third imaging optical system that forms an image by forming a light spot with light beam deflected and reflected by the deflector on a surface to be scanned, wherein an incident direction of a light beam on the second imaging optical system and an output direction of a light beam from the second imaging optical system are nonparallel.

\* \* \* \* \*